United States Patent
Kawai et al.

(10) Patent No.: US 6,397,615 B1
(45) Date of Patent: Jun. 4, 2002

(54) VEHICLE AIR CONDITIONER WITH NON-CONTACT TEMPERATURE SENSOR

(75) Inventors: Takayoshi Kawai, Hoi-gun; Yuichi Kajino, Nagoya; Yoshinori Ichishi, Kariya; Toshifumi Kamiya, Takahama; Hikaru Sugi, Nagoya; Shigeki Harada, Toyota; Nobukazu Kuribayashi, Kariya; Tatsumi Kumada, Gamagori; Akira Yamaguchi, Chiryu; Hiroyuki Tomita, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/633,426

(22) Filed: Aug. 7, 2000

(30) Foreign Application Priority Data

| Aug. 26, 1999 | (JP) | ............ 11-240176 |
| Sep. 28, 1999 | (JP) | ............ 11-274726 |
| Nov. 10, 1999 | (JP) | ............ 11-320194 |
| Mar. 16, 2000 | (JP) | ............ 2000-079357 |
| Apr. 3, 2000 | (JP) | ............ 2000-105380 |

(51) Int. Cl.$^7$ .................................. B60H 1/32
(52) U.S. Cl. ........................ 62/244; 236/91 C
(58) Field of Search ............... 236/91 C, 1 R, 236/51; 374/121, 132

(56) References Cited

U.S. PATENT DOCUMENTS 5,400,964 A  3/1995  Freiberger ............ 236/91 C

FOREIGN PATENT DOCUMENTS

| JP | A-5-178064 | 7/1993 |
| JP | A-7-179119 | 7/1995 |
| JP | A-7-243687 | 9/1995 |

Primary Examiner—William E. Tapolcai
(74) Attorney, Agent, or Firm—Harness, Dickey & Pierce, PLC

(57) ABSTRACT

A vehicle air conditioner has a non-contact temperature sensor for detecting a surface temperature of a detection range of a passenger compartment. The detection range includes a first detection portion in which a surface temperature is changed to approximately correspond to an inside air temperature, a second detection portion in which a surface temperature is changed in accordance with an outside air temperature, and a third detection portion in which a surface temperature is changed in accordance with a sunlight amount entering the passenger compartment. In the vehicle air conditioner, a target temperature of air blown into the passenger compartment is calculated based on a set temperature and a surface temperature from the non-contact temperature sensor, while air-conditioning performance is improved.

33 Claims, 39 Drawing Sheets

| HEAT LOAD VARIATION AMOUNT DETECTION SUBJECT | Tam | Ts | Tr |
|---|---|---|---|
| | Δ10°C | Δ582W/m² | Δ10°C |
| GLASS | Δ7.3°C | Δ10.2°C | Δ3.4°C |
| CLOTHED PORTION, SEAT | Δ1.8°C | Δ4.2°C | Δ12.3°C |
| CELING | Δ1.8°C | Δ0.8°C | Δ10.9°C |

FRONT ←→ REAR

| DETECTION SUBJECT | P-1 | P-2 | TARGET |
|---|---|---|---|
| GLASS | 23% | 13% | 25% |
| CLOTHED PORTION, SEAT | 35% | 39% | 35% |
| CEILING | 17% | 20% | 20% |
| OTHER PART | 25% | 28% | 20% |

VEHICLE AIR CONDITIONER WITH NON-CONTACT TEMPERATURE SENSOR

CROSS-REFERENCE TO RELATED APPLICATION

This application is related to and claims priority from Japanese Patent Applications No. Hei. 11-240176 filed on Aug. 26, 1999, No. Hei. 11-274726 filed on Sep. 28, 1999, No. Hei. 11-320194 filed on Nov. 10, 1999, No. 2000-79357 filed on Mar. 16, 2000, and No. 2000-105380 filed on Apr. 3, 2000, the contents of which are hereby incorporated by reference.

BACKGROUND OF THE INVENTION

1. Field of the Invention

The present invention relates to a vehicle air conditioner which automatically controls temperature within a passenger compartment to a set temperature by using a non-contact temperature sensor.

2. Description of Related Art

A conventional vehicle air conditioner described in JP-A-5-178064 includes a temperature setting unit for setting temperature of a passenger compartment to a passenger's desirous temperature, an inside air temperature sensor for detecting temperature of inside air inside the passenger compartment, an outside air temperature sensor for detecting temperature of outside air outside the passenger compartment, a sunlight sensor for detecting an amount of sunlight entering the passenger compartment, a skin temperature sensor (non-contact temperature sensor) for detecting skin temperature of a passenger. In the conventional air conditioner, a target temperature of air blown into the passenger compartment or a target voltage applied to a blower is calculated based on signals from the temperature setting unit and the sensors. Further, to actually detect the skin temperature, the skin temperature sensor is disposed to only detect the head part of the passenger. However, in the conventional vehicle air conditioner, because four sensors are used for calculating the target temperature of blown air or the target blower voltage, product cost becomes higher. When the number of the sensors is simply reduced, control performance of the temperature of the passenger compartment may be greatly decreased.

SUMMARY OF THE INVENTION

In view of the foregoing problems, it is an object of the present invention to provide a vehicle air conditioner which can accurately control temperature inside a passenger compartment by effectively using a non-contact temperature sensor even when number of sensors is reduced.

It is an another object of the present invention to provide a vehicle air conditioner which controls temperature inside the passenger compartment to correspond to temperature feeling of a passenger, by effectively using a non-contact temperature sensor.

It is a further another object of the present invention to provide a vehicle air conditioner which prevents air-conditioning feeling for a passenger from being deteriorated due to an error-detection.

According to a first aspect of the present invention, a control unit of a vehicle air conditioner includes a temperature setting unit for setting a temperature of the passenger compartment to a set temperature, and a non-contact temperature sensor which detects a surface temperature of a predetermined detection range of the passenger compartment. The predetermined detection range of the non-contact temperature sensor includes at least one of a first detection portion in which a surface temperature is changed to approximately correspond to an inside air temperature inside the passenger compartment, a second detection portion in which a surface temperature is changed in accordance with an outside air temperature outside the passenger compartment, and a third detection portion in which a surface temperature is changed in accordance with a sunlight amount entering the passenger compartment. In the air conditioner, the control unit calculates the target air temperature at least using the set temperature from the temperature setting unit and a detection surface temperature detected from the non-contact temperature sensor. Accordingly, it is possible to output an environment signal relative to the inside air temperature, the outside air temperature and the sunlight amount entering the passenger compartment from the non-contact temperature sensor; and therefore, temperature of the passenger compartment is controlled to a suitable temperature corresponding to the inside air temperature, the outside air temperature and the sunlight amount. As a result, even when the number of sensors is reduced in the vehicle air conditioner, it can prevent air-conditioning performance from being deteriorated by using the non-contact temperature sensor.

Preferably, the non-contact temperature sensor is disposed to detect a surface temperature of detection subjects of a windshield, a clothed portion of a passenger, a seat and a ceiling of the passenger compartment. Further, each area ratio of the detection subjects to an entire detection area of the non-contact temperature sensor is set so that the area ratio of the windshield is (25±10)%, the area ratio of the clothed portion and the seat is (35±10)%, the area ratio of the ceiling is (20±10)% and the area ratio of the other portion is (20±10)%. Thus, a variation amount of the detection surface temperature, changed relative to heat load such as the inside air temperature, the outside air temperature and the sunlight amount, can be made close to a, target value. Accordingly, control performance of the passenger compartment is improved.

More preferably, each area ratio of the detection subjects to the entire detection area is set so that the area ratio of the windshield is (25±5)%, the area ratio of the clothed portion and the seat is (35±5)%, the area ratio of the ceiling is (20±5)% and the area ratio of the other portion is (20±5)%. Accordingly, control performance of the passenger compartment is further improved.

Further, the control unit includes temperature variation determining means for determining whether or not a variation amount of the surface temperature is larger than a set value, and the control unit controls an air-conditioning operation based on a determination of the temperature variation determining means. Therefore, the air-conditioning operation is suitably controlled to correspond to a variation of the detection surface temperature.

Preferably, the air conditioner further includes an air amount adjustment unit for adjusting an air amount blown into the passenger compartment from an air duct, the control unit controls the air amount adjustment unit so that the air amount blown into the passenger compartment from the air duct becomes a target air amount, and the control unit corrects the target air amount based on the determination of the temperature variation determining means. Therefore, it can prevent an outer disturbance from being affected to an air-conditioning operation.

Alternatively, the control unit corrects the surface temperature based on a determination of an outer disturbance determining means. Therefore, it can prevent an outer disturbance from being affected to an air-conditioning operation. For example, when the outer disturbance is determined by the outer disturbance determining means, the control unit controls an air-conditioning operation based on a previous surface temperature before being affected by the outer disturbance.

According to an another aspect of the present invention, a vehicle air conditioner includes a non-contact temperature sensor for detecting a subject surface temperature of a detection subject of the passenger compartment, operation control means which controls operation of the air conditioning unit based on the subject surface temperature detected from the non-contact temperature sensor, and output control means which controls an output timing for outputting the subject surface temperature into the operation control means. The output control means controls the output timing in accordance with a variation of the subject surface temperature. Thus, even in a case where the variation of the subject surface temperature is caused due to an error-detection, when the subject surface temperature is output to the operation control means after a difference between the temperature of the passenger compartment and the subject surface temperature becomes smaller, a deterioration of the air-conditioning feeling due to an error detection is restricted.

According to a further another aspect of the present invention, a vehicle air conditioner includes a non-contact temperature sensor for detecting a temperature of a detection subject of the passenger compartment, correction means for correcting the temperature detected by the non-contact temperature sensor to a correction temperature, and control means which controls operation of an air conditioning unit based on the correction temperature from the correction means. Therefore, even when the temperature is error-detected by the non-contact temperature sensor, because the temperature detected by the non-contact temperature sensor is corrected by the correction means, a deterioration of the air-conditioning feeling, due to an error detection is restricted, and an air-conditioning control corresponding to a passenger's feeling is performed.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Figure 1:
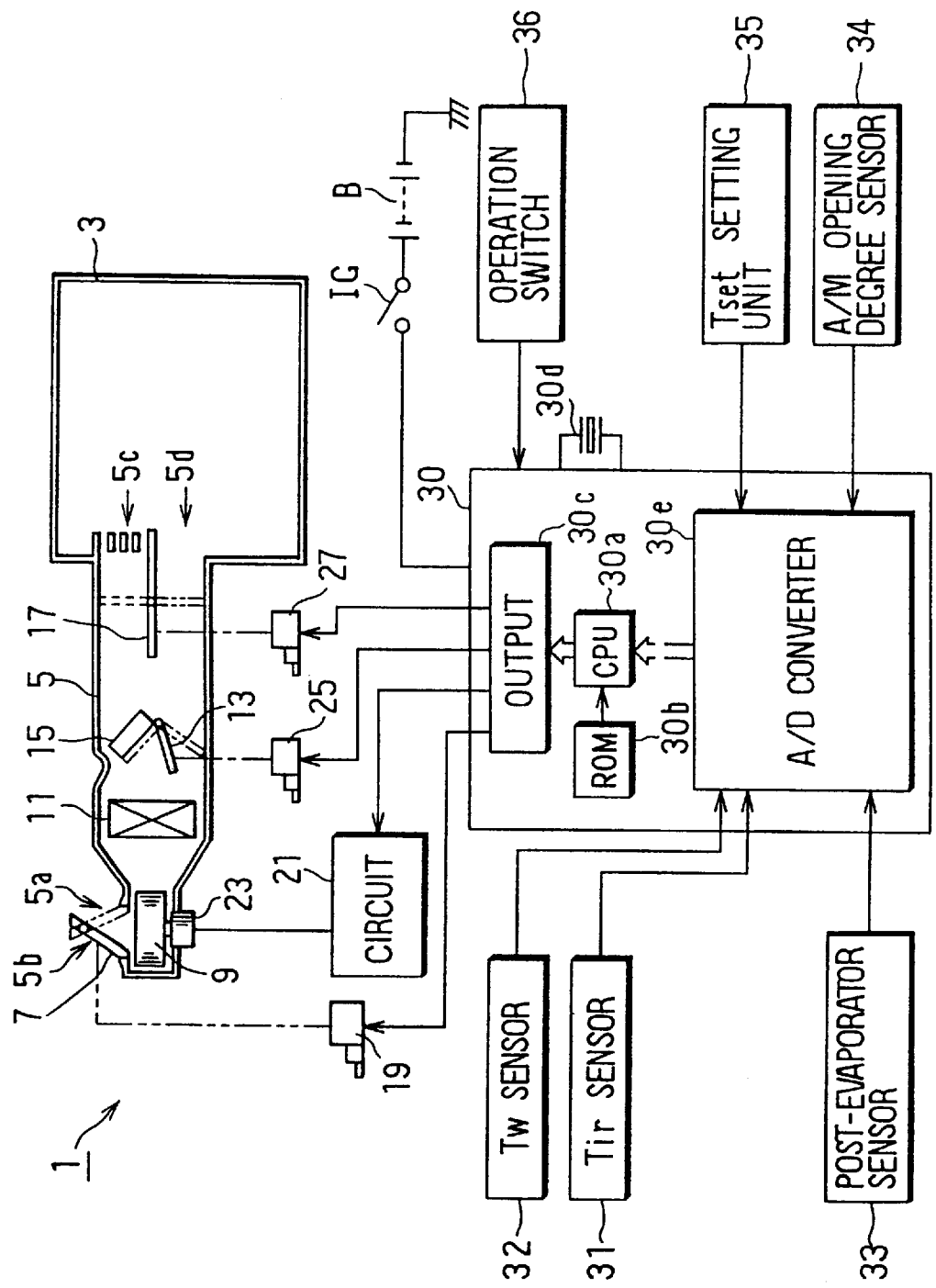
FIG. 1 is a schematic view showing an entire structure of a vehicle air conditioner according to a first preferred embodiment of the present invention.

Preferred embodiments of the present invention will be described hereinafter with reference to the accompanying drawings.

A first preferred embodiment of the present invention will be now described with reference to FIGS. 1–11. A vehicle air conditioner 1 includes an air conditioning unit disposed in an air duct 5 which is positioned at a front side of a passenger compartment 3. Within the air duct 5, an inside/outside air switching damper 7, a blower 9, an evaporator (i.e., cooling heat exchanger) 11, an air mixing damper 13, a heater core (i.e., heating heat exchanger) 15 and an air outlet switching damper 17 are disposed in order in an air flow direction.

When the inside/outside air switching damper 7 is operated by a servomotor 19 to a first switching position (i.e., the position shown by the solid line in FIG. 1), outside air outside the passenger compartment 3 is introduced into the air duct 5 from an outside air introduction port 5a. On the other hand, when the inside/outside air switching damper 7 is operated by the servomotor 19 to a second switching position (i.e., the position shown by the chain line in FIG. 1), inside air inside the passenger compartment 3 is introduced into the air duct 5 from an inside air introduction port 5b.

Outside air from the outside air introduction port 5a or inside air from the inside air introduction port 5b is blown toward the evaporator 11 by the blower 9 which is operated in accordance with a rotation speed of a blower motor 23 driven by a driving circuit 21. The evaporator 11 cools air blown by the blower 9 by using refrigerant circulating in a refrigerant cycle of the vehicle air conditioner. In the first embodiment, the air amount blown into the passenger compartment 3 is adjusted by the driving circuit 21 and the blower motor 23.

The air mixing damper 13 is driven by a servomotor 25. Based on an opening degree of the air mixing damper 13, a ratio between an air amount passing through the heater core 15 and an air amount bypassing the heater core 15 is adjusted so that the temperature of air blown into the passenger compartment 3 is adjusted. That is, the air mixing damper 13 and the servomotor 25 are used as a temperature adjustment unit for adjusting temperature of air blown into the passenger compartment 3.

The air outlet switching damper 17 is driven by a servomotor 27. When a face mode is set, the air outlet switching damper 17 is operated to a first operation position to open a face air outlet 5c and to close a foot air outlet 5d, so that air is blown toward the head portion of a passenger in the passenger compartment 3 from the face air outlet 5c of the air duct 5. When a foot mode is set, the air outlet switching damper 17 is operated to a second operation position to close the face air outlet 5c and to open the foot air outlet 5d, so that air is blown toward the foot portion of the passenger in the passenger compartment 3 from the foot air outlet 5d of the air duct 5. Further, when a bi-level mode is set, the air outlet switching damper 17 is operated to a third operation position (i.e., the solid position in FIG. 1) so that air is blown from both the face air outlet 5c and the foot air, outlet 5d.

The servomotor 19 of the inside/outside air switching damper 7, the driving circuit 21 of the blower 9, the servomotor 25 of the air mixing damper 13 and the servomotor 27 of the air outlet switching damper 17 are driven and operated by control signals from an electronic control unit (ECU) 30, respectively.

Signals from a surface temperature sensor (non-contact temperature sensor, range-detection temperature sensor) 31 which detects a surface temperature Tir in a predetermined range within the passenger compartment 3 in a non-contact state, a water temperature sensor 32 for detecting temperature Tw of cooling water of a vehicle engine, an evaporator air-outlet temperature sensor 33 (post-evaporator sensor) for detecting temperature of air immediately blown out from the evaporator 11, an air mixing damper opening degree sensor (hereinafter, referred to as "A/M opening degree sensor") 34 for detecting an actual opening degree θ of the air mixing damper 13, a temperature setting unit 35 for setting a set temperature Tset and the like are input into the ECU 30 through an A/D converter 30e. Here, the A/M opening degree sensor 34 is accommodated into the servomotor 25 so that the actual opening degree θ of the air mixing damper 13 is detected. Further, the temperature setting unit 35 may be a manual operation unit which sets the temperature Tset by a passenger, or may be a temperature sensing input unit. When the temperature sensing input unit is used as the temperature setting unit 35, a hot or a cold signal is input, and the set temperature Tset of the passenger compartment 3 is set in accordance with the input hot or cold signal.

In the present invention, the surface temperature sensor (non-contact temperature sensor) 31 is used as a range-detection temperature sensor for detecting temperature of a predetermined detection range around a predetermined detection position.

The ECU 30 performs an air-conditioning operation control of the vehicle air conditioner based on the above-described various signals. The ECU 30 includes a central processing unit. (hereinafter, referred to as "CPU") 30a which calculates operation amounts of the above-described components of the vehicle air conditioner 1 based on the signals from an A/D converter 30e, a ROM 30b for storing a proceeding of a control flow diagram described later, an output portion 30c which outputs control signals corresponding to the operation amounts calculated in the CPU 30a to the above-described components of the vehicle air conditioner 1, and a crystal oscillator 30d for performing a digital, calculation proceeding of a software of the CPU 30a.

Electrical power is supplied from a battery B to the ECU 30 when an ignition switch IG is turned on. In this state, when an operation switch 36 for the vehicle air conditioner 1 is turned on, control operation of the ECU 30 is started.

Next, the surface temperature sensor 31 will be now described in detail. In the first embodiment, the surface temperature sensor 31 is an infrared sensor which detects a surface temperature of a detection subject in a non-contact state. Specifically, the surface temperature sensor 31 uses thermopile detection elements, which generates electrical power in proportion to an infrared amount, in accordance with an infrared amount variation due to a temperature variation of the detection subject.

Figure 2:
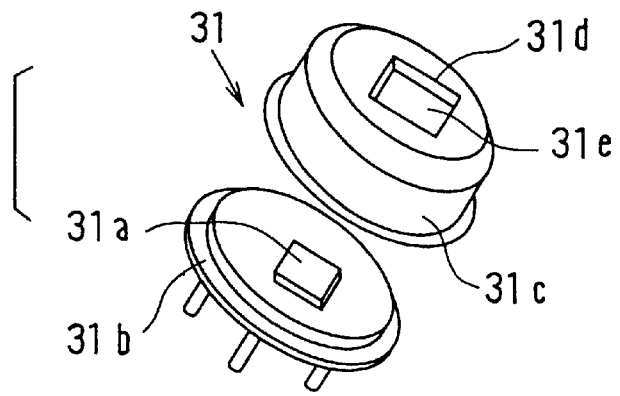
FIG. 2 is a disassembled perspective view of a surface temperature sensor according to the first embodiment.
Figure 3:
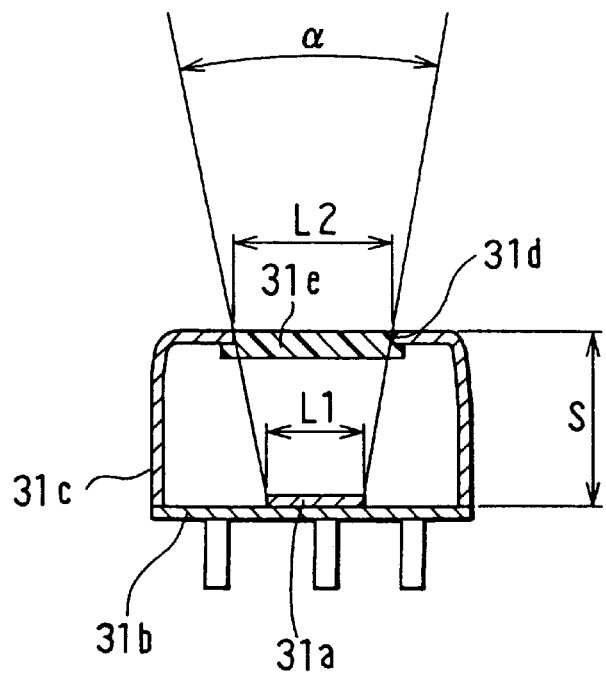
FIG. 3 is a sectional view of the surface temperature sensor according to the first embodiment.

As shown in FIGS. 2, 3, the surface temperature sensor 31 includes a four-sided detection portion (detection element) 31a for detecting infrared rays. The detection portion 31a is disposed on a base plate 31b, and is covered by a cup-like metal case 31c. A four-sided opening 31d is opened in a bottom portion of the case 31c, and a silicon cover 31e is inserted into the opening 31d. By suitably setting a side length L1 of the detection portion 31a, a side length L2 of the opening 31d and a distance S between the detection portion 31a and the opening 31a, a detectable angle α can be adjusted as shown in FIG. 3.

Figure 4:
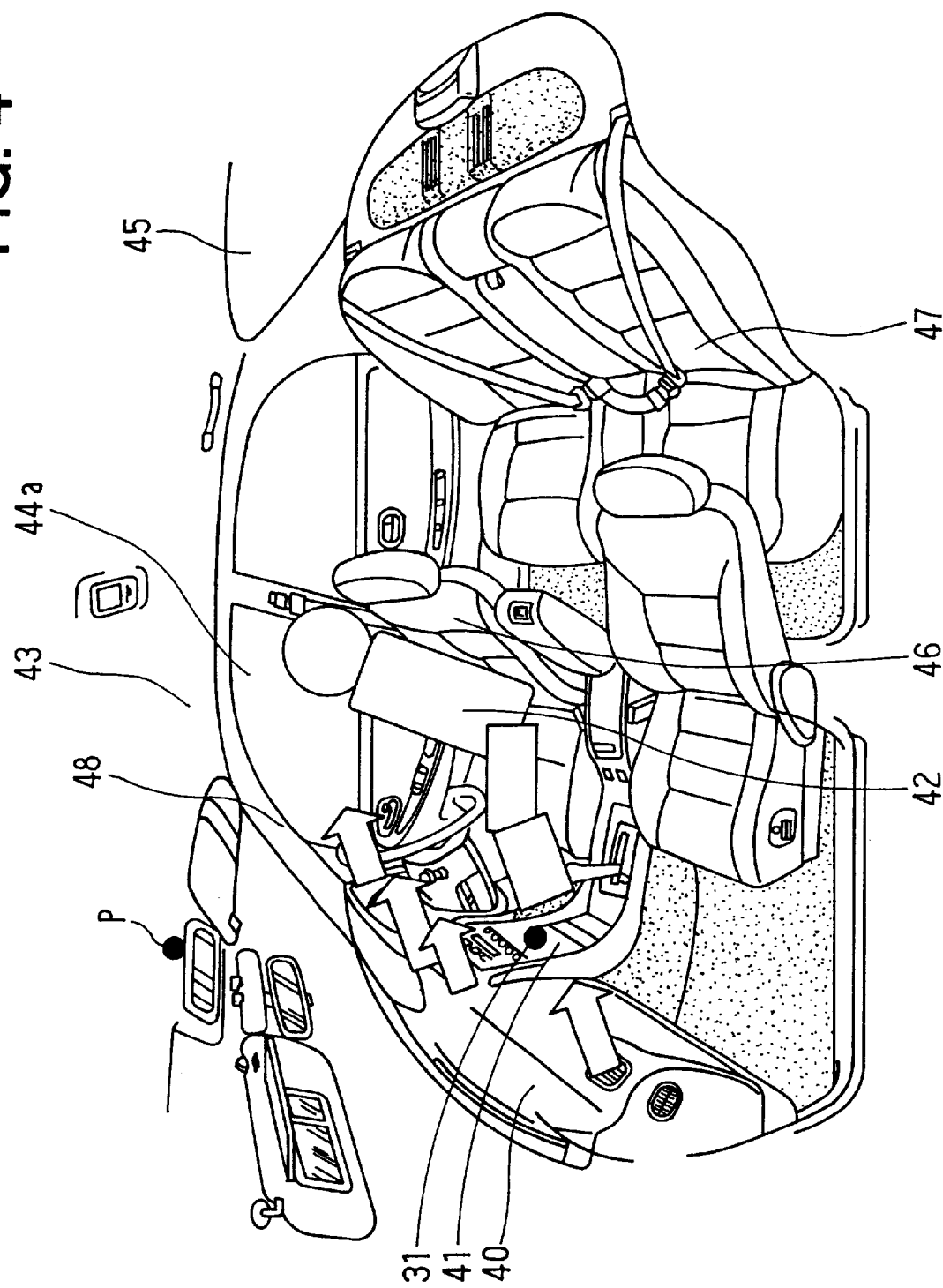
FIG. 4 is a perspective view of a passenger compartment, showing an attachment position of the surface temperature sensor, according to the first embodiment.
Figure 5:
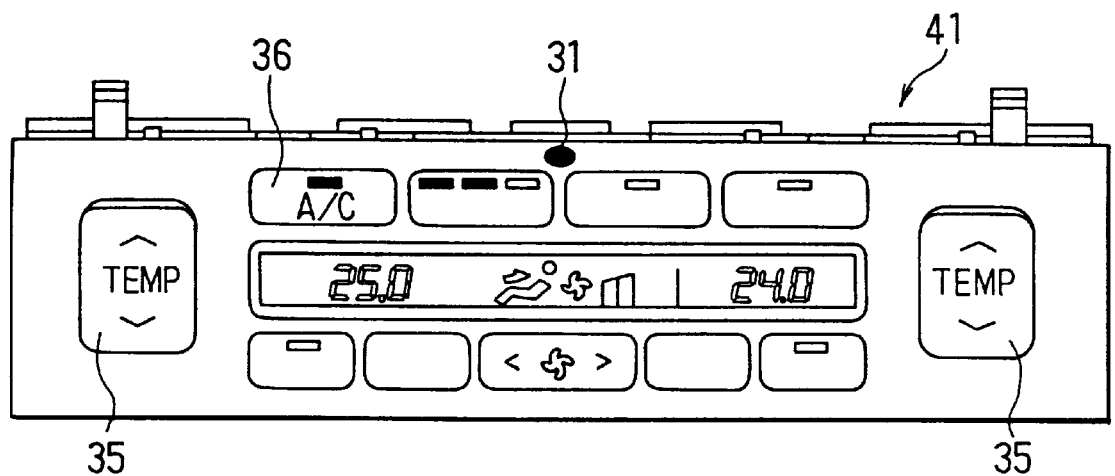
FIG. 5 is an enlarged front view of an air-conditioning operation panel according to the first embodiment.

FIGS. 4 and 5 show an arrangement position of the surface temperature sensor 31. An operation panel 41 of the vehicle air conditioner 1, shown in FIG. 5, is disposed at an approximate center of an instrument panel 40 shown in FIG. 4 in a vehicle right-left direction. The surface temperature sensor 31 is provided on the operation panel 41 together with the temperature setting unit 35 and the operation switch 36, as shown in FIG. 5. The surface temperature sensor 31 is disposed at a position in a vehicle up-down direction, approximately equal to the belly or the chest of a driver 42.

Figure 6:
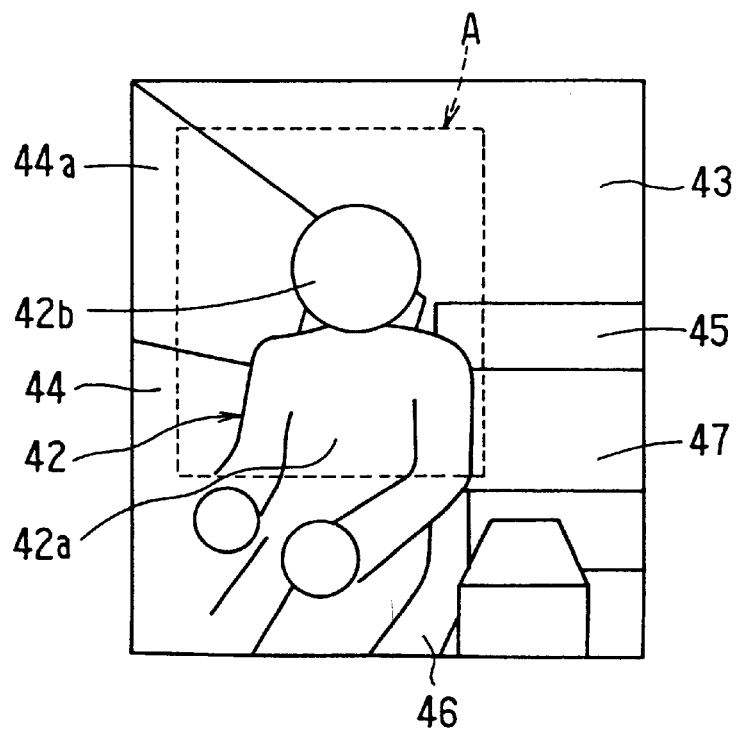
FIG. 6 is a schematic perspective view of a passenger compartment, showing a detection range of the surface temperature sensor, according to the first embodiment.

FIG. 6 shows a surface temperature detectable area of the surface temperature sensor 31. For detecting a surface temperature in a detection range A shown by the chain line in FIG. 6, the surface temperature sensor 31 is disposed on the operation panel 41 to be inclined toward the driver 42 and to be slightly inclined upwardly, and the detectable angle a is further suitably adjusted. The detection range A includes the upper body (clothed portion) 42a of the driver 42, the head portion 42b of the driver 42, a part of a ceiling 43, a part of side windshield 44a of a front door 44 and a part of rear glass 45. In FIG. 6, a front seat 46 and a rear seat 47 are also indicated.

Among the detection range A, the ceiling 43 is not affected by sunlight, and is hardly affected with the outside air temperature Tam due to a heat-insulating material of the ceiling 43. Therefore, a surface temperature of the ceiling 43 is changed to approximately correspond to the inside air temperature. A surface temperature of the side windshield 44a or the rear glass 45 among the detection range A is mainly changed in accordance with the inside air temperature and the outside air temperature. A surface temperature of the upper body 42a is changed in accordance with a sunlight amount. Thus, the surface temperature sensor 31 outputs a surface temperature signal relative to an environment condition such as the inside air temperature, the outside air temperature and the sunlight amount. Because a surface temperature of the seats 46, 47 is changed by sunlight, the seats 46, 47 may be added in the detection range A.

Figure 7:
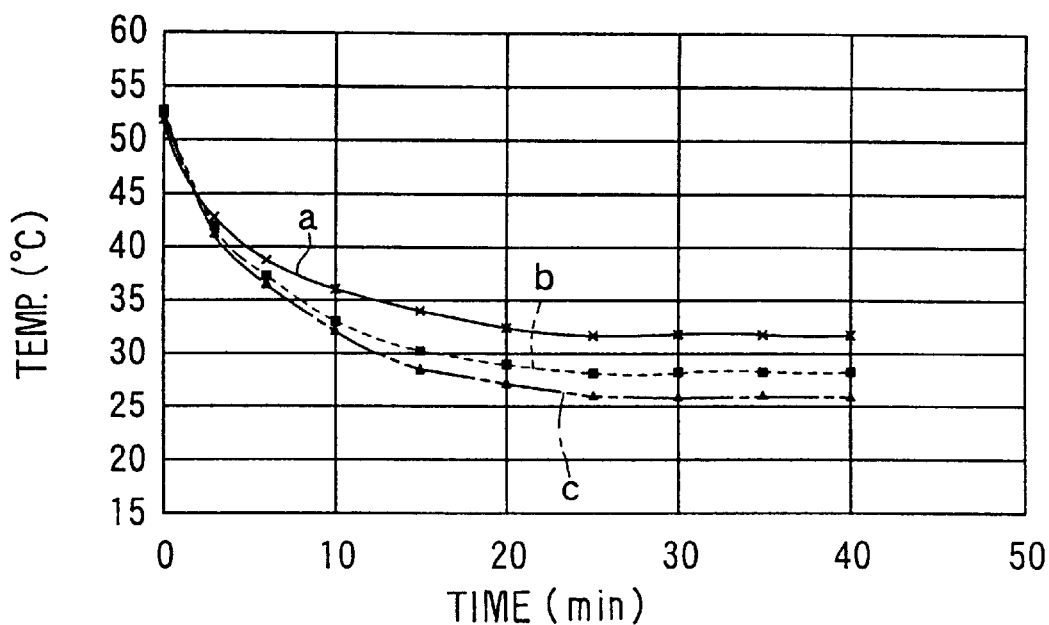
FIG. 7 is a characteristic view when a cool-down operation is performed, according to the first embodiment.

FIG. 7 is a characteristic graph when a cooling (cool down) is performed, in a condition where the outside air temperature is 30° C., the sunlight amount is 580 W/m² and an inside air temperature at the front seat side in an initial time is 53° C. In FIG. 7, graph "a" shows the output temperature from the surface temperature sensor 31 which is set to detect the surface temperature in the detection range A of FIG. 6, graph "b" shows the temperature of the ceiling 43, and graph "c" shows the inside air temperature at the front seat side. As shown in FIG. 7, the temperature of the ceiling 43 is hardly affected by the sunlight or the outside air temperature, and approximately corresponds to the inside air temperature at the front seat side. On the other hand, because the surface temperature sensor 31 detects the surface temperature of the detection range A, including the environment condition such as the sunlight amount and the outside air temperature, the surface temperature sensor 31 outputs a signal of temperature higher than the temperature of the ceiling 43 and the inside air temperature at the front seat side.

Figure 8:
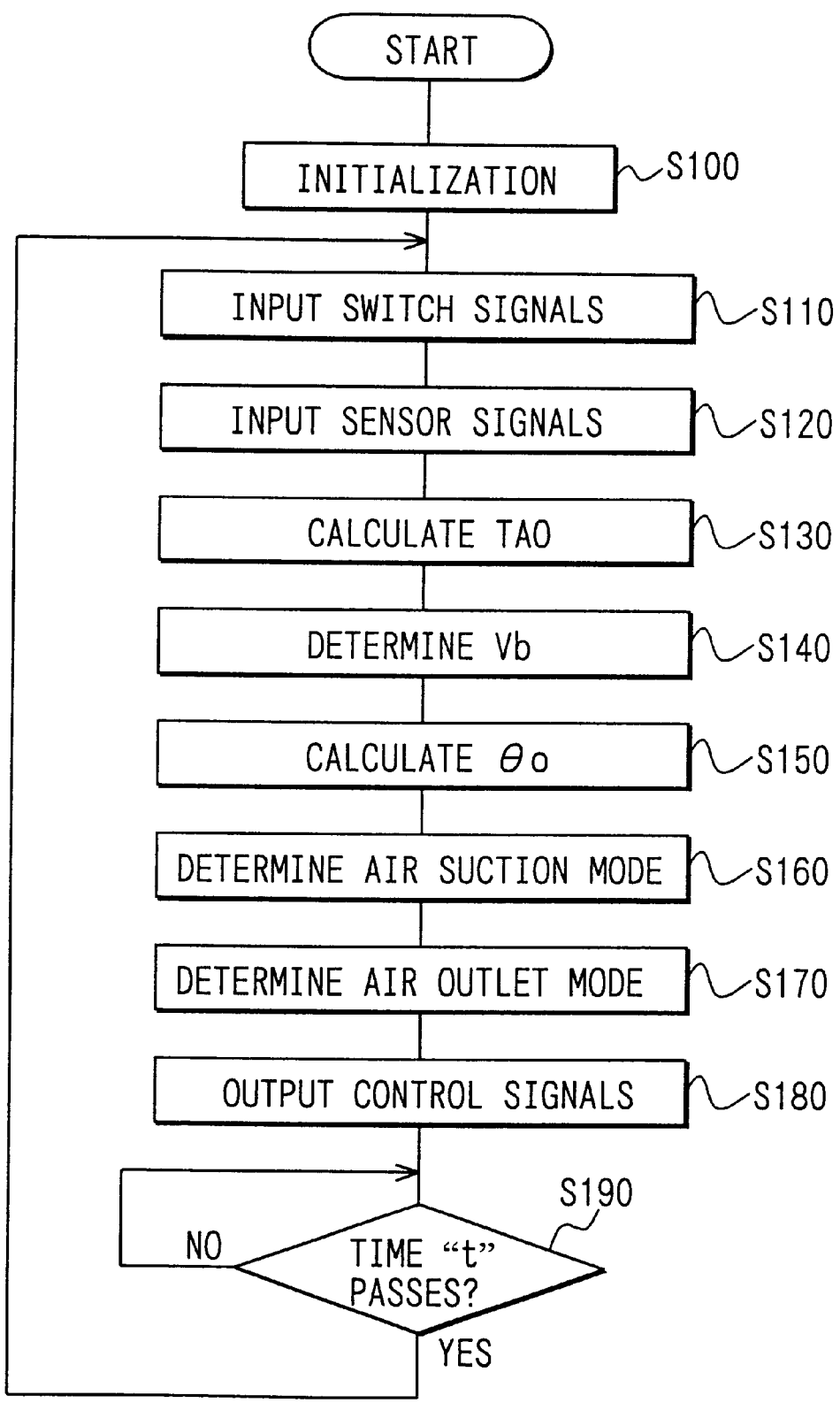
FIG. 8 is a flow diagram showing a control process of ECU of the vehicle air conditioner, according to the first embodiment.

Next, air-conditioning control operation of the ECU 30 according to the first embodiment of the present invention will be now described. As shown in FIG. 8, firstly, an initialization is performed at step S100 when the control operation of the ECU 30 starts. Next, the set temperature Tset is input through the temperature setting unit 35 at step S110, and signals from the sensors 31–34 are input at step S120. That is, at step S120, the surface temperature Tir detected by the surface temperature sensor 31 and signals from the sensors 32–34 are input.

At step S130, a target temperature (TAO) of air blown into the passenger compartment is calculated based on the Tset input at step S110 and the surface temperature Tir input at step S120, in accordance with the following formula (1) stored beforehand in the ROM 30b.

$$TAO = Kset \times Tset - Kir \times Tir + C \quad (1)$$

Wherein, Kset and Kir are coefficients, and C is a correction constant.

Figure 9:
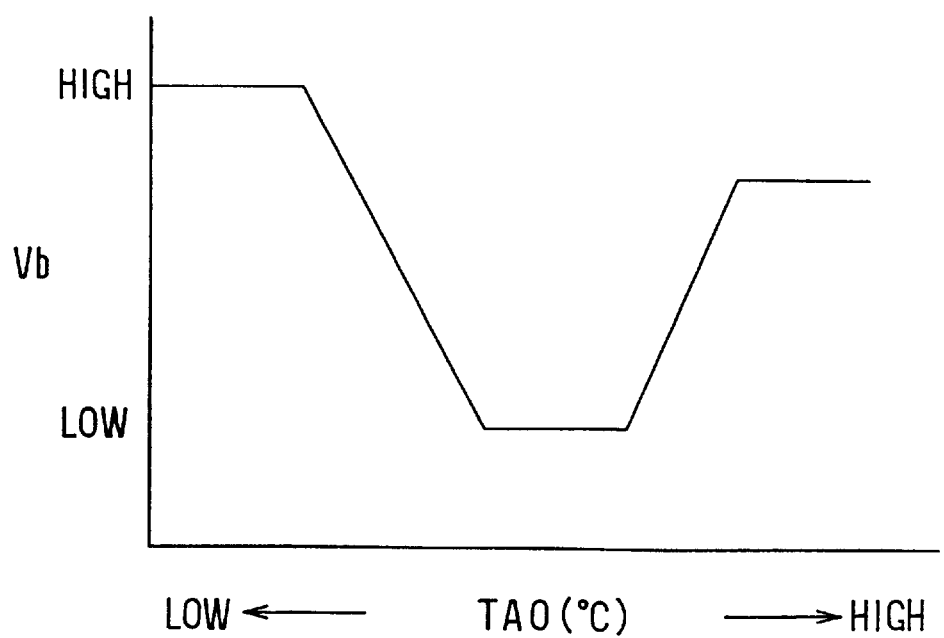
FIG. 9 is a characteristic view showing the relationship between a blower voltage and a target air temperature TAO, according to the first embodiment.

Next, at step S140, a blower voltage Vb, applied to the blower motor 23, corresponding to a target air amount, is determined based on the target temperature TAO calculated at step S130 in accordance with the characteristic graph of FIG. 9 beforehand stored in the ROM 30b.

Next, at step S150, a target opening degree θo of the air mixing damper 13 is calculated by using the following formula (2) beforehand stored in the ROM 30b, based on the target temperature TAO calculated at step S130, the water temperature Tw of the engine-cooling water and the evaporator outlet temperature Te of air immediately from the evaporator 11.

$$\theta o = [(TAO - Te)/(Tw - Te)] \times 100 \quad (2)$$

The water temperature Tw of the engine-cooling water is input from the water temperature sensor 32, and the outlet temperature Te of air immediately from the evaporator 11 is input from the post-evaporator temperature sensor 33.

Figure 10:
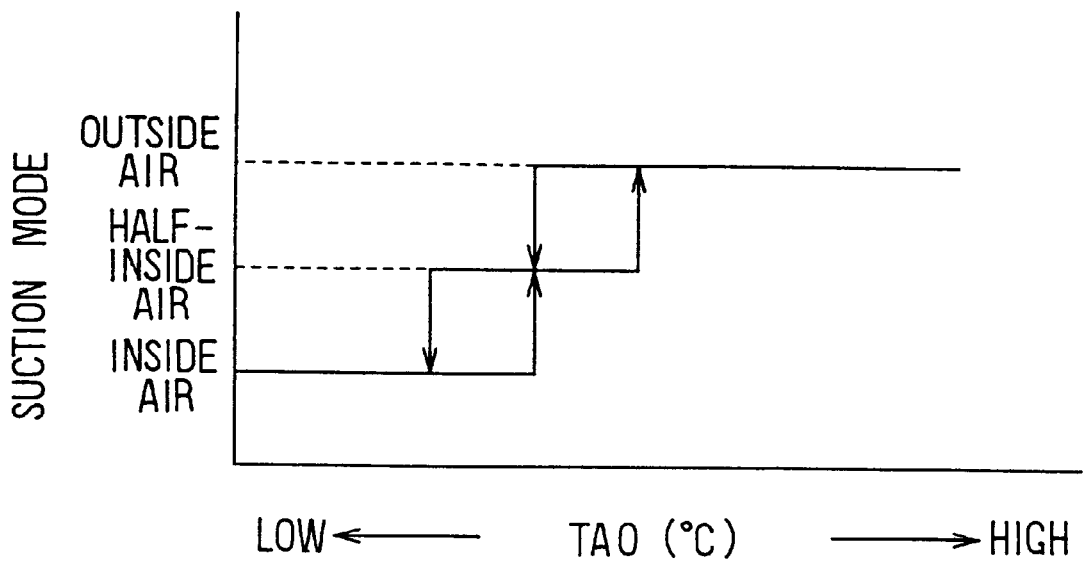
FIG. 10 is a characteristic view showing the relationship between an air suction mode and the target air temperature TAO, according to the first embodiment.
Figure 11:
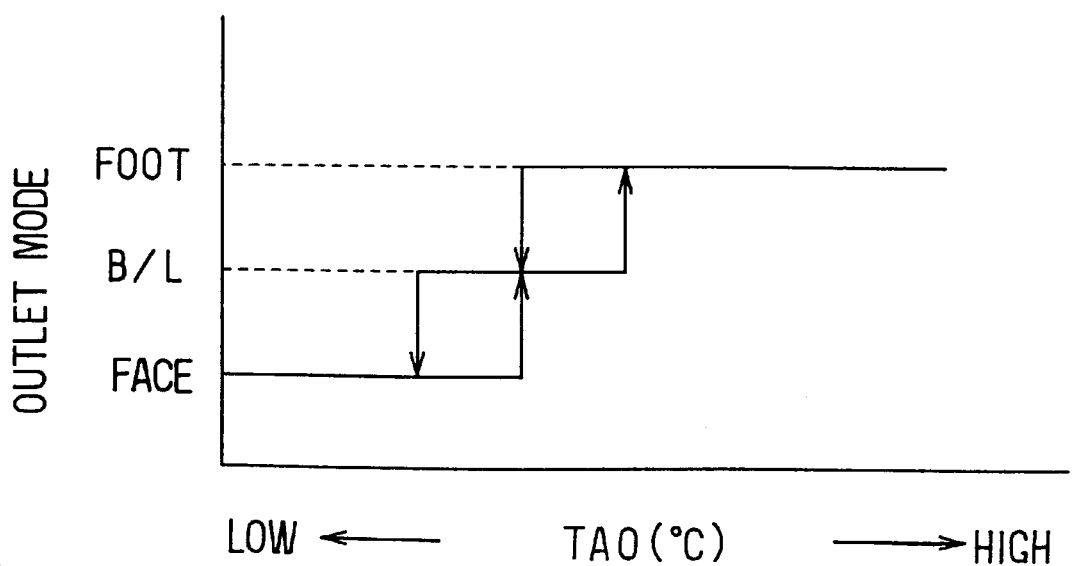
FIG. 11 is a characteristic view showing the relationship between an air outlet mode and the target air temperature TAO, according to the first embodiment.

Next, at step S160, the air suction mode is determined based on the target temperature TAO of blown air in accordance with the characteristic view of FIG. 10 beforehand stored in the ROM 30b. That is, as shown in FIG. 10, as the air suction mode, an outside air mode, a half-inside air mode or an inside air mode is selected based on the target temperature TAO. At step S170, an air outlet mode is determined based on the target temperature TAO of blown air in accordance with the characteristic view of FIG. 11 beforehand stored in the ROM 30b. That is, as shown in FIG. 11, as the air outlet mode, a face mode (FACE), a bi-level mode (B/L) or a foot mode (FOOT) is selected based on the target temperature TAO.

Next, at step S180, control signals corresponding to the calculation results at steps S140–S170 are output to the driving circuit 21, the servomotor 25, the servomotor 19 and the servomotor 27, respectively. Next, at step S190, it is determined whether or not a predetermined time "t" passes. After the predetermined time passes, the control routine returns at step S110.

According to the first embodiment of the present invention, the surface temperature sensor 31 detects the surface temperature of the detection range A including: the ceiling 43 in which the surface temperature is changed to approximately correspond to the inside air temperature, the side windshield 44a and the rear glass 45 in which the surface temperature is changed by the outside air temperature, and the upper body portion 42a in which the surface temperature is changed by the sunlight. Therefore, the surface temperature sensor 31 output the surface temperature signal including the environment conditions such as the inside air temperature, the outside air temperature, and the sunlight amount. Thus, by the surface temperature sensor 31, the temperature of the passenger compartment can be controlled suitably to correspond to the inside air temperature, the outside air temperature and the sunlight amount. As a result, the temperature of the passenger compartment can be accurately controlled without additionally using an inside air temperature sensor, an outside air temperature sensor and a sunlight sensor.

Further, the target temperature TAO can be simply calculated based on the simple formula (1) without using an inside air temperature sensor, an outside air temperature sensor and a sunlight sensor. Further, the target temperature TAO calculated in the formula (1) is approximate equal to a comparison target temperature calculated using the inside air temperature sensor, the outside air temperature sensor and the sunlight-sensor. Therefore, the characteristic graphs shown in FIGS. 9–11 can be readily set.

Figure 12:
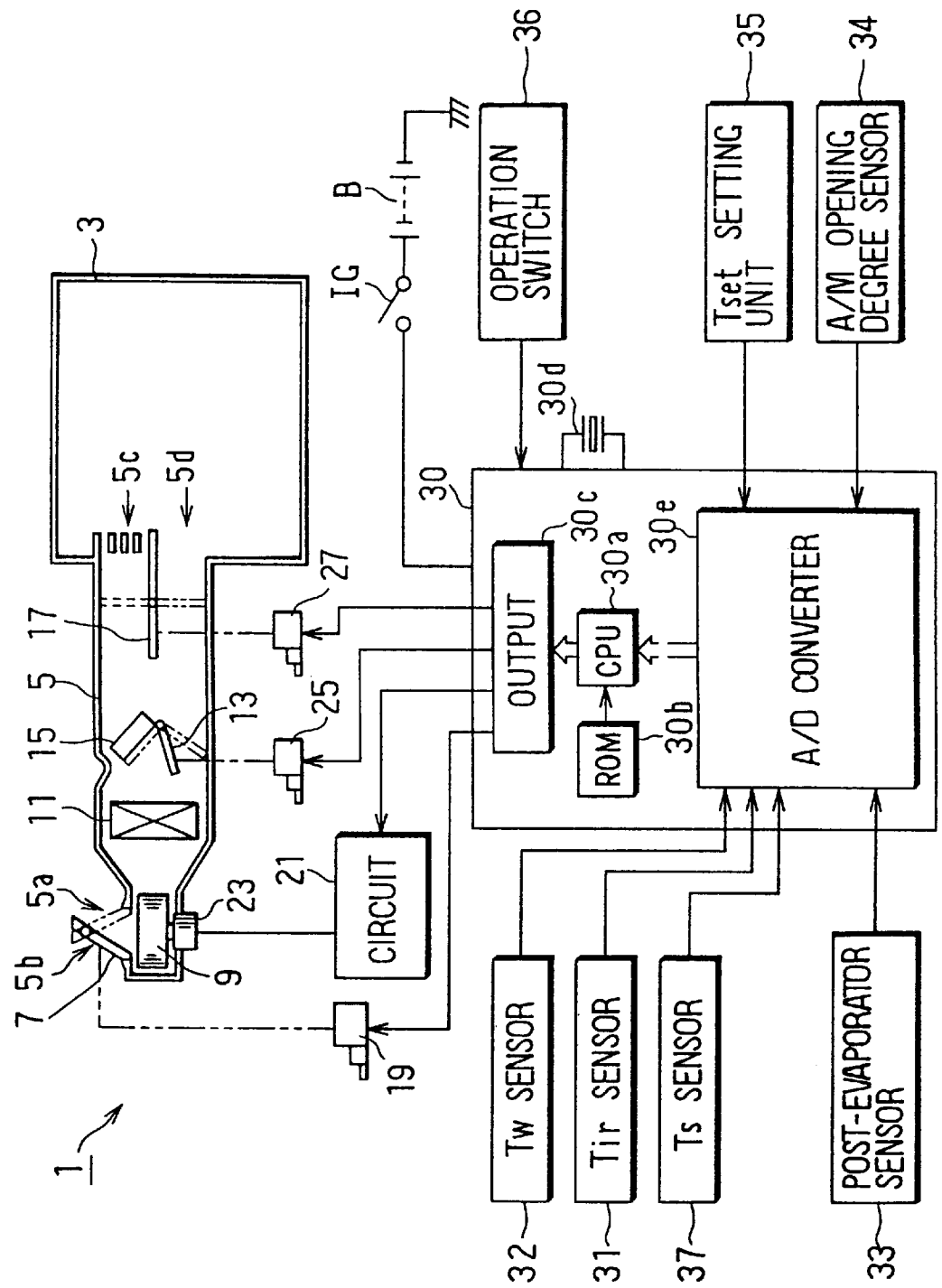
FIG. 12 is a schematic view showing an entire structure of a vehicle air conditioner according to a second preferred embodiment of the present invention.

A second preferred embodiment of the present invention will be now described with reference to FIG. 12. In the second embodiment, a sunlight sensor 37 for detecting a sunlight amount Ts entering into the passenger compartment 3 is added as compared with the above-described first embodiment. With the addition of the sunlight sensor 37, the detectable angle α of the surface temperature sensor 31 is adjusted so that the detection range of the surface temperature sensor 31 is restricted to the ceiling 43 (inside air corresponding position), and both the side glass 44a and the rear glass 45 (outside air corresponding position). Thus, the surface temperature sensor 31 outputs a surface temperature signal relative to an environment condition of the inside air temperature and the outside air temperature. Accordingly, the target temperature (TAO) of air blown into the passenger compartment is calculated based on the set temperature Tset, the surface temperature Tir and the sunlight amount Ts, in accordance with the following formula (3) stored beforehand in the ROM 30b.

$$TAO = Kset \times Tset - Kir1 \times Tir - Ks \times Ts + C \quad (3)$$

Wherein, Kset, Kir1 and Ks are coefficients, and C is a correction constant. Here, since the correction of the sunlight amount Ts is added in the formula (3), the coefficient Kir1 is smaller than Kir described in the above-described first embodiment.

According to the second embodiment of the present invention, the surface temperature sensor 31 detects the surface temperature of the detection range including: the ceiling 43 in which the surface temperature is changed to approximately correspond to the inside air temperature, and the side windshield 44a and the rear glass 45 in which the surface temperature is changed by the outside air temperature. Therefore, the surface temperature sensor 31 outputs the surface temperature signal including the environment conditions of the inside air temperature and the outside air temperature. Thus, based on signals from the sunlight sensor 37 and the surface temperature sensor 31, the temperature of the passenger compartment 3 can be suitably controlled to correspond to the inside air temperature, the outside air temperature and the sunlight amount. As a result, the temperature of the passenger compartment can be accurately controlled without using an outside air temperature sensor and an inside air temperature sensor.

Further, in the second embodiment, because the sunlight sensor 37 is provided, heat load due to the sunlight can be accurately detected, and temperature control performance of the passenger compartment 3 is improved. Thus, when sunlight enters to a passenger during a face mode in a cooling operation, the amount of cool air is increased so that air-conditioning performance for the passenger is improved.

Figure 13:
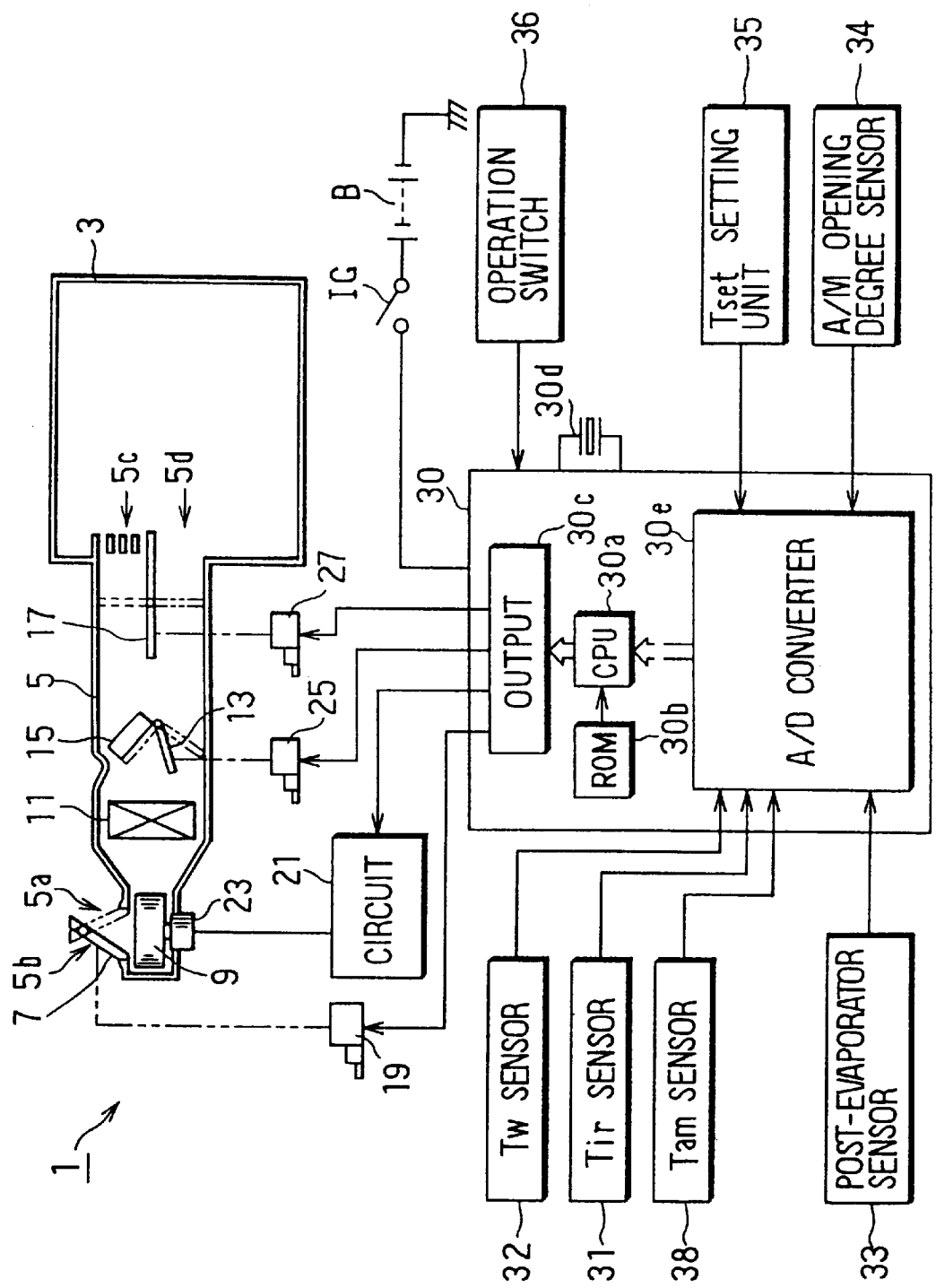
FIG. 13 is a schematic view showing an entire structure of a vehicle air conditioner according to a third preferred embodiment of the present invention.

A third preferred embodiment of the present invention will be now described with reference to FIG. 13. In the third embodiment, an outside air temperature sensor 38 for detecting an outside air temperature Tam is added as compared with the above-described first embodiment. With the addition of the outside air temperature sensor 38, the detectable angle α of the surface temperature sensor 31 is adjusted so that the detection range of the surface temperature sensor 31 is restricted to the ceiling 43 (inside air corresponding position), and the upper body part (sunlight corresponding position) 42a. Thus, the surface temperature sensor 31 outputs a surface temperature signal relative to an environment condition of the inside air temperature and the sunlight amount. Accordingly, the target temperature (TAO) of air blown into the passenger compartment 3 is calculated based on the set temperature Tset, the surface temperature Tir and the outside air temperature Tam, in accordance with the following formula (4) stored beforehand in the ROM 30b.

$$TAO=Kset \times Tset - Kir2 \times Tir - Kam \times Tam + C \tag{4}$$

Wherein, Kset, Kir2 and Kam are coefficients, and C is a correction constant. Here, the coefficient Kir2 is set smaller than Kir described in the above-described first embodiment.

According to the third embodiment of the present invention, the surface temperature sensor 31 detects the surface temperature of the detection range including: the ceiling 43 in which the surface temperature is changed to approximately correspond to the inside air temperature, and the upper body part 42a in which the surface temperature is changed by the sunlight. Therefore, the surface temperature sensor 31 outputs the surface temperature signal including the environment conditions of the inside air temperature and the sunlight amount. Thus, based on signals from the outside air temperature sensor 38 and the surface temperature sensor 31, the temperature of the passenger compartment 3 can be suitably controlled to correspond to the inside air temperature, the outside air temperature and the sunlight amount. As a result, the temperature of the passenger compartment can be accurately controlled without using an inside air temperature sensor and a sunlight sensor.

Further, in the third embodiment, because the outside air sensor 38 is provided, heat load due to the outside air temperature can be accurately detected, and temperature control performance of the passenger compartment 3 is improved. Thus, when the heat load due to the outside air temperature is small, the air temperature blown out from the evaporator 11 is set higher. In this case, an operation time ratio or a discharged refrigerant amount of a refrigerant compressor is made smaller, and operation load of the refrigerant compressor can be made smaller.

Figure 14:
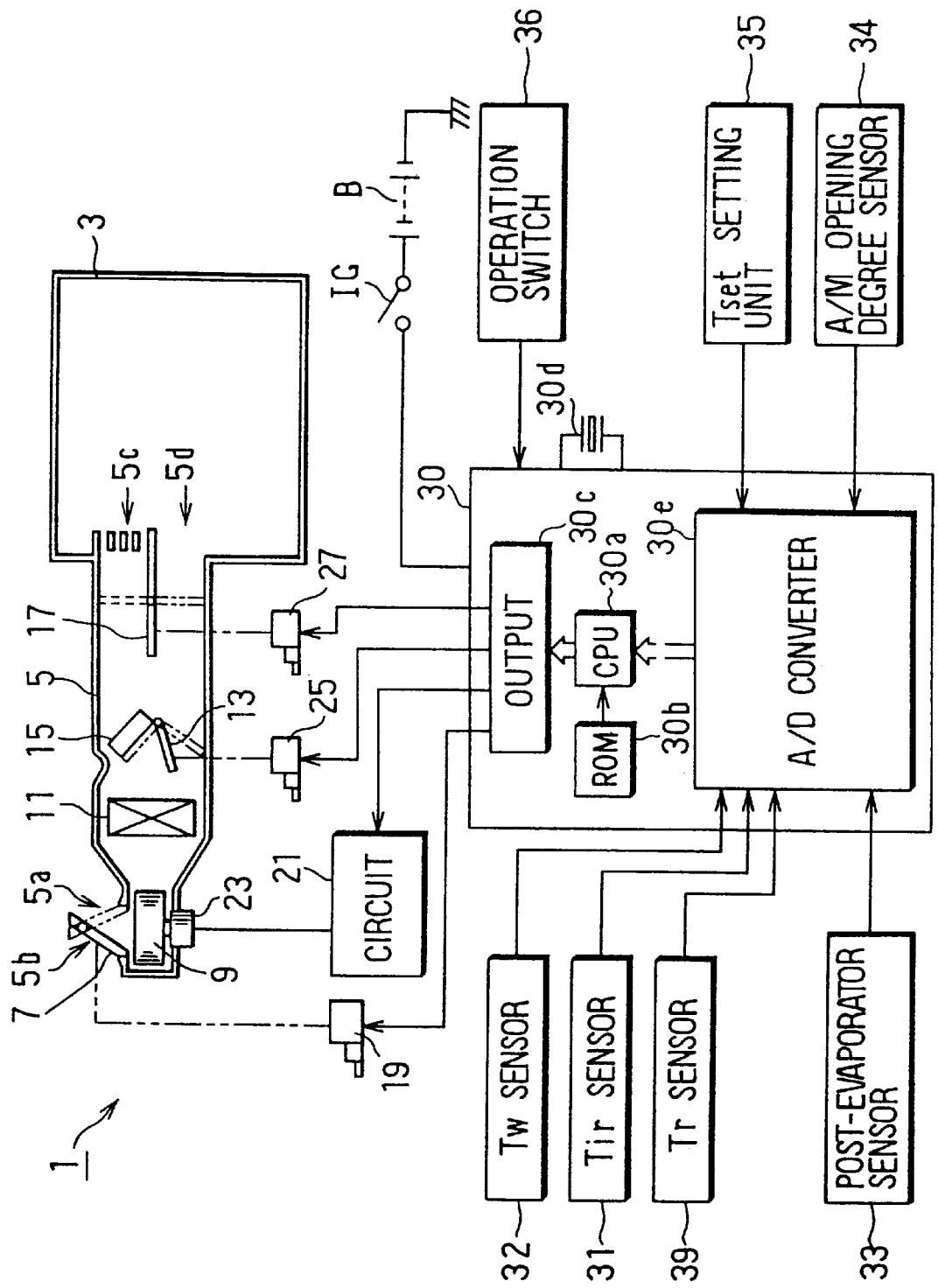
FIG. 14 is a schematic view showing an entire structure of a vehicle air conditioner according to a fourth preferred embodiment of the present invention.
Figure 15:
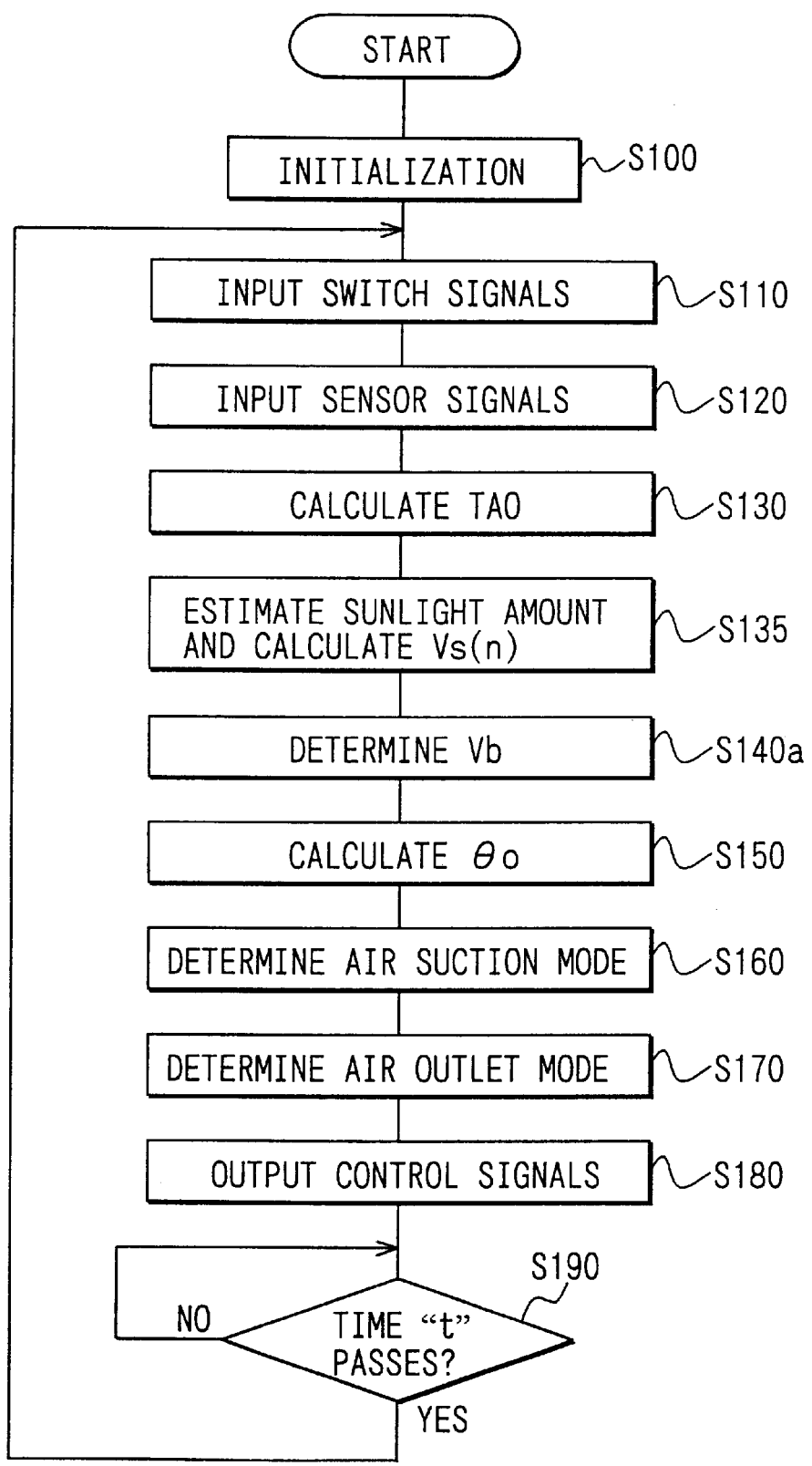
FIG. 15 is a flow diagram showing a control process of ECU of the vehicle air conditioner, according to the fourth embodiment.

A fourth preferred embodiment of the present invention will be now described with reference to FIGS. 14–17. In the fourth embodiment, as shown in FIG. 14, an inside air temperature sensor 39 for detecting an inside air temperature Tr is added as compared with the above-described first embodiment. Further, as shown in FIG. 15, step 135 is added as compared with the above-described first embodiment. At step S135 in FIG. 15, a variation degree of the sunlight amount is estimated by a comparison between the inside air temperature Tr and the surface temperature Tir, and a correction amount of blown air is calculated based the estimated sunlight amount. That is, the correction amount of blown air is calculated based on the inside air temperature Tr and the surface temperature Tir. With the addition of the inside air temperature sensor 39, the detectable angle a of the surface temperature sensor 31 is adjusted so that the detection; range of the surface temperature sensor 31 is restricted to the side glass 44a and the rear glass (outside air corresponding position) 45, and the upper body part (sunlight, corresponding position) 42a. Thus, the surface temperature sensor 31 outputs a surface temperature signal relative to an environment condition of the outside air temperature and the sunlight amount. Thus, the target temperature (TAO) of air blown into the passenger compartment 3 is calculated based on the Tset, the surface temperature Tir and the inside air temperature Tr, in accordance with the following formula (5) stored beforehand in the ROM 30b.

$$TAO=Kset \times Tset - Kir3 \times Tir - Kr \times Tr + C \tag{4}$$

Wherein, Kset, Kir3 and Kr are coefficients, and C is a correction constant. Here, the coefficient Kir3 is set smaller than Kir described in the above-described first embodiment.

Figure 16:
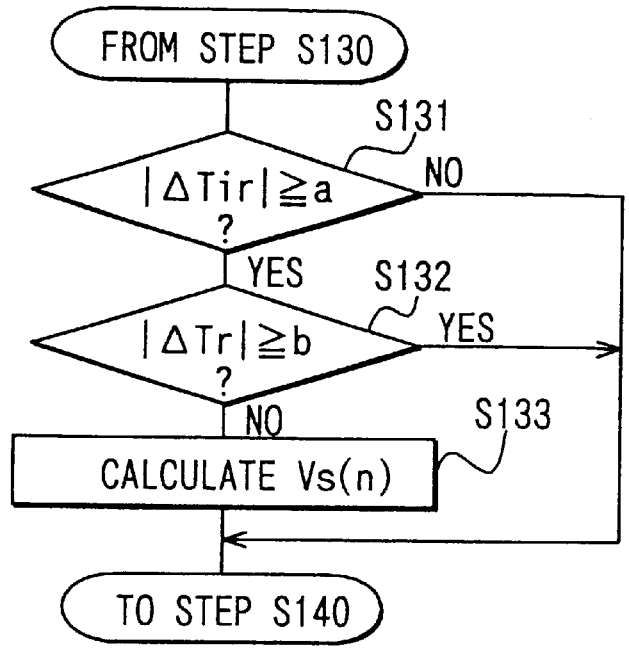
FIG. 16 is a flow diagram showing a detail control of step S135 in FIG. 15, according to the fourth embodiment.

Next, step S135 in FIG. 15 is described in detail with reference to FIG. 16. As shown in FIG. 16, when the control routine moves from step S130 in FIG. 15 to step S131 in FIG. 16, it is determined whether or not the surface temperature Tir is changed more than a predetermined value during a predetermined time (i.e., |ΔTir|≧a) at step S131. That is, as shown by the following formula (6), the absolute value of |ΔTir| is the absolute value of a difference between a surface temperature Tir(n) at a sample time "n" and a surface temperature Tir (n−1) before one of the sample time "n". Therefore, at step S131, it is determined whether or not the absolute value |Tir(n)−Tir(n−1)| is equal to or larger than a predetermined value "a".

$$|Tir(n)-Tir(n-1)| \geq a \tag{6}$$

When the absolute value of |Tir(n)−Tir(n−1)| is smaller than the predetermined value "a" at step S131, control routine moves to step S140. On the other hand, when the absolute value of |Tir(n)−Tir(n−1)| is equal to or larger than the predetermined value "a" at step S131, it is determined whether or not the inside air temperature Tr is changed more than a predetermined value during a predetermined time (i.e., |ΔTr|≧b) at step S132. That is, as shown by the following formula (7), the absolute value of |ΔTr| is the absolute value of a difference between an inside air temperature Tr(n) at a time "n" and an inside air temperature Tr (n−1) before one of the time "n". Therefore, at step S132, it is determined whether or not the absolute value |Tr(n)−Tr(n−1)| is equal to or larger than a predetermined value "b".

$$|Tr(n)-Tr(n-1)| \geq b \tag{7}$$

When the absolute value of |Tr(n)–Tr(n–1)| is equal to or larger than the predetermined value "b" at step S132, control routine moves to step S140. That is, in this case, because both the surface temperature Tir and the inside air temperature Tr are greatly changed, the surface temperature variation due to a sunlight amount variation can be omitted. On the other hand, when the absolute value of |Tr(n)–Tr(n–1)| is smaller than the predetermined value "b" at step S132, it is in a case where the inside air temperature Tr is changed slightly relative to a large variation of the surface temperature Tir. Therefore, it is determined that the variation of the surface temperature Tir is mainly relative to the sunlight variation. Thus, at step S133, a blower voltage Vs(n) due to the sunlight variation is calculated.

Figure 17:
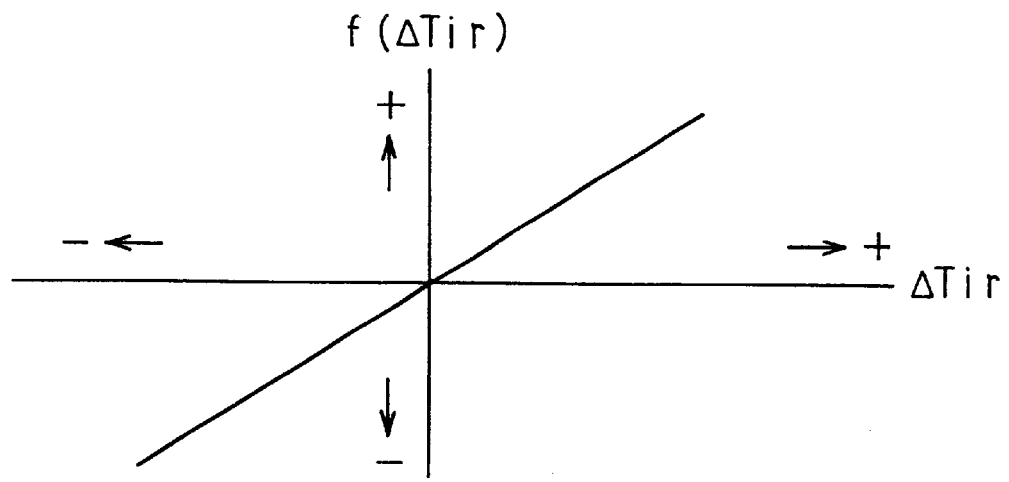
FIG. 17 is a characteristic view showing the relationship between a variation amount of a surface temperature and a correction amount of a blower voltage, according to the fourth embodiment.

At step S133, a correction amount f(ΔTir) of the blower voltage (air amount) is determined based on the variation amount ΔTir of the surface temperature Tir in accordance with the characteristic view shown in FIG. 17 beforehand stored in ROM 30b. The ΔTir is obtained by the following; formula (8).

$$\Delta Tir = Tir(n) - Tir(n-1) \tag{8}$$

here, the correction amount f(ΔTir) has a plus value when the variation amount ΔTir has a plus value, and the correction amount f(ΔTir) has a minus value when the variation, amount ΔTir has a minus value.

Next, as shown by the following formula (9), a first blower voltage Vs(n) at time "n" corresponding to a target air amount, in which the sunlight is considered, is calculated based on the preceding first blower voltage Vs(n–1) and the correction amount f(ΔTir).

$$Vs(n) = Vs(n-1) + f(\Delta Tir) \tag{9}$$

Next, at step S140a, the first blower voltage Vs(n) is compared with a second blower voltage Vtao which is calculated based on the target temperature TAO in accordance with the characteristic view of FIG. 9, and a blower voltage Vb is determined based on the following formula (10).

$$Vb = MAX[Vs(n), Vtao] \tag{10}$$

That is, the blower voltage Vb is a larger one between the first blower voltage Vs(n) and the second blower voltage Vtao. When the surface temperature Tir is increased and the first blower voltage Vs(n) becomes larger than the second blower voltage Vtao [Vs(n)>Vtao], the air amount blown into the passenger compartment is increased so that air conditioning performance for a passenger compartment is improved.

According to the fourth embodiment of the present invention, the surface temperature sensor 31 detects the surface temperature of the detection range including: the side windshield 44a and the rear glass 45 in which the surface temperature is changed by the outside air temperature, and the upper body part 42a in which the surface temperature is changed by the sunlight. Therefore, the surface temperature sensor 31 outputs the surface temperature signal including the environment conditions of the outside air temperature and the sunlight amount. Thus, based on signals from the inside air temperature sensor 39 and the surface temperature sensor 31, the temperature of the passenger compartment 3 can be suitably controlled to correspond to the inside air temperature, the outside air temperature and the sunlight amount. As a result, the temperature of the passenger compartment can be accurately controlled without using an inside air temperature sensor and a sunlight sensor.

Further, in the fourth embodiment, because the inside air temperature sensor 39 is provided, a temperature different between the set temperature and the inside air temperature can be accurately detected, and temperature control performance of the passenger compartment 3 is improved.

Figure 18:
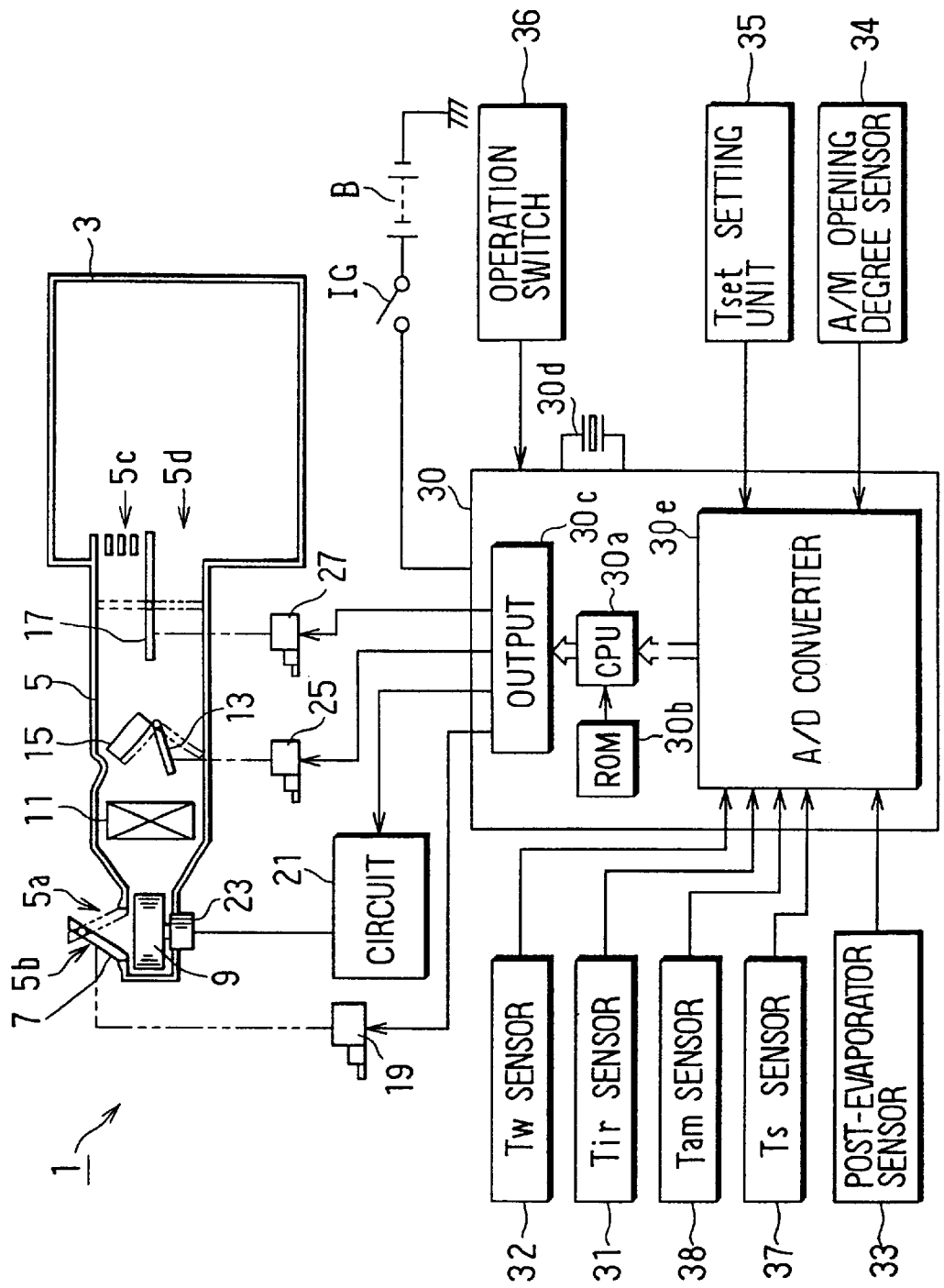
FIG. 18 is a schematic view showing an entire structure of a vehicle air conditioner according to a fifth preferred embodiment of the present invention.

A fifth preferred embodiment of the present invention will be now described with reference to FIG. 18. In the fifth embodiment, the sunlight sensor 37 and the outside air temperature sensor 38 are added as compared with the above-described first embodiment. With the addition of the sunlight sensor 37 and the outside air temperature sensor 38, the detectable angle α of the surface temperature sensor 31 is adjusted so that the detection range of the surface temperature sensor 31 is restricted to only the ceiling 43 (inside air corresponding position). Thus, the surface temperature sensor 31 outputs a surface temperature signal relative, to an environment condition of the inside air temperature. In the fifth embodiment, the target temperature (TAO) of air blown into the passenger compartment 3 is calculated based on the Tset, the surface temperature Tir, the outside air temperature Tam and the sunlight amount Ts, in accordance with the following formula (11) stored beforehand in the ROM 30b.

$$TAO = Kset \times Tset - Kir4 \times Tir - Kam \times Tam - Ks \times Ts + C \tag{11}$$

Wherein, Kset, Kir4, Kam and Ks are coefficients, and C is a correction constant. Here, the coefficient Kir4 is set smaller than Kir described in the above-described first embodiment.

According to the fifth embodiment of the present invention, the surface temperature sensor 31 detects the surface temperature of the detection range including the ceiling 43 in which the surface temperature is changed to approximately correspond to the inside air temperature. Therefore, the surface temperature sensor 31 outputs the surface temperature signal including the environment conditions of the inside air temperature, and the surface temperature detected by the surface temperature sensor 31 is hardly affected with heat from air blown from the air outlets and heat within the instrument panel. Thus, it is compared with a case where an inside air temperature sensor is provided within the instrument panel 40, an actual inside air temperature can be readily detected. As a result, the temperature of the passenger compartment can be accurately controlled without using an inside air temperature sensor.

Further, in the fifth embodiment, because the inside air temperature, the outside air temperature and the sunlight amount can be respectively accurately detected, the temperature of the passenger compartment can be accurately finely controlled in accordance with the inside air temperature, the outside air temperature and the sunlight amount.

Figure 19:
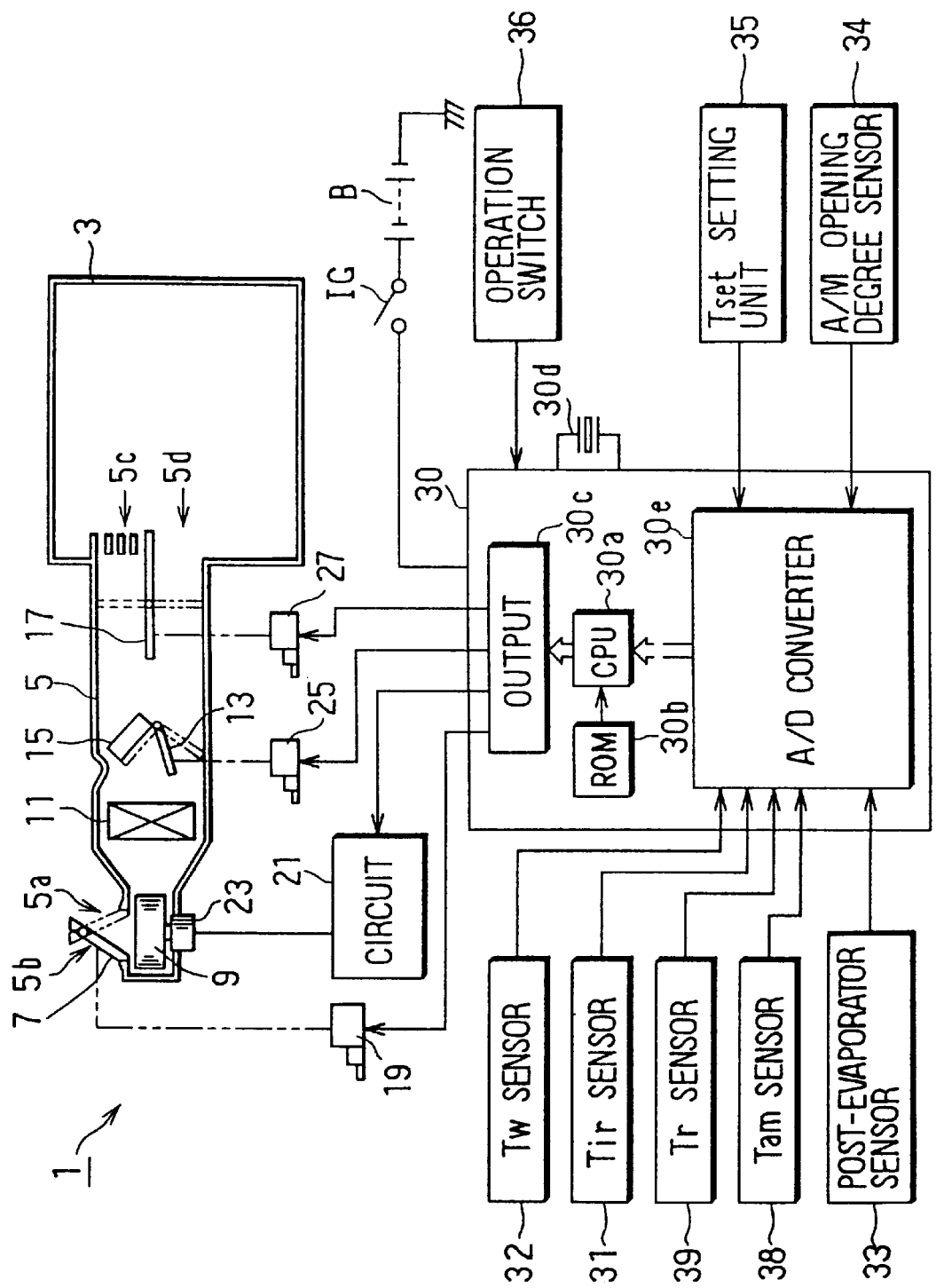
FIG. 19 is a schematic view showing an entire structure of a vehicle air conditioner according to a sixth preferred embodiment of the present invention.

A sixth preferred embodiment of the present invention will be now described with reference to FIG. 19. In the sixth embodiment, the outside air temperature sensor 38 and the inside air temperature sensor 39 are added as compared with the above-described first embodiment. With the addition of the outside air temperature sensor 38 and the inside air temperature sensor 39, the detectable angle α of the surface temperature sensor 31 is adjusted so that the detection range of the surface temperature sensor 31 is restricted to only the upper body part 42a (sunlight corresponding position). Thus, the surface temperature sensor 31 outputs a surface temperature signal corresponding to the sunlight amount. In the sixth embodiment, the target temperature (TAO) of air blown into the passenger compartment 3 is calculated based on the Tset, the surface temperature Tir, the outside air temperature Tam and the inside air temperature Tr, in accordance with the following formula (12) stored beforehand in the ROM 30b.

$$TAO=Kset\times Tset-Kir5\times Tir-Kam\times Tam-Kr\times Tr+C \qquad (12)$$

Wherein, Kset, Kir5, Kam and Kr are coefficients, and C is a correction constant. Here, the coefficient Kir5 is set smaller than Kir described in the above-described first embodiment.

In a case where a sunlight sensor is disposed on an upper surface of the instrument panel 40, sunlight may applied to the sunlight sensor while being not applied to the passenger 42. Therefore, in this case, the temperature control of the passenger compartment 3 is difficult to correspond to temperature feeling of the passenger 42.

According to the sixth embodiment of the present invention, the surface temperature sensor 31 detects the surface temperature of the upper body part 42a of the passenger 42. Therefore, it is possible to perform temperature control corresponding to the temperature feeling of the passenger 42. As a result, the temperature of the passenger compartment can be accurately controlled without using a sunlight sensor.

Further, in the sixth embodiment, because the inside air temperature, the outside air temperature and the sunlight amount can be respectively accurately detected, the temperature of the passenger compartment can be accurately finely controlled in accordance with the inside air temperature, the outside air temperature and the sunlight amount.

A seventh preferred embodiment of the present invention will be now described with reference to FIGS. 20–30. In the seventh embodiment, components similar to those in the above-described first embodiment are indicated with the same reference number. In the seventh embodiment, the surface temperature sensor 31 outputs the surface temperature signal including the environment conditions of the inside air temperature, the outside air temperature and the sunlight amount, similarly to the above-described first embodiment of the present invention. In the seventh embodiment, each area ratio of detection subjects (e.g., glass portion, clothed portion, seat portion, ceiling) to the detection range of the surface temperature sensor 31 is suitably set, so that temperature control performance of the passenger compartment is further improved.

Figures 20, 21:
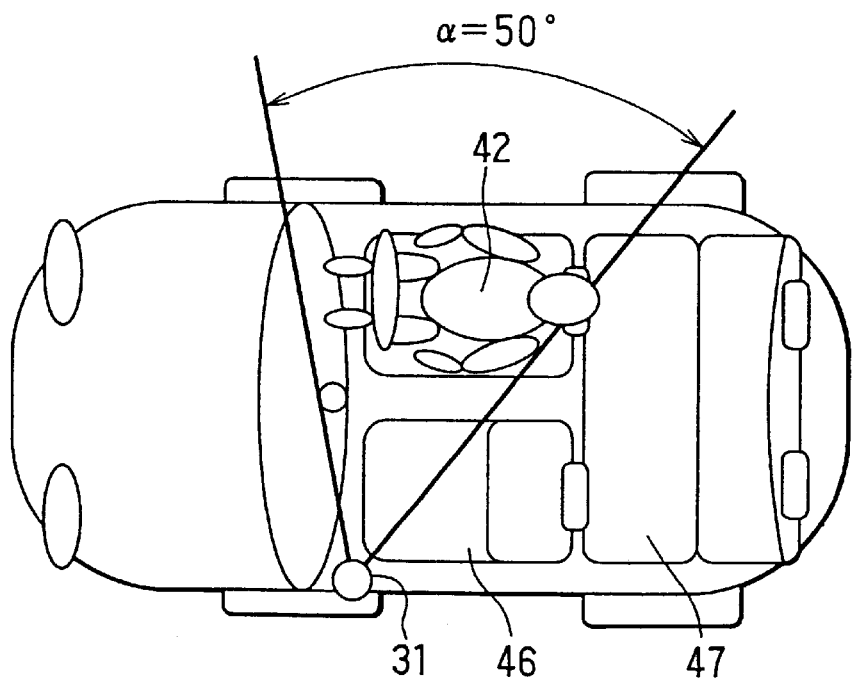
FIG. 20 is a view showing experimental results of temperature variation amounts of detection subjects, relative to variation amounts of heat load, according to a seventh preferred embodiment of the present invention.
FIG. 21 is a schematic plan view of a vehicle, showing an attachment position of a surface temperature sensor according to the seventh embodiment.

Next, the target area ratio of the detection subjects is described. First, for calculating the target area ratio, each temperature variation amount of the detection subjects (e.g., glass portion, clothed portion, seat portion, ceiling) is actually detected relative to each heat load variation amount. For example, the heat load variation amount includes the variation amount ΔTr of the inside air temperature Tr, the variation amount ΔTam of the outside air temperature Tam and the variation amount ΔTs of the sunlight amount Ts. FIG. 20 shows the detection result. As shown in FIG. 20, relative to the variation in the outside air temperature Tam, the temperature of the side windshield 44a (glass portion) is most remarkably changed. Relative to the variation of the sunlight amount Ts, temperatures of the side windshield 44a (glass portion), the upper body portion 42a (clothed portion) and the seat portion 46 are remarkably changed. Further, relative to the variation of the inside air temperature Tr, temperatures of the upper body portion 42a (clothed portion), the seat portion 46 and the ceiling 43 are remarkably changed.

In the seventh embodiment of the present invention, the target air temperature TAO is calculated in accordance with the formula (1) described above in the first embodiment (i.e., TAO=Kset×Tset−Kir×Tir+C). On the other hand, in a comparison example having an inside air temperature sensor, an outside air temperature sensor and a sunlight sensor, the target air temperature TAO is calculated in accordance with the following formula (13).

$$TAO=Kset\times Tset-Kr\times Tr-Kam\times Tam-Ks\times Ts+C \qquad (13)$$

When Kr=3, Kam=1.1, Ks=1.5 and Kir=3, the variation amount ΔTir of the surface temperature Tir is set to have the following relationship for obtain the same correction gain as the comparison example, relative to the variation amount ΔTr of the inside air temperature Tr, the variation amount ΔTam of the outside air temperature Tam and the variation amount ΔTs of the sunlight amount Ts. That is, the variation amount ΔTir of the surface temperature Tir is 10° C. relative to the inside-air temperature variation amount ΔTr of 10° C., the variation amount ΔTir of the surface temperature Tir is 3.7° C. relative to the outside-air temperature variation amount ΔTam of 10° C., and the variation amount ΔTir of the surface temperature Tir is 4.85° C. relative to the sunlight variation amount ΔTs of 582 W/m².

The target area ratio of the detection subjects can be calculated based on the relationship between each temperature variation amount of detection subjects and each heat load variation amount shown in FIG. 20, and the relationship between a target value of the variation amount ΔTir of the surface temperature Tir and each heat load variation amount. Specifically, the target area ratio of the side windshield 44a (glass portion) is 25%, the target area ratio of the upper body portion 42a (clothed portion) and the seat portion 46 is 35%, the target area ratio of the ceiling 43 is 20%, and the target area ratio of the other part is 20%. The other part includes a door inner lining, for example.

By setting each target area ratio of the detection subjects to the above-described ratios, the variation amount of the target temperature TAO relative to each heat load variation of the seventh embodiment can be set to be equal to that of the comparison example. Therefore, in the seventh embodiment, control performance of the passenger compartment, approximately equal to that the comparison example, can be obtained.

Figure 22:
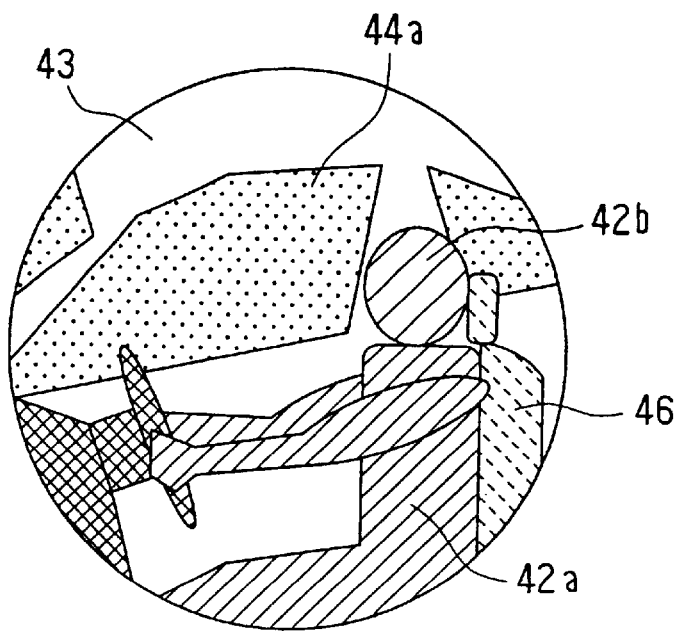
FIG. 22 is a view showing a detection range of the surface temperature sensor in FIG. 21.

For obtaining the above-described target area ratio of the detection subjects, the attachment position of the surface temperature sensor 31 is studied. In a first attachment position P-1 of the surface temperature sensor 31, the surface temperature sensor 31 is disposed at an approximate center of a front pillar in a vehicle up-down direction, on a front-passenger's seat side, as shown in FIG. 21. Further, in the first attachment position P-1, the surface temperature sensor 31 is disposed to be directed toward the driver's seat, and the detectable angle α is set at 50°. FIG. 22 shows a detachable range of the surface temperature sensor 31 in the first attachment position P-1. On the other hand, in a second attachment position P-2 of the surface temperature sensor 31, the surface temperature sensor 31 is disposed at a position of the operation panel 41, shown in FIGS. 4, 5. Here, the front pillar is a most front pillar of the vehicle, among pillars constructing the passenger compartment 3.

Figure 23:
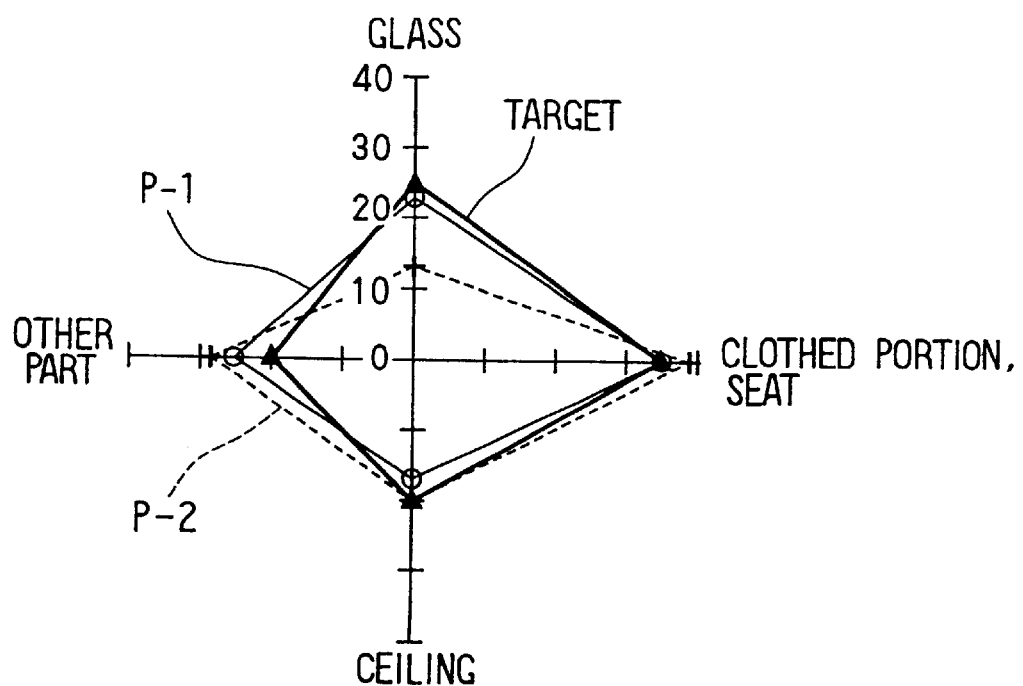
FIG. 23 is a view showing an area ratio of the detection subjects to the detection range, according to the seventh embodiment.
Figures 24, 25:
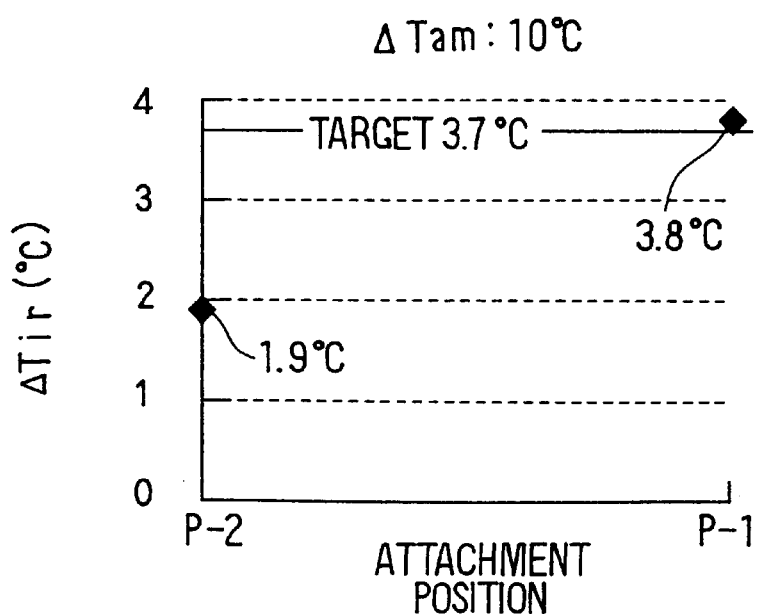
FIG. 24 is a view showing the area ratio of the detection subjects relative to the attachment position of the surface temperature sensor, according to the seventh embodiment.
FIG. 25 is a view showing the relationship between the attachment position of the surface temperature sensor, and a variation amount of the surface temperature relative to a variation amount of an outside air temperature, according to the seventh embodiment.

FIGS. 23, 24 show the target area ratio of each detection subject, the area ratio of each detection subject at the attachment position P-1 of the surface temperature sensor 31, and the area ratio of each detection subject at the attachment position P-2 of the surface temperature sensor 31. When the surface temperature sensor 31 is disposed at the attachment position P-1, the area ratio of the detection subjects is approximately equal to the target area ratio. On the other hand, when the surface temperature sensor 31 is disposed at the attachment position P-2, the area ratio of the glass portion is greatly insufficient.

Figure 26:
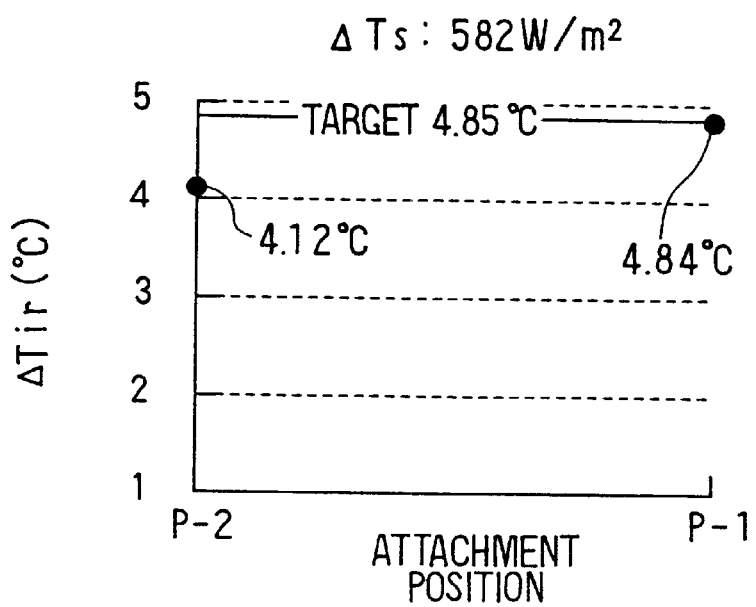
FIG. 26 is a view showing the relationship between the attachment position of the surface temperature sensor, and a variation amount of the surface temperature relative to a variation amount of a sunlight amount, according to the seventh embodiment.
Figure 27:
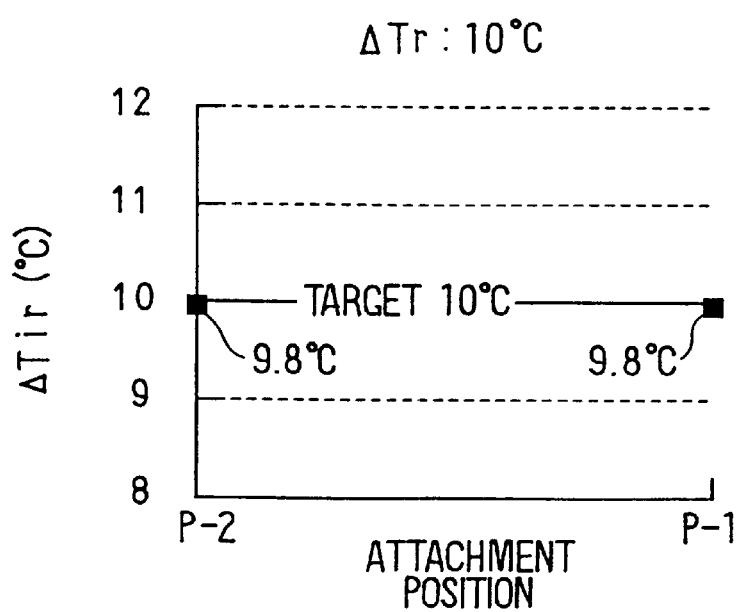
FIG. 27 is a view showing the relationship between the attachment position of the surface temperature sensor, and a variation amount of the surface temperature relative to a variation amount of an inside air temperature, according to the seventh embodiment.

FIG. 25 shows a target value of the variation temperature ΔTir of the surface temperature Tir, and detected variation temperatures ΔTir of the surface temperature Tir when the surface temperature sensor 31 is disposed at the first attachment position P-1 and the second attachment position P-2, when the variation amount ΔTam of the outside air temperature Tam is 10° C. FIG. 26 shows a target value of the variation temperature ΔTir of the surface temperature Tir, and detected variation temperatures ΔTir of the surface temperature Tir when the surface temperature sensor 31 is disposed at the first attachment position P-1 and the second attachment position P-2, when the variation amount ΔTs of the sunlight amount Ts is 582 W/m². Further, FIG. 27 shows a target value of the variation temperature ΔTir of the surface temperature Tir, and detected variation temperature ΔTir of the surface temperature Tir when the surface temperature sensor 31 is disposed at the first attachment position P-1 and the second attachment position P-2, when the variation amount ΔTr of the inside air temperature Tr is 10° C. As shown in FIGS. 25–27, when the surface temperature sensor 31 is disposed at the first attachment position, the variation temperature ΔTir of the surface temperature Tir relative to the variation amount in each heat load is close to the target value.

Figure 28:
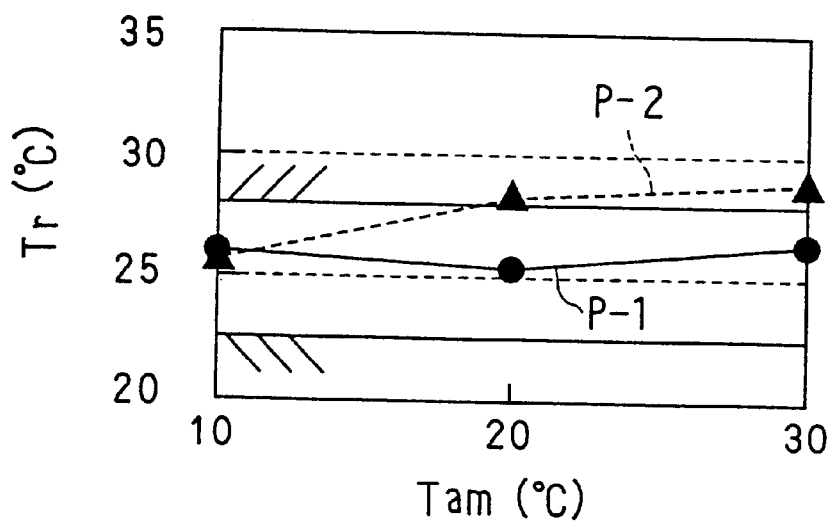
FIG. 28 is a view showing the relationship between the attachment position of the surface temperature sensor, the outside-air temperature and the surface temperature, according to the seventh embodiment.
Figure 29:
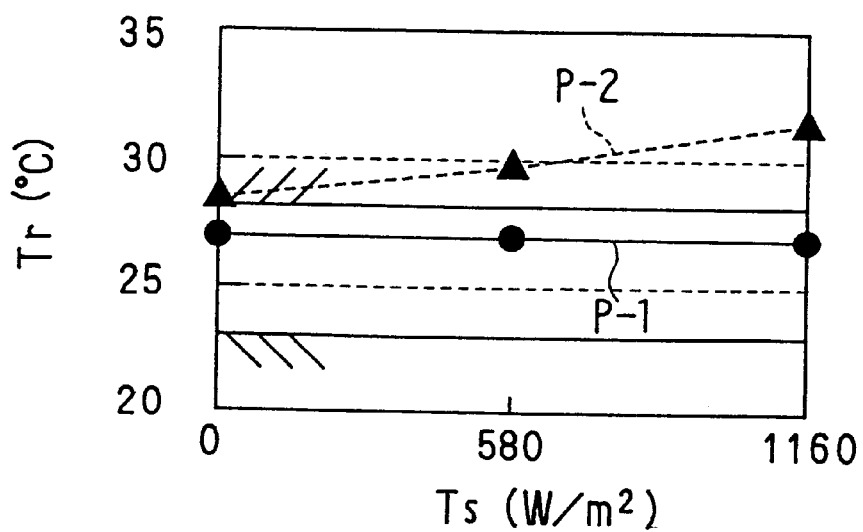
FIG. 29 is a view showing the relationship between the attachment position of the surface temperature sensor, the sunlight amount and the surface temperature, according to the seventh embodiment.

FIGS. 28, 29 show control performance of the passenger compartment, relative to the outside air temperature Tam and the sunlight amount Ts, when the surface temperature sensor 31 is disposed at the first attachment position P-1 and the second attachment position P-2. In FIGS. 28, 29, the set temperature Tset of the passenger compartment is set at 25° C. Generally, it is desired to set the inside air temperature to Tset+2° C. As shown in FIGS. 28, 29, when the surface temperature sensor 31 is disposed at the first attachment position P-1, the inside air temperature Tr can be set to be in a range of Tset±2° C. On the other hand, when the surface temperature sensor 31 is disposed at the second attachment position P-2, the inside air temperature Tr is greatly offset from the set temperature Tset, at a high heat load.

As described above, when the area ratio of the side windshield 44a (glass portion) is 25%, the area ratio of the upper body portion 42a (clothed portion) and the seat portion 46 is 35%, the area ratio of the ceiling 43 is 20% and the area ratio of the other part is 20%, the control performance of the passenger compartment is improved in maximum. Thus, this area ratio is a most suitable value. In the seventh embodiment, when the area ratio is set in a range of the most suitable value±5%, the control performance of the passenger compartment can be suitably maintained. Further, when the area ratio is set in a range of the most suitable value+10%, it is possible to be accurately used.

Figure 30:
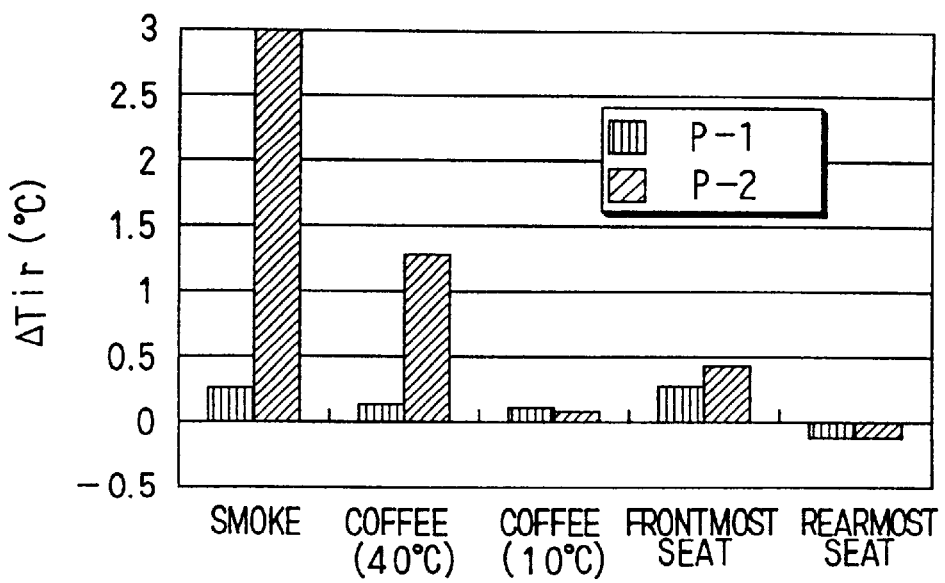
FIG. 30 is a view showing measured variation amount of the surface temperature, due to an outer disturbance, according to the seventh embodiment.

FIG. 30 shows degrees of outer disturbance affected to the output temperature from the surface temperature sensor 31 due to outer disturbance elements. That is, in FIG. 30, when the surface temperature sensor 31 is disposed at the first attachment position P-1 and the second attachment position P-2, and when the outside air temperature Tam is -10° C., the variation temperature ΔTir of the surface temperature Tir due to the outer disturbance elements is measured. Here, the outer disturbance elements affected to the output temperature of the surface temperature sensor 31 are the following cases, e.g., when the driver smokes, when a receiver surface temperature is 40° C. and 10° C. when the driver drinks coffee, when the driver's seat is moved at the frontmost side or at the rearmost side.

As shown in FIG. 30, when the surface temperature sensor 31 is disposed at the second attachment position P-2, the output temperature of the surface temperature sensor 31 is readily affected by the outer disturbance elements. More particularly, when the driver takes tabaco with the left hand in a vehicle having a right steering wheel, the tabaco is proximate to the second attachment position P-2 of the surface temperature sensor 31, and the variation temperature ΔTir of the surface temperature Tir becomes larger. On the other hand, when the surface temperature sensor 31 is disposed at the first attachment position P-1, the output temperature of the surface temperature sensor 31 is hardly affected by the disturbance elements, and the control performance of the passenger compartment 3 is improved.

An eighth preferred embodiment of the present invention will be now described with reference to FIG. 31. In the above-described seventh embodiment, when the surface temperature sensor 31 is disposed at the second attachment position P-2 of the operation panel 41, the area ratio of the glass portion to the detection range of the surface temperature sensor 31 is insufficient, and the control performance of the passenger compartment becomes insufficient.

In the eighth embodiment, even when each area ratio of the detection subjects relative to the detection range of the surface temperature sensor 31 is not set to a value near the target area ratio, a suitable control performance of the passenger compartment is improved.

Figure 31:
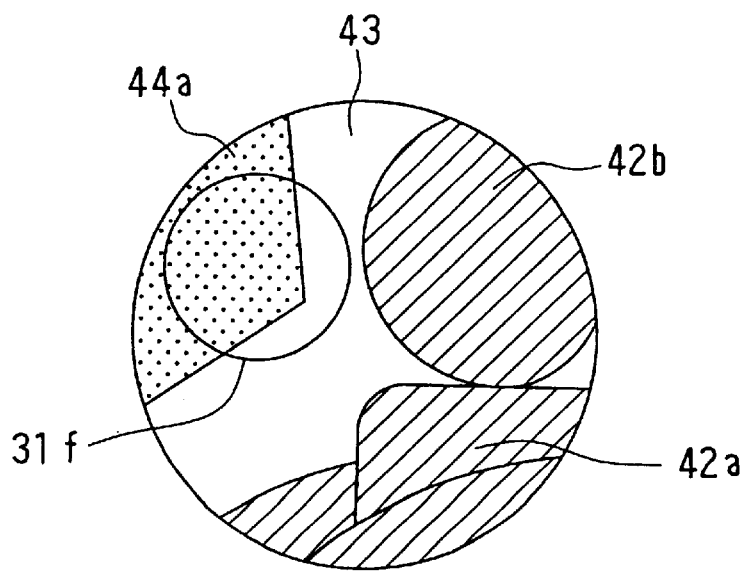
FIG. 31 is a view showing a detection range of a surface temperature sensor according to an eighth preferred embodiment of the present invention.

FIG. 31 shows the detection range of the surface temperature sensor 31 when the surface temperature sensor 31 is disposed at the second attachment position P-2. In the eighth embodiment, an incidence ratio adjustment lens 31f for adjusting an incidence ratio of infrared rays is assembled in the surface temperature sensor 31. Due to the lens 31f, the incidence amount of infrared rays from the side windshield 44a (glass portion) into the surface temperature sensor 31 can be made larger than that from the other portions, so that a sensing degree of the glass portion 44a is increased. Thus, actually, the area ratio of the glass portion 44a to the detection range of the surface temperature sensor 31 is increased, and becomes close to the target area ratio.

In the eighth embodiment, instead of the lens 31f, a collecting mirror can be used. That is, by using the lens 31f or the collecting mirror, incidence amount of infrared rays from each detection subject can be adjusted so that a ratio value corresponding to the target area ratio can be obtained. Thus, in this case, the attachment position of the surface temperature sensor 31 can be readily selected.

Figure 32:
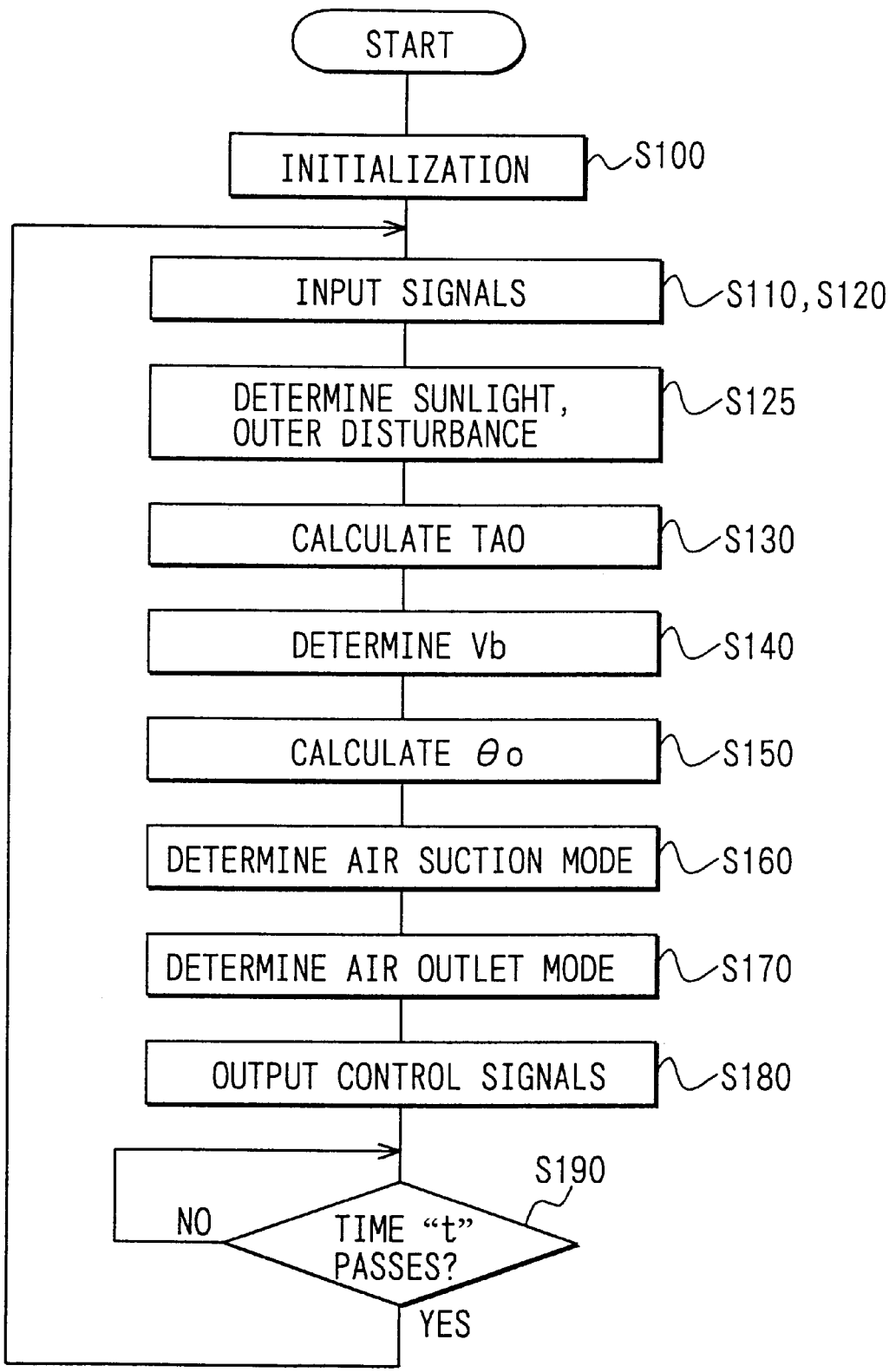
FIG. 32 is a flow diagram showing a control process of ECU of a vehicle air conditioner, according to a ninth preferred embodiment of the present invention.

A ninth preferred embodiment of the present invention will be now described with reference to FIGS. 32–36. In the ninth embodiment of the present invention, the equipments of the vehicle air conditioner 1 are similar to those of the above-described first embodiment, and the explanation thereof is omitted. Similarly to the first embodiment, the surface temperature sensor 31 is disposed to detect the detection range A shown in FIG. 6. Further, in the ninth embodiment, as shown in: FIG. 32, control steps similar to those of the first embodiment in FIG. 8 are indicated with the same step numbers.

Figure 33:
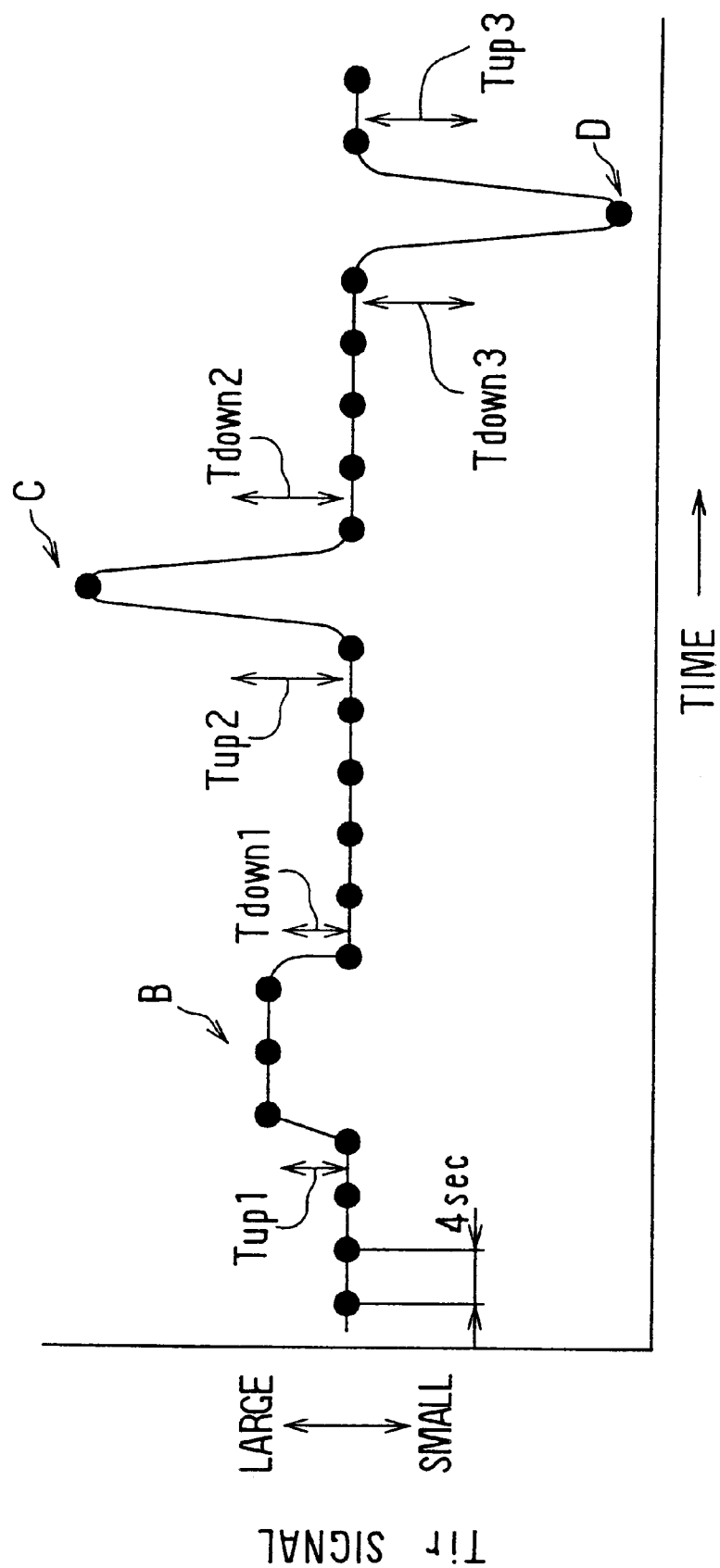
FIG. 33 is a time diagram showing an output signal of a surface temperature sensor according to the ninth embodiment.

In the ninth embodiment, the air-conditioning control of the ECU 30 will be mainly described. Firstly, an initialization is performed at step S100 when the control operation of the ECU 30 starts. Next, the set temperature Tset is input through the temperature setting unit 35 and sensor signals from the sensors 31–34 are input at steps S110, S120. FIG. 33 shows an example of an output of the surface temperature signal (Tir signal). In FIG. 33, the output of the surface temperature sensor 31 are sampled by 16 times per 250 msec, and the mean value per 4 sec is output as the surface temperature Tir. In FIG. 33, the output state B indicates a case where sunlight enters from a non-entering state and enters the upper body 42a (clothed portion) of the driver 42 so that the surface temperature Tir is increased. Further, the output states C and D indicate a case where the detection temperature of the surface temperature sensor 31 is affected by an outer disturbance element (e.g., smoke, high-temperature matter, low-temperature drink) so that the surface temperature Tir is rapidly changed.

Next, at step S125, the variation amount ΔTir of the surface temperature Tir is calculated from a surface temperature Tir(n) at the present sample time "n" and a surface temperature Tir (n−1) before one of the present sample time "n", and it is determined whether or nor sunlight enters and whether or not the surface temperature Tir is affected by an outer disturbance. In the ninth embodiment of the present invention, step S125 is used as temperature variation determining means and outer disturbance determining means.

Figure 34:
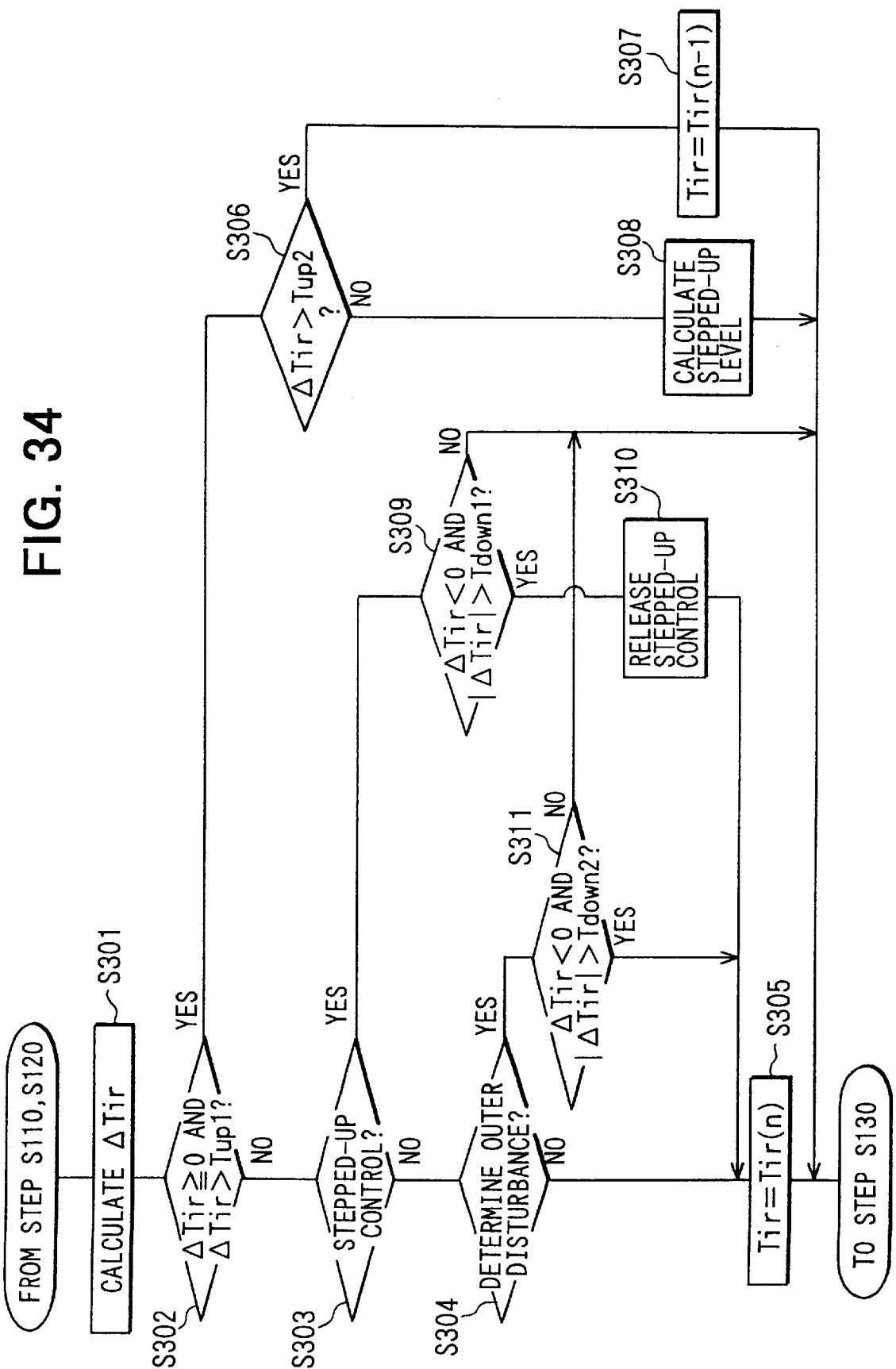
FIG. 34 is a flow diagram showing a detail control of step S125 in FIG. 32, according to the ninth embodiment.
Figure 35:
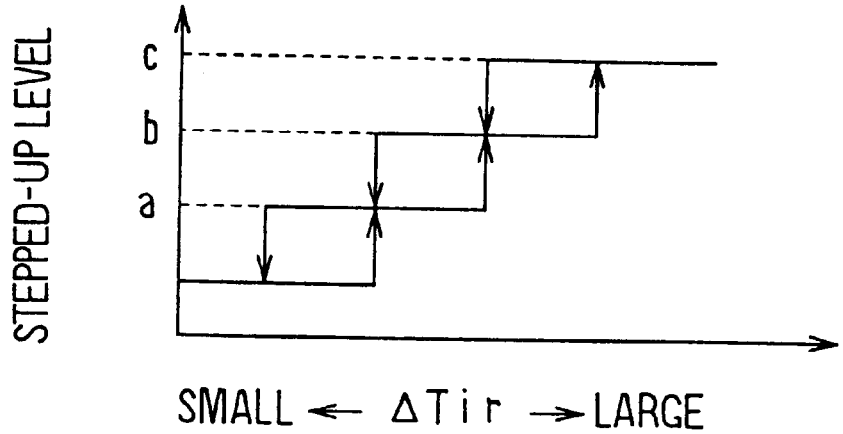
FIG. 35 is a characteristic view of a stepped-up level of a blower according to the ninth embodiment.

FIG. 34 shows the detail control of step S125 in FIG. 32. As shown in FIG. 34, at step S301, the variation amount ΔTir of the surface temperature Tir is calculated from the surface temperature Tir(n) at a sample time "n" and the surface temperature Tir (n−1) before one of the sample time "n" (i.e., ΔTir=Tir(n)—Tir (n−1)). When a variation of the sunlight is not caused and the surface temperature Tir is not affected by an outer disturbance, a general control of steps 302–305 is performed. That is, at step S302, the surface temperature Tir is stable, and the variation amount of the surface temperature Tir is equal to or lower than a first set stepped-up value Tup1. Next, at step S303, it is determined whether or not it is in a stepped-up control of the blower. When sunlight enters, the stepped-up control of the blower is not performed. When sunlight enters and the stepped-up control of the blower is not performed, it is determined whether or not an outer disturbance is affected at step S304. When the outer disturbance is not received at step S304, the surface temperature Tir is set at the surface temperature Tir(n) at the sample time "n". That is, in this case, the surface temperature Tir(n) at the present sample time "n" is used as the surface temperature Tir.

On the other hand, when it is determined that the surface temperature Tir is rapidly increased due to the outer disturbance, the surface temperature Tir rapidly increases as shown by the portion C in FIG. 4, and the variation amount ΔTir is larger than the first set stepped-up value Tup1 (ΔTir>Tup1) at step S302. In this case, at step S306, it is determined whether or not the variation amount ΔTir is larger than a second set stepped-up value Tup2 (ΔTir>Tup2). In the ninth embodiment, the second set stepped-up value Tup2 is larger than the first set stepped-up value Tup1. When the variation amount ΔTir of the surface temperature Tir is larger than the second set stepped-up value Tup2 (ΔTir>Tup2) at step S306, it is determined that the surface temperature Tir is affected by the outer disturbance, and the surface temperature Tir is set at the surface temperature Tir (n−1) before one of the sample time "n" at step S307. That is, when the surface temperature Tir is affected by the outer disturbance, the old surface temperature Tir(n−1) [i.e., Tir (old)] is used as the surface temperature Tir.

Next, when sunlight enters from a non-entering state, the following control is performed. In this case, as shown by the portion B in FIG. 4, the surface temperature Tir is increased and the variation amount ΔTir of the surface temperature Tir have a plus value. In this case, because the variation amount ΔTir of the surface temperature Tir is larger than the first set stepped-up value Tup1 at step S302, it is determined whether or not the variation amount ΔTir of the surface temperature Tir is larger than the second set stepped-up value Tup2 at step S306. However, in this case, because the variation amount ΔTir of the surface temperature Tir is smaller than the second set stepped-up value Tup2, it is determined that sunlight enters from the non-entering state. Therefore, at step S308, a blower stepped-up level (i.e., an correction amount of voltage applied to the blower) is calculated in accordance with the variation amount ΔTir of the surface temperature Tir, based on the characteristic view of FIG. 35 pre-stored in the ROM 30b.

Next, when the sunlight-entering state is continued, the surface temperature Tir becomes stable, and the control program moves from step S302 to step S303. Here, because sunlight enters, and it is determined that the blower is in the stepped-up control at step S303. Next, at step S309, it is determined whether or not the variation amount ΔTir has the minus value and whether or not the absolute value |ΔTir| of the variation amount ΔTir is larger than a first set reduced value Tdown1. When the variation amount ΔTir is the plus value (ΔTir>0) at step S309, the control program moves step S130. Even when the variation amount ΔTir is the minus value (ΔTir<0) at step S309, when the absolute value |ΔTir| of the variation amount ΔTir is not larger than the first set reduced value Tdown1, it is determined that sunlight entering state is continued. Therefore, the control program moves from step S309 to step S130, and the blower stepped-up control is continued.

On the other hand, when sunlight state is changed from an entering state to the non-entering state, the following control is performed. In this case, the surface temperature Tir is decreased to a predetermined temperature, the variation amount ΔTir of the surface temperature Tir is the minus value (ΔTir<0), and the absolute value |ΔTir| of the variation amount ΔTir is larger than the first set reduced value Tdown1. That is, when the variation amount ΔTir of the surface temperature Tir is the minus value (ΔTir<0) and the absolute value |ΔTir| of the variation amount ΔTir is larger than the first set reduced value Tdown1 at step S309, it is determined that the sunlight state is changed from the entering state to the non-entering state, and the stepped-up control of the blower is released at step S310.

Next, when the outer disturbance relative to the surface temperature Tir is continued, the following control is performed. In this case, because the surface temperature Tir becomes stable, the determination at step S302 becomes NO. Further, because the stepped-up control of the blower is not performed, the determination at step S303 becomes NO, and the determination at step S304 becomes YES. Therefore, the control program moves from step S304 to step S311. When the variation amount ΔTir of the surface temperature Tir is the plus value (ΔTir>0), the determination at step S311 becomes NO. Further, even when the variation amount ΔTir of the surface temperature Tir is the minus value (ΔTir<0), when the absolute value |ΔTir| of the variation amount ΔTir is equal to or smaller than the second set reduced value Tdown2, the determination at step S311 becomes NO. That is, in this case, it is determined that the outer disturbance is continued, and the control program moves from step S311 to step S130. Thus, when the outer disturbance relative to surface temperature Tir is continued, air-conditioning control is performed based on the surface temperature Tir(n−1) set at step S307.

On the other hand, when the outer disturbance relative to the surface temperature Tir becomes down (zero) after the outer disturbance is determined at step S304, the variation amount ΔTir of the surface temperature Tir is the minus value (ΔTir<0), and the absolute value |ΔTir| of the variation amount ΔTir is larger than the second set reduced value Tdown2, at step S311. Therefore, it is determined that the outer disturbance becomes zero, and the surface temperature Tir(n) of the present time is set as the surface temperature Tir at step S305.

In the ninth embodiment, the first set stepped-up value Tup1 is approximately equal to the first set reduced value Tdown1, and the second set stepped-up value Tup2 is approximately equal to the second set reduced value Tdown2.

Next, at step S130 in FIG. 32, the target temperature (TAO) of air blown into the passenger compartment is calculated based on the set temperature Tset and the surface temperature Tir, in accordance with the above-described formula (1) stored beforehand in the ROM 30b. In the ninth embodiment, the surface temperature Tir is the new surface temperature Tir(n) set at step S305 in FIG. 34 or the old surface temperature Tir(n−1) set at step S307.

Figure 36:
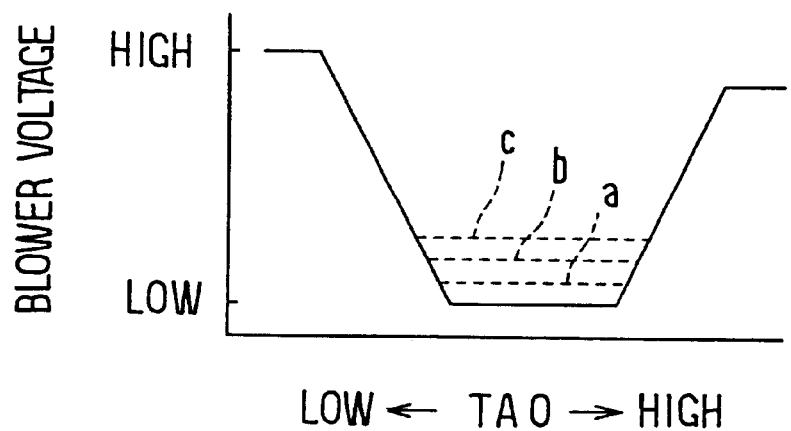
FIG. 36 is a characteristic view of a blower voltage according to the ninth embodiment.

Next, at step S140 in FIG. 32, a blower voltage Vb, applied to the blower motor 23, corresponding to a target air amount, is determined based on the target temperature TAO in accordance with the characteristic graph shown by the solid line in FIG. 36 beforehand stored in the ROM 30b. Further, when the target temperature TAO is in a middle area during the sunlight-entering state, the blower voltage Vb is corrected as shown by the characteristic lines "a", "b" or "c" in accordance with the blower stepped-up level calculated at step S308, and the air amount blown by the blower is corrected to be increased. That is, a blower stepped-up control corresponding to a sunlight amount entering the passenger compartment is performed.

Next, at step S150, a target opening degree θo of the air mixing damper 13 is calculated by using the above-described formula (2) beforehand stored in the ROM 30b, based on the target temperature TAO calculated at step S130, the water temperature Tw of the engine-cooling water and the evaporator outlet temperature Te of air immediately from the evaporator 11.

Next, at step S160, the air suction mode is determined based on the target temperature TAO of blown air in accordance with the characteristic view beforehand stored in the ROM 30b. That is, as the air suction mode, an outside air mode, a half-inside air mode (air-mixing mode) or an inside air mode is selected-based on the target temperature TAO. At step S170, the air outlet mode is determined based on the target temperature TAO of blown air in accordance with the characteristic view beforehand stored in the ROM 30b. That is, as the air outlet mode, a face mode (FACE), a bi-level mode (B/L) or a foot mode (FOOT) is selected based on the target temperature TAO.

Next, at step S180, control signals corresponding to the calculation results at steps S140–S170 are output to the driving circuit 21, the servomotor 25, the servomotor 19 and the servomotor 27, respectively. Next, at step S190, it is determined whether or not a predetermined time "t" passes. After the predetermined time passes, the control routine returns at step S110, S120.

According to the ninth embodiment of the present invention, the surface temperature sensor 31 detects the surface temperature of the detection range including: the ceiling 43 in which the surface temperature is changed to approximately correspond to the inside air temperature, the side windshield 44a and the rear glass 45 in which the surface temperature is changed by the outside air temperature, and the upper body portion 42a in which the surface temperature is changed by the sunlight. Therefore, the surface temperature sensor 31 outputs the surface temperature signal including the environment conditions such as the inside air temperature, the outside air temperature, and the sunlight amount. Thus, by the surface temperature sensor 31, the temperature of the passenger compartment can be controlled suitably to correspond to the inside air temperature, the outside air temperature and the sunlight amount. As a result, the temperature of the passenger compartment can be accurately controlled without using an inside air temperature sensor, an outside air temperature sensor and the sunlight sensor.

According to the ninth embodiment of the present invention, the sunlight state is determined by comparing the variation amount ΔTir of the surface temperature Tir and each set value Tup1, Tup2, Tdown1, Tdown2. Further, when the entering'state of sunlight is determined, the blower stepped-up control for increasing the air-blowing amount is performed so that pleasant feeling for a passenger of the passenger compartment is improved.

Further, according to the ninth embodiment of the present invention, the outer disturbance relative to the surface temperature Tir is determined by comparing the variation amount ΔTir of the surface temperature Tir and the second set value Tup2, Tdown2. When the outer disturbance relative to the surface temperature Tir is determined, the target temperature TAO of air blown into the passenger compartment is calculated by using an old surface temperature Tir(n−1) before determining the outer disturbance, and the air-conditioning control is performed based on the calculated target temperature TAO. Therefore, the affect of outer disturbance relative to the surface temperature Tir is removed, and it can prevent the outer disturbance from being affected to the air-conditioning performance for the passenger compartment.

Figure 37:
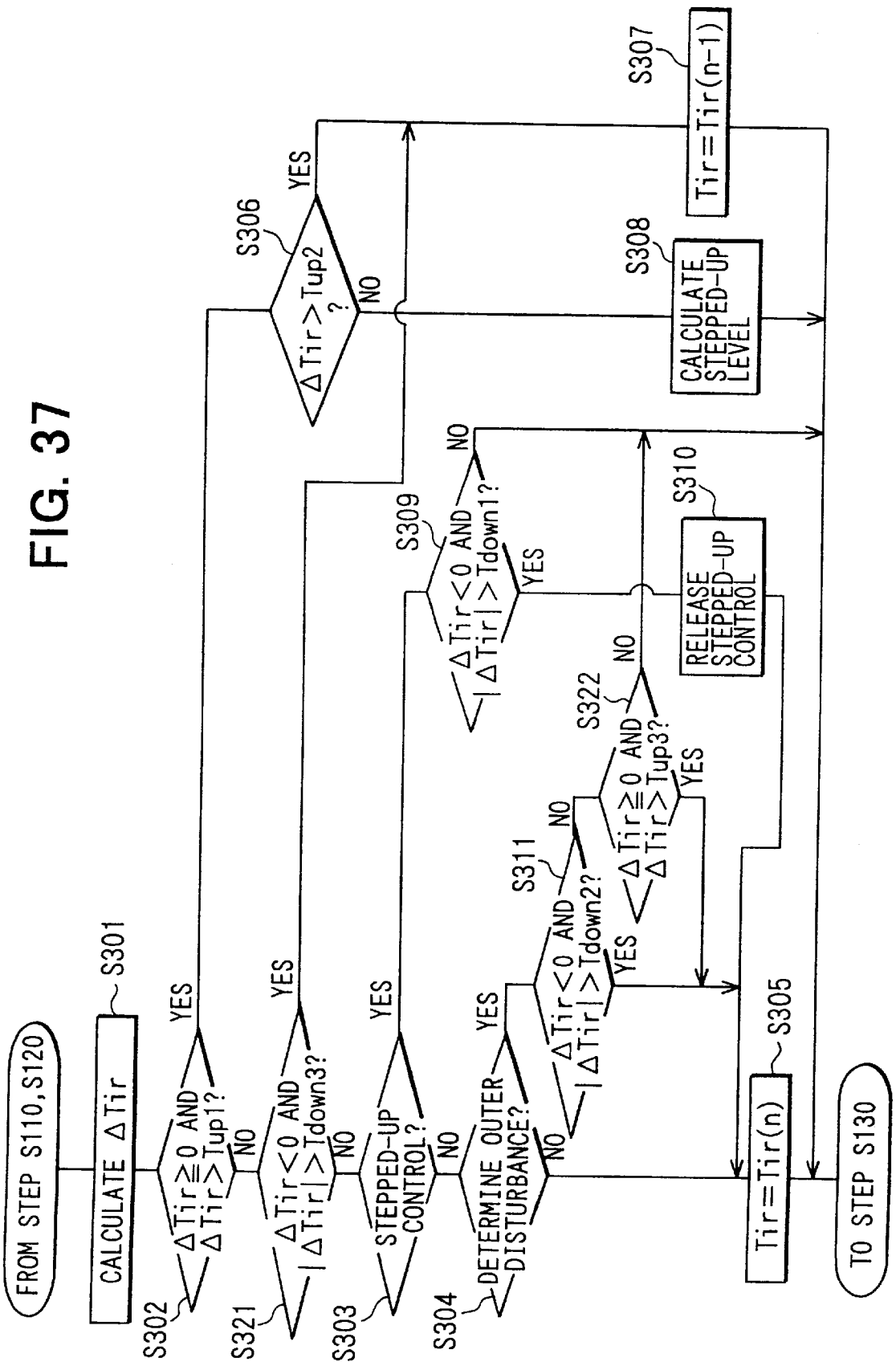
FIG. 37 is a flow diagram showing a control program according to a tenth preferred embodiment of the present invention.

A tenth preferred embodiment of the present invention will be now described with reference to FIG. 37. The tenth embodiment is a modification of the above-described ninth embodiment. In the tenth embodiment of the present invention, when the surface temperature Tir is suddenly decreased, it is determined whether or not the outer disturbance (low-temperature matter such as juice) is affected to the surface temperature Tir. In the tenth embodiment, step S321 and step S322 are added in the flow diagram shown in FIG. 34 of the above-described ninth embodiment.

That is, when the surface temperature Tir is suddenly reduced due to an outer disturbance, the control program moves from step S302 to step S321. In this case, because the absolute value |ΔTir| of the variation amount ΔTir of the surface temperature Tir is larger than a third set reduced value Tdown3, the determination of step S321 becomes YES. Therefore, it is determined that the outer disturbance is affected to the surface temperature Tir, and the old surface temperature Tir(n−1) is set as the surface temperature Tir.

When the outer disturbance is continued, the surface temperature Tir becomes stable, and the determination of step S321 becomes NO. In this case, because the blower stepped-up control is not performed, the control program moves from step S303 to step S304. Further, because the outer disturbance is determined at step S304, the control program moves from step S304 to step S311.

When the variation amount ΔTir of the surface temperature Tir is the plus value (ΔTir>0), the determination at step S311 becomes NO. Further, even when the variation amount ΔTir of the surface temperature Tir is the minus value (ΔTir<0), when the absolute value |ΔTir| of the variation amount ΔTir is equal to or smaller than the second set reduced value Tdown2, the determination at step S311 becomes NO. Therefore, the control program moves from step S311 to step S322. When the variation amount ΔTir of the surface temperature Tir is the minus value (ΔTir<0), the determination at step S322 becomes NO. Further, even when the variation amount ΔTir of the surface temperature Tir is the plus value (ΔTir>0), when the variation amount ΔTir is equal to or smaller than a third set stepped-up value Tup3, the determination at step S322 becomes NO. Here, the third set stepped-up value Tup3 is larger than the first set stepped-up value Tup1. In this case, it is determined that the outer disturbance is still continued, and the control program moves from step S322 to step S130. Thus, when the outer disturbance relative to surface temperature Tir is continued, air-conditioning control is performed based on the old surface temperature Tir(n-1) set at step S307.

On the other hand, when the outer disturbance relative to the surface temperature Tir becomes down (zero) after the outer disturbance is determined at step S304, the variation amount ΔTir of the surface temperature Tir is suddenly increased to have the plus value. Therefore, the control program moves from step S311 to step S322. In this case, because the variation amount ΔTir is larger than the third set stepped-up value Tup3, the determination at step S322 becomes YES. In this case, it is determined that the outer disturbance becomes down (zero), and the new surface temperature Tir(n) is set as the surface temperature Tir at step S305.

According to the tenth embodiment of the present invention, any outer disturbance due to a high-temperature matter and a low-temperature matter is determined. When the outer disturbance relative to the surface temperature Tir is determined, the target temperature TAO of air blown into the passenger compartment is calculated by using the old surface temperature Tir(n-1) before determining the outer disturbance, and the air-conditioning control of the passenger compartment is performed based on the calculated target temperature TAO. Therefore, the affect of outer disturbance relative to the surface temperature Tir is actually removed, and it can prevent the outer disturbance from being affected to the air-conditioning for the passenger.

Figure 38:
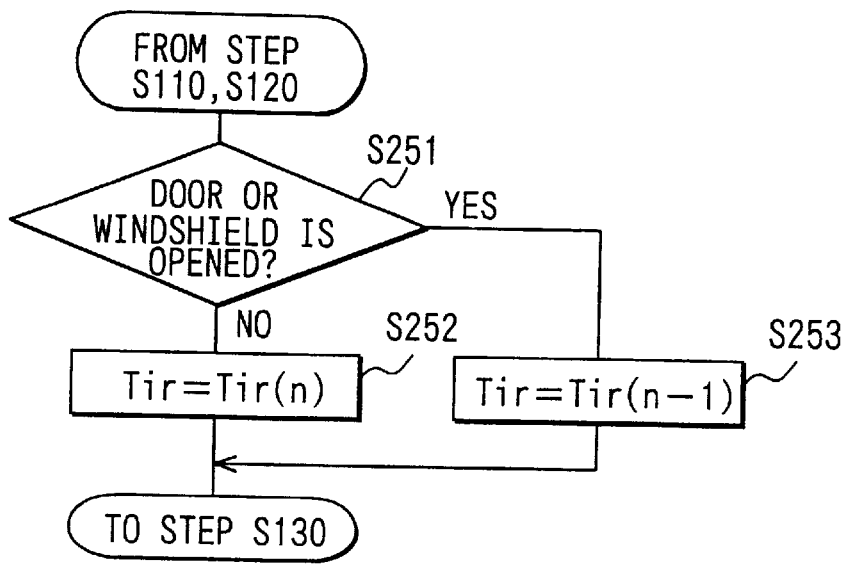
FIG. 38 is a flow diagram showing a control program according to an eleventh preferred embodiment of the present invention.

An eleventh preferred embodiment of the present invention will be now described with reference to FIG. 38. When the front door 44 or the side grass 44a (side windshield) placed within the detection range A (see FIG. 6) of the surface temperature sensor 31 is opened, the detection subjects of the surface temperature sensor 31 is changed, and air-conditioning control is affected. In the eleventh embodiment, when the front door 44 or the side glass 44a plated in the detection range of the surface temperature sensor 31 is opened, it is determined that the outer disturbance relative to the surface temperature Tir is found.

In the eleventh embodiment of the present invention, at step S110, S120, signals from the temperature setting unit 35 and the sensors 31–34 are input, and a door switch signal with an opening/closing operation of the front door 44 and a power window switch signal for opening and closing the side glass 44a are also input. Next, at step S251 in FIG. 38, it is determined whether or not the front door 44 or the side glass 44a is opened. When the front door 44 and the side glass 44a are closed, the new surface temperature Tir(n) is set as the surface temperature Tir at step S252. On the other hand, when at least any one of the front door 44 and the side glass 44a are opened, it is determined that the outer disturbance is affected to the surface temperature Tir, and the old surface temperature Tir (n-1) is set as the surface temperature Tir. Thus, when the front door 44 or the side glass 44a is opened, the target temperature TAO of air blown into the passenger compartment is calculated based on the set temperature Tset and the old surface temperature Tir(n-1).

According to the eleventh embodiment of the present invention, it is determined that the outer disturbance is found when the front door 44 or the side glass 44a placed in the detection range of the surface temperature sensor 31 is opened, and the target temperature TAO of air blown into the passenger compartment is calculated using the old surface temperature Tir(n-1) before being affected by the outer disturbance. Further, because the air-conditioning control is performed&based on the calculated target temperature TAO, the affect of outer disturbance relative to the surface temperature Tir is actually removed, and it can prevent the outer disturbance from being affected to the air-conditioning for the passenger compartment.

Figure 39:
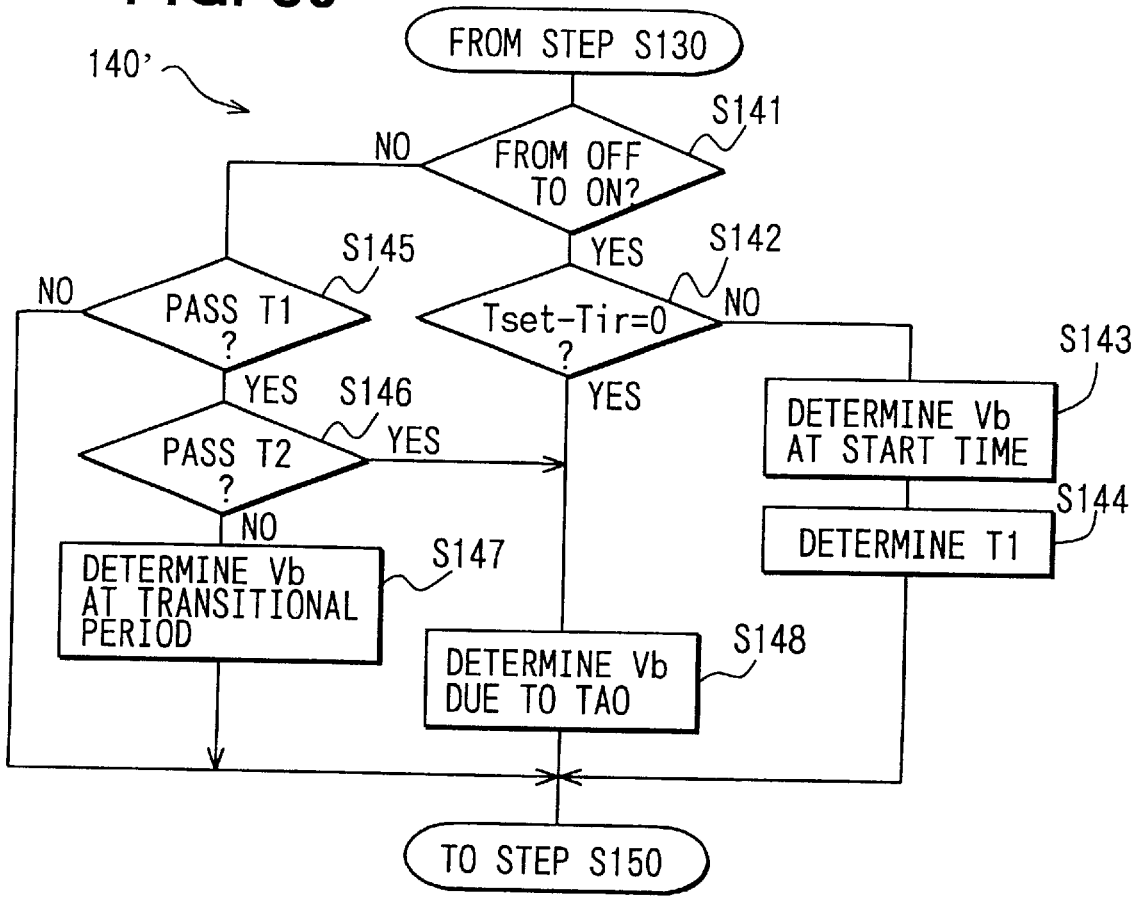
FIG. 39 is a flow diagram showing a control program according to a twelfth preferred embodiment of the present invention.

A twelfth preferred embodiment of the present invention will be now described with reference to FIGS. 39 and 40. At an initial time of an air-conditioning operation, the surface temperature of the upper body portion (clothed portion) 42a of the driver 42, which is a detection subject of the surface temperature sensor 31, is rapidly changed. Therefore, at the initial time, the surface temperature Tir detected by the surface temperature sensor 31 becomes lower than an actual room temperature during a cooling mode, or the surface temperature Tir detected by the surface temperature sensor 31 becomes higher than the actual room temperature during a heating mode. Thus, during a transitional period until the air-conditioning operation becomes stable, the air amount is decreased before the temperature of the passenger compartment becomes the set temperature; and therefore, air conditioning including cooling and heating is insufficient.

In the twelfth embodiment of the present invention, until a predetermined time passes after the air-conditioning operation starts, the air conditioning control is performed based on a set temperature signal at an air-conditioning start time and a surface temperature signal at the air-conditioning start time, so that it can prevent the air-conditioning operation including the cooling and the heating from being insufficient.

In the twelfth embodiment of the present invention, the control operation of step S140 in FIG. 32 of the ninth embodiment is changed. FIG. 39 shows a control program at step S140' corresponding to step S140 in FIG. 32. As shown in FIG. 39, at step S141, it is determined whether or not the operation switch 36 (see FIG. 1) is operated from an air-conditioning stop state (OFF state) to an air-conditioning operation state (ON state). When it is determined that the operation switch 36 is operated from the air-conditioning stop state to the air condition operation state at step S141, it is determined whether or not a difference between the set temperature Tset and the surface temperature Tir is equal to zero at step S142. When the surface temperature Tir is different from the set temperature Tset, the blower voltage Vb is determined based on the heat load (Tset-Tir) at an air-conditioning start time, so that the air amount blown by the blower becomes larger as the heat load is larger.

Figure 40:
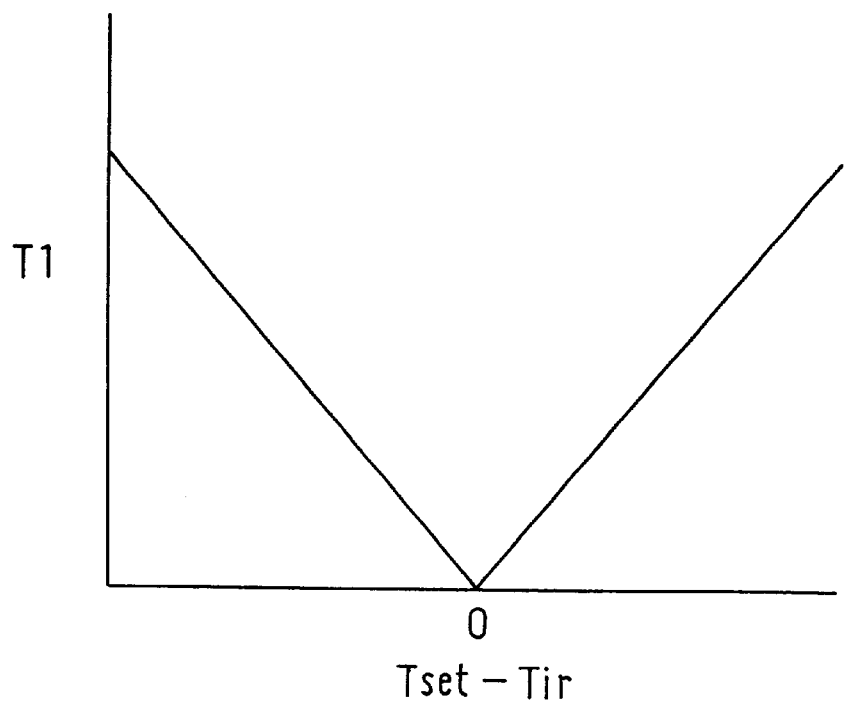
FIG. 40 is a characteristic view showing the relationship between a fixed time of a blower voltage and heat load, in an air-conditioning initial period, according to the twelfth embodiment.

Next, at step S144, a first set time T1, for which the blower voltage Vb determined at step S143 is maintained, is determined by the characteristic line shown in FIG. 40 based on the heat load (Tset-Tir) at the air-conditioning start time. Thereafter, the control program moves to step S150 until step S180, and a control signal of the blower voltage corresponding to the calculation results at steps S143 and S144 is output.

When the air-conditioning operation (ON state) is continued at step S141, it is determined whether or not the operation time after the air-conditioning operation starts passes the first set time T1. Until the operation time passes the first set time T1, the determination at step S145 becomes NO, and the control program moves from step S145 to step S150.

After the first set time T1 passes at step S145 after the air conditioning operation starts, it is determined whether or not the operation time after the first set time T1 passes a second set time T2. Until the operation time passes the second set time T2, the determination at step S146 becomes NO, and the blower voltage Vb at a transitional period is determined at step S147. During the transitional period at step S147, the blower voltage Vb is set to be gradually lowered with the passing time. In the twelfth embodiment, the second set time T2 may be set at a fixed time, or may be changed in accordance with a difference between the blower voltage at the start time and a blower voltage due to the target temperature TAO after the first set time T1 passes.

Next, after the second set time T2 passes at step S146, the blower voltage Vb is generally determined based on the target temperature TAO at step S148.

According to the twelfth embodiment of the present invention, until the first set time T1 passes after the air conditioning operation starts, the blower voltage Vb determined at step S143 based on the heat load at the air-conditioning start time is maintained. Thus, even when the surface temperature of the upper body (clothed portion) $42a$ or the head portion $42b$ of the driver 42 is rapidly changed by cool air (or warm air) at the air-conditioning start time, it can prevent the cooling (or heating) from being insufficient because the air-blowing amount is not reduced until the first set time T1 passes after the air conditioning operation starts. Further, after the first set time T1 passes, the general blower voltage control is performed after the transitional control where the blower voltage Vb is gradually reduced is performed. Thus, air-conditioning feeling for a passenger in the passenger compartment is improved.

In the above-described twelfth embodiment of the present invention, the blower voltage during the air-conditioning initial period is determined based on the heat load (Tset-Tir) at the air-conditioning start time. However, the target opening degree of the air mixing damper, the air suction mode and the air outlet mode during the initial period may be determined based on the heat load (Tset-Tir) at the air-conditioning start time.

Figure 41:
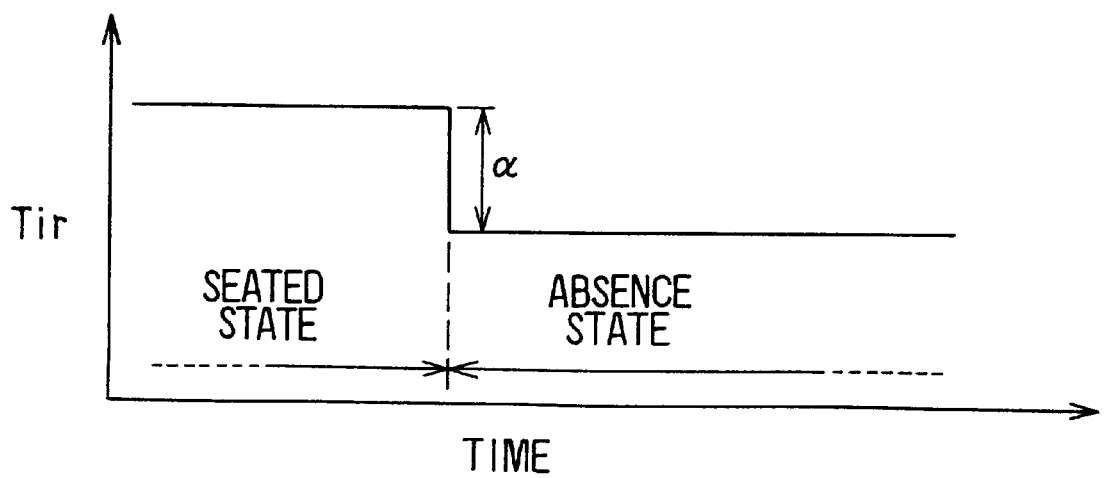
FIG. 41 is a time diagram showing a surface temperature output from a surface temperature sensor when a driver is in a seated state or is in an absence state, according to a thirteenth preferred embodiment of the present invention.

A thirteenth preferred embodiment of the present invention will be now described with reference to FIGS. 41–43. In the above-described embodiments, because the driver 42 is contained in the detection range of the surface temperature sensor 31, the detection subjects of the surface temperature sensor 31 is changed by the seated state of the driver 42 and an absence state of the driver 42 in the passenger compartment. Therefore, as shown in FIG. 41, at both states of the driver 42, the surface temperature Tir is changed by α, and the target temperature TAO of air blown into the passenger compartment is changed. As a result, the temperature or the amount of air blown into the passenger compartment is rapidly changed at both states.

Therefore, when the driver 42 gets out the passenger compartment, unpleasant feeling may be given to a passenger within the passenger compartment. For example, when the driver 42 temporally gets out the passenger compartment during a heating mode, the surface temperature Tir is changed and the temperature of air blown into the passenger compartment is rapidly changed. Therefore, in this case, unpleasant feeling may be given to a passenger in the passenger compartment.

In the thirteenth embodiment of the present invention, when the driver 42 does not get in the passenger compartment, a signal of the surface temperature Tir is corrected, so that the above-described problem is prevented.

Figure 42:
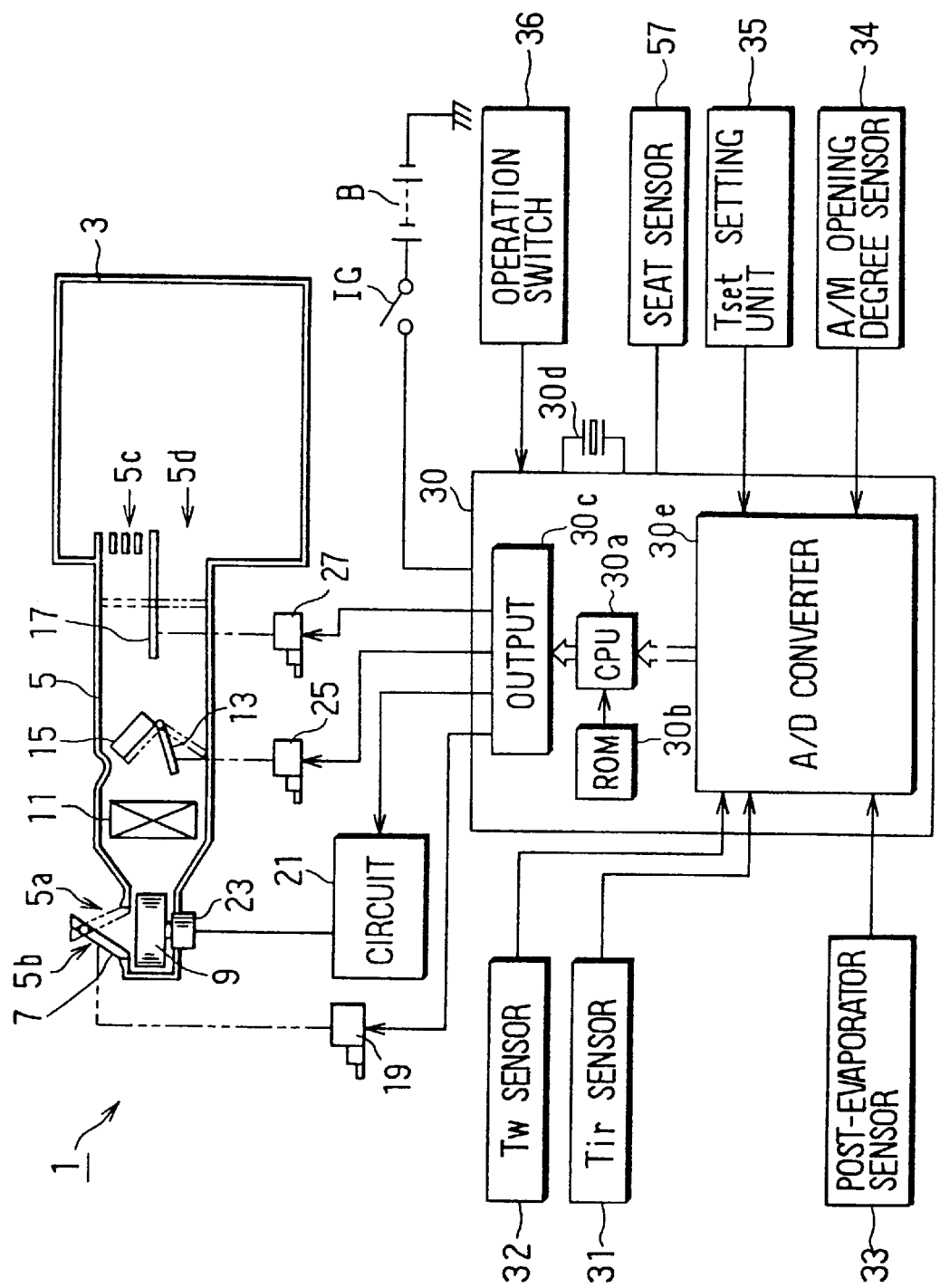
FIG. 42 is a schematic view showing an entire structure of a vehicle air conditioner according to the thirteenth embodiment.
Figure 43:
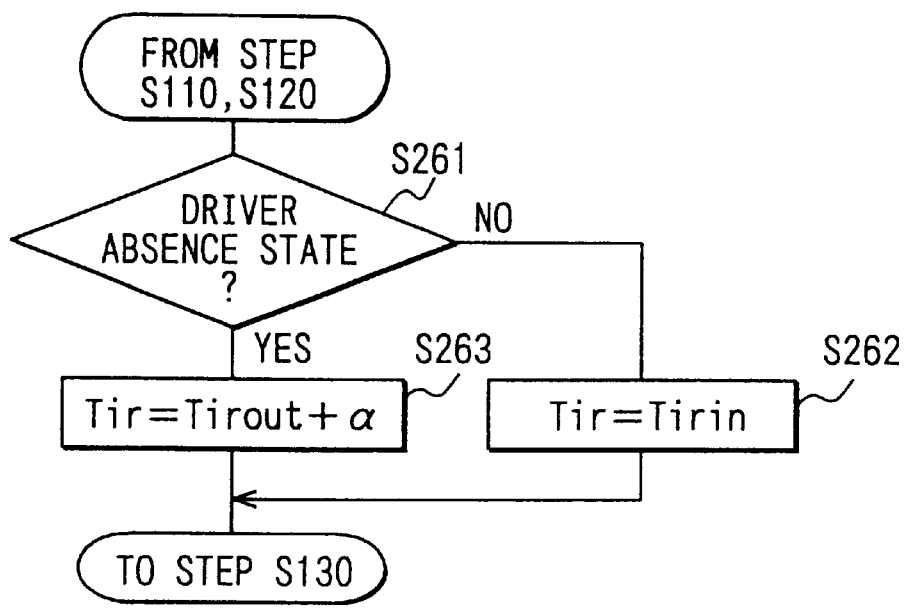
FIG. 43 is a flow diagram showing a control program according to the thirteenth embodiment.

In the thirteenth embodiment of the present invention, as shown in FIG. 42, a seat sensor 57 for detecting the state of the driver 42 is provided in a seat surface portion of the driver's seat. The other components of the air conditioner in FIG. 42 are similar to those in FIG. 1 of the above-described first embodiment of the present invention. As shown in FIG. 43, a control shown in FIG. 43 is performed between step S110, S120 and step S130 in FIG. 32 of the above-described ninth embodiment.

That is, when it is determined that the driver is seated on the driver's seat at step S261, a surface temperature Tirin during the seated state of the driver 42 is set as the surface temperature Tir. Next, at step S130, the target temperature TAO of air blown into the passenger compartment is calculated based on the set temperature Tset and the surface temperature Tir.

On the other hand, when the absence state of the driver 42 is determined at step S261, the surface temperature Tir is corrected. In this case, the surface temperature Tir is an addition value of a surface temperature Tirout during the absence state and the correction amount a. Next, at step S130, the target temperature TAO of air blown into the passenger compartment is calculated based on the set temperature Tset and the corrected surface temperature Tir. Here, the correction amount a is the difference between a surface temperature during the seated state immediately before a determination of the absence state of the driver 42, and a surface temperature immediately after the determination of the absence state of the driver 42. When the driver 42 returns the driver's seat, the surface temperature Tirin is set as the surface temperature Tir.

As described above, when the driver 42 which is the detection subject of the temperature sensor 31 gets out the passenger compartment, the surface temperature Tir is corrected. Accordingly, a rapid change of the target temperature TAO and a rapid change of temperature of air blown into the passenger compartment are prevented.

In a vehicle having an infrared sensor for detecting a passenger's state may be used instead of the seat sensor 37.

Further, the correction amount a may be determined based oh the following method. Because the skin exposed portion such as the head portion $42a$ or the hand of the driver 42 becomes outside the detection range when the driver 42 gets out the passenger compartment, the surface temperature Tir is changed due to this point. Further, because the exposed area of the skin of the driver 42 in the summer is different from that in the winter, the surface temperature Tir is also changed due to this point. On the other hand, the seat 46 becomes the detection subject instead of the upper body (clothed portion) $42a$ of the driver 42, when the driver 42 gets out the passenger compartment. However, because the temperature difference between the upper body (clothed portion) $42a$ and the seat 46 is small, the affect of the temperature difference relative to the surface temperature Tir is not considered.

When the skin temperature of the exposed portion of the driver 42 is 30° C. and when an exposed skin ratio in the detection range of the surface temperature sensor 31 is set at 15% in the summer and is set at 5% in the winter, the correction amount α in the summer becomes 0.15×(30-Tirin), and the correction amount α in the winter becomes 0.05×(30-Tirin). That is, α=0.15×(30-Tirin) in the summer, and α=0.05×(30-Tirin) in the winter. The determination of the winter and the summer can be calculated based on the target temperature TAO initially calculated at an engine start time or the surface temperature initially detected at the engine start time. Further, when an outside air temperature sensor is provided for finely control the air conditioning operation, the summer and the winter may be determined based on the outside air temperature detected by the outside air temperature sensor.

A fourteenth preferred embodiment of the present invention will be now described with reference to FIG. 44. The fourteenth embodiment is a modification of the thirteenth embodiment of the present invention. In the fourteenth embodiment, the determination whether or not the driver 42 gets on the driver's seat, and the correction method of the surface temperature Tir are changed, as compared with the above-described thirteenth embodiment.

That is, in the fourteenth embodiment, in a state where the vehicle speed is zero and a driver's seatbelt is not attached, when a switch signal of the driver's door becomes close→open→close, it is determined that the driver temporally gets out.

Figure 44:
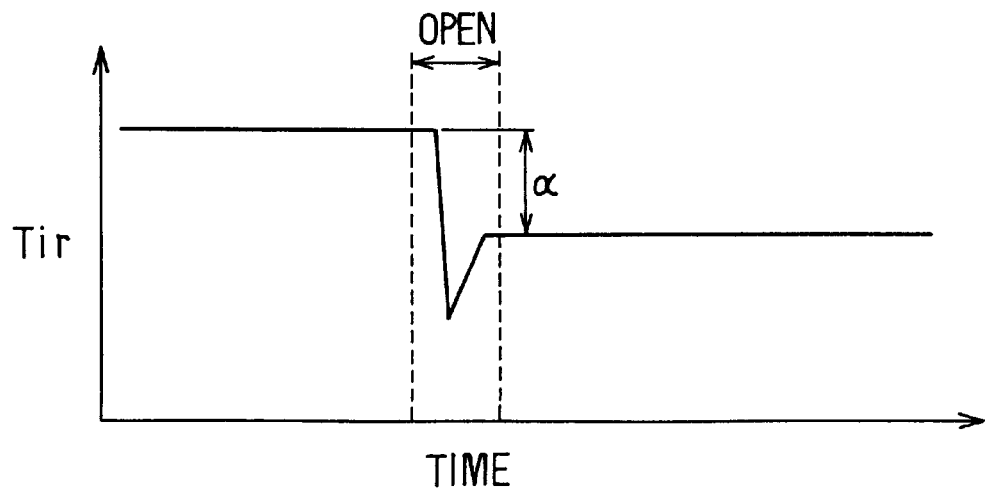
FIG. 44 is a time diagram showing a surface temperature output from a surface temperature sensor according to a fourteenth preferred embodiment of the present invention.

As shown in FIG. 44, during the open state of the driver's door, the variation of the surface temperature Tir becomes larger. Therefore, during the open state of the driver's door, the surface temperature Tirin, immediately before the driver's door opens, is set as the surface temperature Tir, and the target temperature TAO is calculated based on this surface temperature Tir. Thereafter, at a time where the absence state of the driver is determined, the difference α (correction amount) between the surface temperature Tirin during the seated state immediately before the determination of the absence state of the driver 42 and the surface temperature Tirout immediately after the determination of the absence state of the driver 42 is calculated. Further, the addition value between the Tirout and the correction amount α is used as the surface temperature Tir, and the target temperature TAO of air blown into the passenger compartment is calculated.

When the absence state of the driver 42 is determined based on, the switch signal of the driver's door, the absence state may be error-determined when the driver 42 does not get off the passenger compartment while opening the driver's door. Even in this case, when it is determined that the vehicle sped is larger than zero or when it is determined that the driver's seatbelt is in the attachment state, the correction of the surface temperature Tir is stopped. When the correction of the surface temperature is stopped, the target temperature TAO may be suddenly changed. Therefore, in this case, the target temperature TAO is gradually reduced.

Further, in the fourteenth embodiment of the present invention, the vehicle stop state may be determined based on a parking brake signal and the P-position signal of a shift lever.

Figure 45:
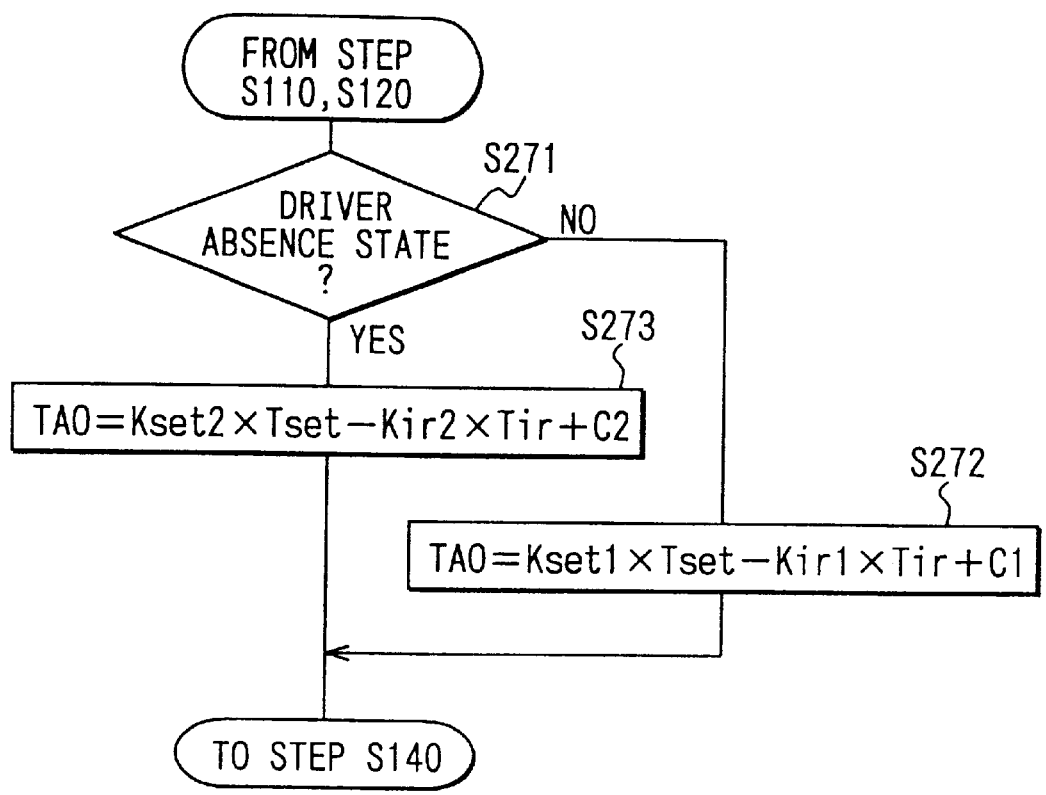
FIG. 45 is a flow diagram showing a control program according to a fifteenth preferred embodiment of the present invention.

A fifteenth preferred embodiment of the present invention will be now described with reference to FIGS. 45 and 46. In the fifteenth embodiment, during the driver's absence state, the coefficients Kset, Kir and C in the above-described formula (1) are changed, so that a rapid variation of the target temperature TAO due to the absence of the driver 42 is prevented.

In the fifteenth embodiment, the components of the air conditioner 1 are similar to those of the above-described thirteenth embodiment. In the fifteenth embodiment, as shown in FIG. 45, at step S271, it is determined whether or not the driver 42 gets out the passenger compartment. When the driver 42 is seated on the driver's seat, the control program moves from step S271 to step S272. Next, at step S272, the target temperature of air blown into the passenger compartment is calculated using the coefficients Kset1, Kir1 and C1 during the seated state of the driver 42. Next, the control program moves from step S272 to step S140, and the blower voltage Vb applied to the blower motor 23 is determined based on the target temperature TAO calculated at step S272.

On the other hand, when the absence state of the driver 42 is determined at step S271, the control program moves from step S271 to step S273. Next, at step S273, the target temperature TAO of air blown into the passenger compartment is calculated using the coefficients Kset2, Kir2 and C2 during the absence state of the driver 42, so that the air-conditioning performance for the passenger compartment is improved even when the driver 42 temporally gets out the passenger compartment. Next, the control program moves from step S273 to step S140, and the blower voltage Vb applied to the blower motor 23 is determined based on the target temperature TAO calculated at step S273.

Figure 46:
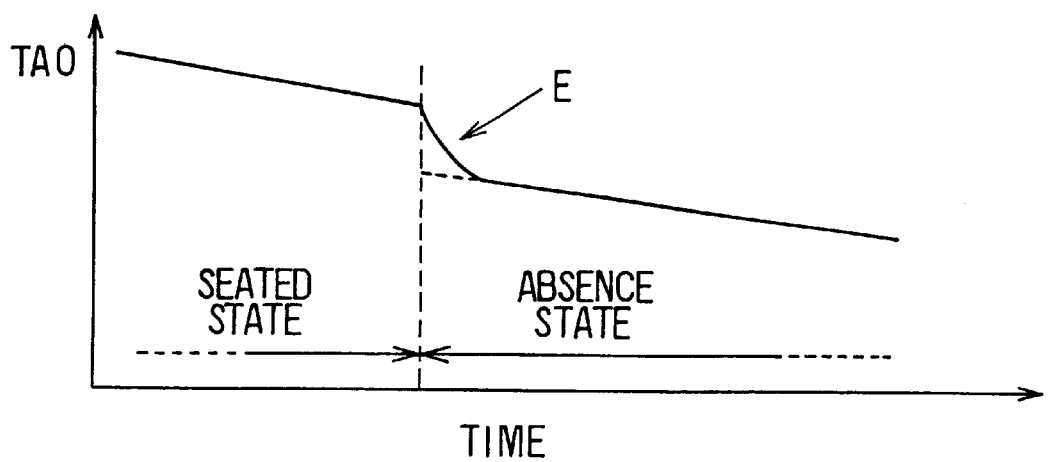
FIG. 46 is a time diagram showing a change of a target air temperature TAO according to the fifteenth embodiment of the present invention.

In the above-described fifteenth embodiment, as shown by the E portion in FIG. 46, the target temperature TAO may gradually changed by a predetermined time between the seated state and the absence state. Alternatively, the target temperature TAO may be changed by 1° C./4 sec between the seated state and the absence state.

Figure 47:
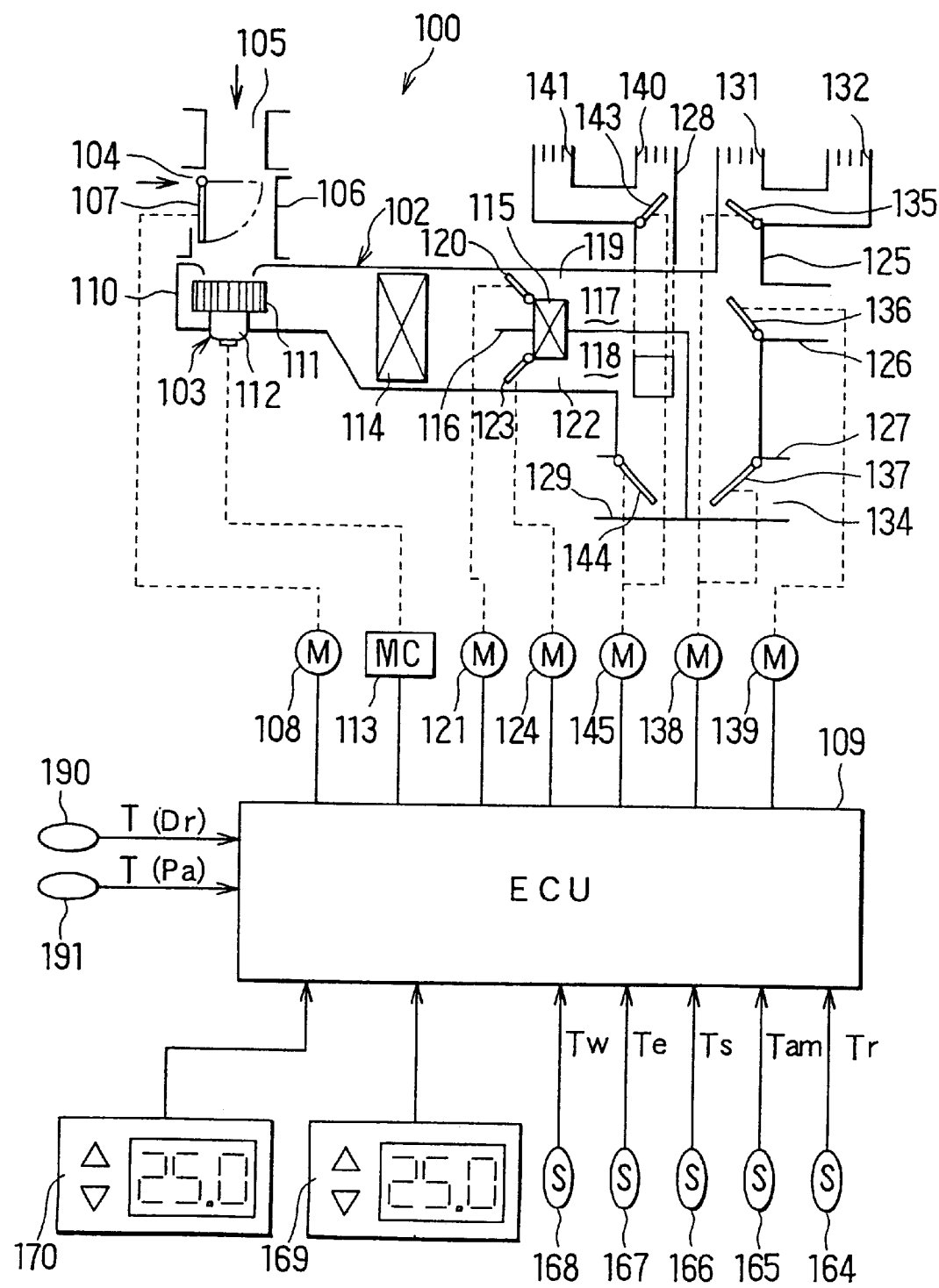
FIG. 47 is a schematic view showing an entire structure of a vehicle air conditioner according to a sixteenth preferred embodiment of the present invention.

A sixteenth preferred embodiment of the present invention will be now described with reference to FIGS. 47–53. FIG. 47 shows a vehicle air conditioner 100 having a right/left independent temperature control system, in which a driver's side air-conditioning and a front-passenger's side air-conditioning are respectively independently controlled. The vehicle air conditioner 100 includes an air duct 102 defining an air passage through which air flows into the passenger compartment. A blower 103 is disposed at an upstream air side of the air duct 102, and an inside/outside air switching box 106 is connected to the air duct 102 at an upstream air side. The inside/outside air switching box 106 has an inside air introduction port 104 for introducing inside air inside the passenger compartment, and an outside air introduction port 105 for introducing outside air outside the passenger compartment. An inside/outside air switching door 107 is rotatably disposed within the inside/outside air switching box 106. The inside/outside air switching door 107 is operated by an actuator 108 such as a servomotor which is controlled by an electronic control unit (ECU) 109.

The blower 103 including a fan 111 and a fan motor 112 is accommodated within a fan case 110 provided at an upstream air side of the air duct 102. Electrical power is supplied to the fan-motor 112 through a motor driving circuit 113, and the fan 111 is rotated in accordance with electric voltage applied to the fan motor 112.

A cooling heat exchanger 114 (e.g., evaporator of refrigerant cycle) for cooling air blown from the blower 103 is disposed within the air duct 102, and a heating heat exchanger 115 (e.g., water heater core) for heating air is disposed at a downstream air side of the cooling heat exchanger 114.

An air passage of the air duct 102 is partitioned at a downstream air side of the cooling heat exchanger 114 by a partition plate 116 into a first air passage 117 for driver's seat side and a second air passage 118 for a front-passenger's seat side. The cooling heat exchanger 114 is disposed to cross an entire sectional area of the air duct 102. The heating heat exchanger 115 is disposed over both the first air passage 117 and the second air passage 118 to penetrate through the partition plate 116.

The heating heat exchanger 115 is disposed in the first air passage 117 to form a first bypass passage 119 through which air from the cooling heat exchanger 114 bypasses the heating heat exchanger 115 in the first air passage 117.

A first air mixing door 120 is disposed in the first air passage 117 so that a ratio between an air amount passing through the first bypass passage 119 and an air amount passing through the heating heat exchanger 115 in the first air passage 117 is adjusted. The first air mixing door 120 is operated by an actuator 121 such as a servomotor which is electrically controlled by the ECU 109. Similarly, The heating heat exchanger 115 is disposed in the second air passage 118 to form a second bypass passage 122 through which air from the cooling heat exchanger 114 bypasses the heating heat exchanger 115 in the second air passage 118. A second air mixing door 123 is disposed in the second air passage 118 so that a ratio between an air amount passing through the second bypass passage 122 and an air amount passing through the heating heat exchanger 115 in the second air passage 118 is adjusted. The second air mixing door 123 is operated by an actuator 124 such as a servomotor which is electrically controlled by the ECU 109.

The first air passage 117 is for a driver's side (hereinafter, the driver's side is referred to as "Dr"). A Dr-face air duct 125 is for blowing conditioned air toward the upper body of a driver, and is branched to both face air passages. One face air passage is connected to a Dr-center face air outlet 131 opened at an approximate center of a dashboard, and the other face air passage is connected to a Dr-side face air outlet 132 at a side end of the driver's seat.

A Dr-foot duct 127 is for blowing conditioned air toward the foot area of the driver, and is connected to a Dr-foot air outlet 134 opened around the foot area of the driver. A mode switching door 135 for selectively opening and closing the Dr-center face air outlet 131 and the Dr-side face air outlet 132 is disposed in the Dr-face duct 125. Further, mode switching doors 136, 137 are disposed at upstream air sides of a defroster duct 126 and the Dr-foot duct 127, respectively. The mode switching doors 135–137 are operated by actuators 138, 139 such as servomotors which are electrically controlled by the ECU 109.

The second air passage 118 is for the front passenger's side (hereinafter, the front passenger's side is referred to as "Pa"). Within a Pa-face duct 128, a mode silo switching door 143 for selectively opening and closing a Pa-center face air outlet 140 and a Pa-side face air outlet 141 are disposed, and a mode switching door 144 is disposed at an upstream air side of a Pa-foot duct 129. Similarly to the mode switching doors 135–137, the mode switching doors 143, 144 are driven by the actuator 145.

In accordance with the opening/closing states of the mode switching doors 135–137, 143 and 144, an air outlet mode such as the foot mode, the bi-level (B/L) mode and the face mode can be set independently for the first and second air passages, 117, 118. When a foot mode or a foot/defroster mode is set, the mode switching doors 135, 143 disposed respectively in the Dr-face duct 125 and the Pa-face duct 128 close the center face air outlets 131, 140 and open the side face air outlets 132, 141.

Next, the control operation of the ECU 109 for controlling the vehicle air conditioner 100 will be now described. Operation signals from an air-conditioning operation panel 163 mounted on the dashboard and sensor signals from a sensor group are input into the ECU 109. The ECU 109 performs a predetermined calculation in accordance with a control program based on the input signals, and controls operations of the actuators 108, 121, 124, 138, 139, 145 and the motor driving circuit 113.

The sensor group includes: an inside air temperature sensor 164 for detecting an inside air temperature Tr(Dr) of the passenger compartment on the driver's seat side and for detecting an inside air temperature Tr(Pa) of the passenger compartment on the front-passenger's seat side; an outside air temperature sensor 165 for detecting an outside air temperature Tam; a sunlight sensor 166 for detecting a sunlight amount Ts(Dr) entering the passenger compartment on the driver's seat side and for detecting a sunlight amount Ts(Pa) entering the passenger compartment on the front-passengers seat side; a post-evaporator sensor 167 for detecting a post-evaporator temperature Te of air passing through the evaporator 114; and a water temperature sensor 168 for detecting a water temperature Tw supplying to the heater core 115. In the sixteenth embodiment of the present invention, a sensor for detecting the inside air temperature Tr(Pa) may be not provided among the inside air sensor 164. In this case, the inside air temperature Tr(Pa) is calculated by the detected inside air temperature Tr(Dr) and [Tser(Dr)–Tset(Pa)].

Figure 48:
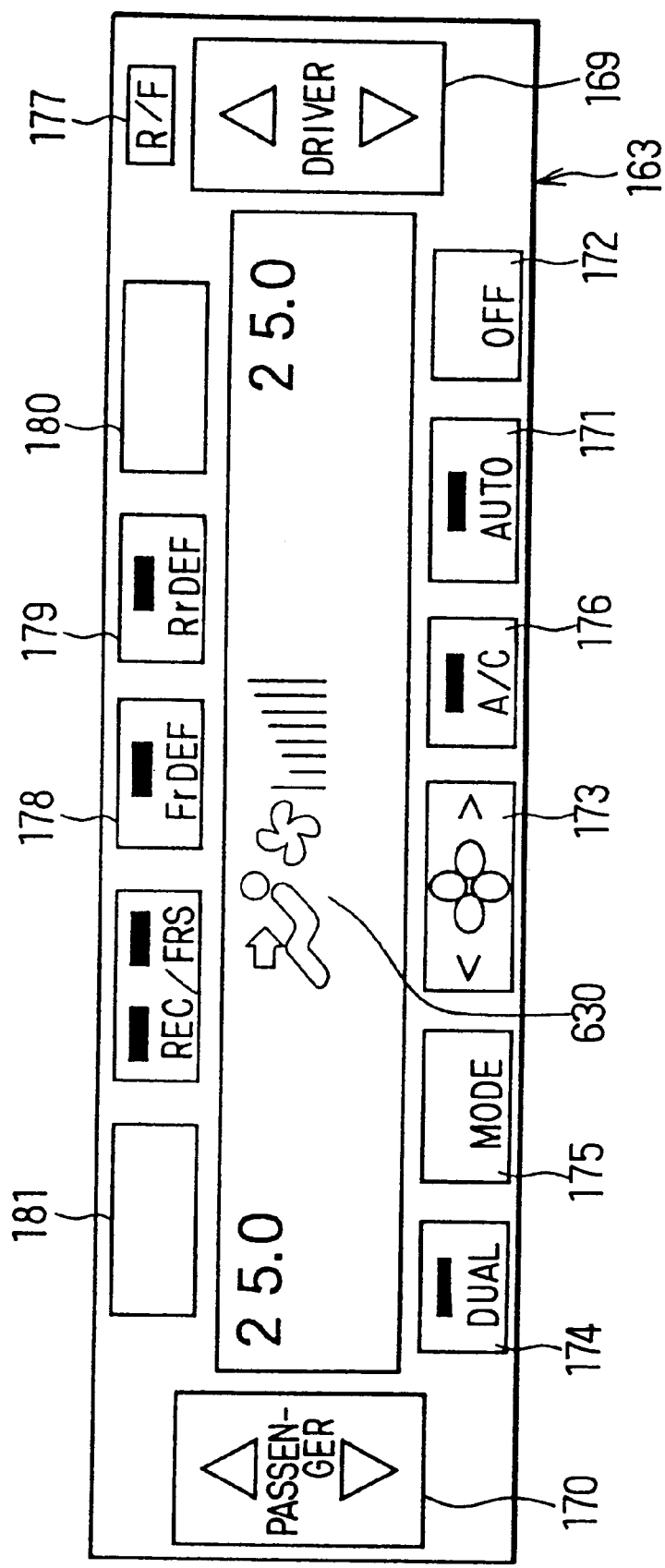
FIG. 48 is a front view of an air-conditioning operation panel according to the sixteenth embodiment.

As shown in FIG. 48, an attachment portion 180 for attaching a Dr-infrared sensor 190 (non-contact temperature sensor) and an attachment portion 181 for attaching a Pa-infrared sensor 191 (non-contact temperature sensor) are provided. The Dr-infrared sensor 190 detects a driver's surface temperature TI(Dr) in the passenger compartment, and the Pa-infrared sensor 191 detects a front-passenger's surface temperature TI(Pa) in the passenger compartment. Both the Dr-infrared sensor 190 and the Pa-infrared sensor 191 are non-contact temperature sensors, and are attached to face the driver and the front passenger, respectively.

Each infrared sensor 190, 191 has a light-intercepting element which generates a light-intercepting voltage in accordance with an infrared amount. The infrared sensors 190, 191 intercept an infrared line from the person, and detect temperature T(Dr) and T(Pa) by the light intercepting voltage generated from the light-intercepting element. The detected temperatures T(Dr) and T(Pa) are output from the infrared sensors 190, 191 to the ECU 109.

A switch group provided on the air-conditioning operation panel 163 includes a Dr-temperature setting switch 169, a Pa-temperature setting switch 170, an automatic switch 171 for instructing an automatic air control, an off switch 172 for instructing a stop of air-conditioning operation, a blower switch 173 for setting an air-blowing level, a dual switch 174 for respectively independently controlling temperature of Dr-side and Pa-side of the passenger compartment, a mode switch 175 for selecting an air outlet mode, an A/C switch 176 for introducing a start operation and a stop operation of the air-conditioning, a R/F switch 177 for selecting an air suction mode, a Fr-defroster switch 178 for preventing a front windshield from being frosted, and a Re-defroster switch 179 for preventing a rear windshield from being frosted. The above-described switches may be operated by a remote control.

Figure 49:
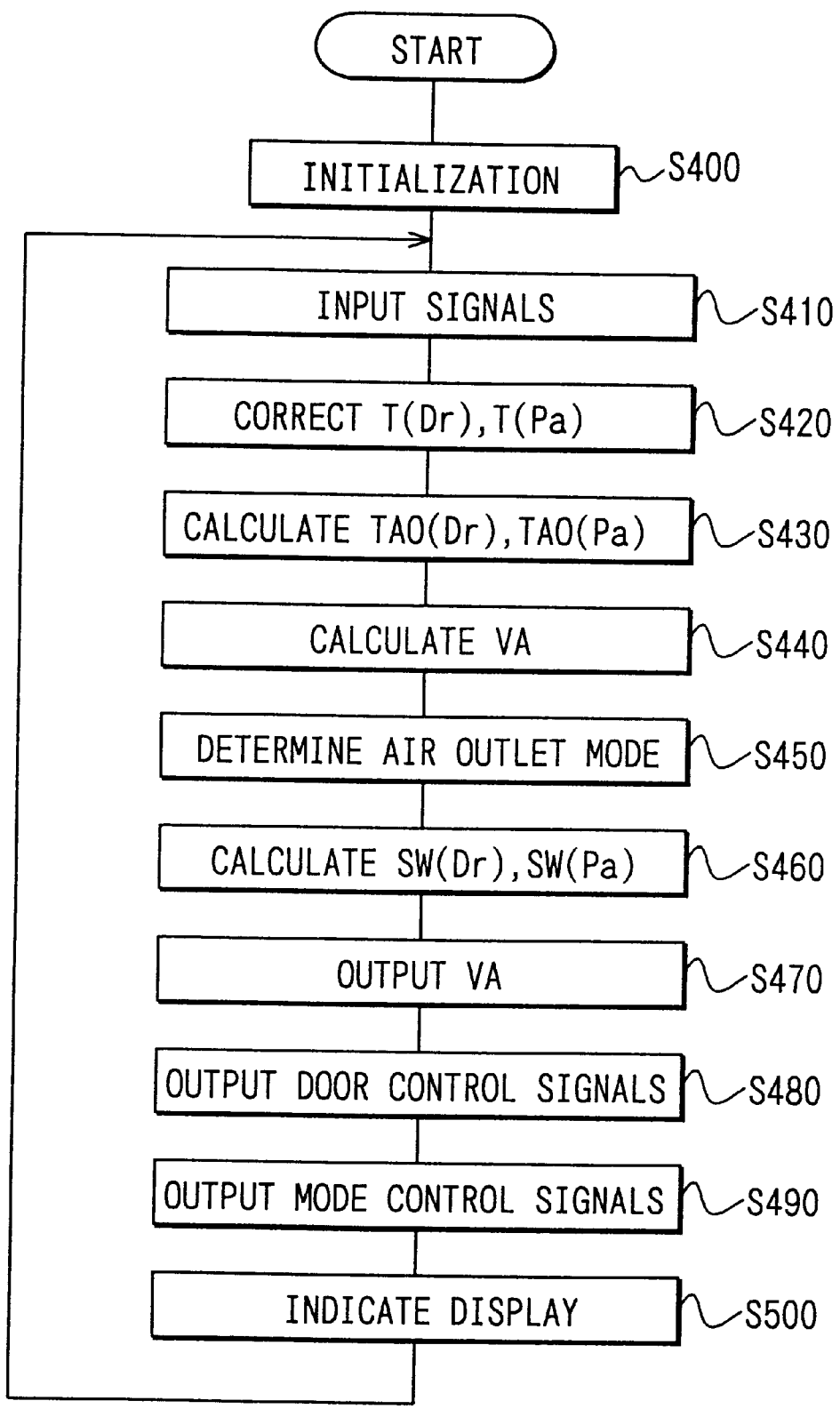
FIG. 49 is a flow diagram of ECU of the vehicle air conditioner according to the sixteenth embodiment.

Next, the control operation of the ECU 109 according to the sixteenth embodiment will be now described. FIG. 49 shows a flow diagram of the ECU 109 according to the sixteenth embodiment of the present invention. When the automatic switch 171 of the operation panel 163 is operated, the air-conditioning control is performed based on the flow diagram shown in FIG. 49.

First, at step S400, an initialization of RAM is performed. Next, at step S410, set temperatures Tset(Dr), Tset(Pa) set by the temperature setting switches 169, 170 of the operation panel 163 are input. Therefore, the detected temperatures T(Dr), T(Pa) of the infrared sensor 190, 191 are output toward the ECU 109 at a predetermined period.

Next, at step S420 (i.e., steps S421–S427 in FIG. 50), the detected temperature T(Dr), T(Pa) is corrected as the person surface temperature TI(Dr), TI(Pa) (i.e., correction temperature), and the person surface temperature TI(Dr), TI(Pa) are output to step S430. Accordingly, the person surface temperatures TI(Dr), TI(Pa) respectively independently flow the flow diagrams, and air-conditioning operation is independently controlled for Dr-side and Pa-side.

Next, at step S430, a driver's seat side target temperature TAO(Dr) and a front-passenger's side target temperature TAO(Pa) are calculated based on the following formula (14).

$$TAO(i)=Kset \times Tset(i)-Kr \times Tr(i)-Kam \times Tam-Ks \times Ts(i)+Kd(i) \times [Cd(i)+Ka(i) \times (10-Tam)]-KIR \times TI(i)+C(i) \quad (14)$$

Here, "i" indicates Dr or Pa. Specifically, Tset(i) is each set temperature set by the Dr, Pa temperature sensors 69, 70. Kset, Kr, Kam, Ks, Kd(i), KIR are temperature setting gain, an inside air temperature gain, an outside air temperature gain, a sunlight amount gain, a Dr and Pa temperature difference correction gain, and a person surface temperature correction gain. Ka(i) is a gain for correcting each relative degree of the outside air temperature Tam relative to Dr and Pa air-conditioning temperatures, Cd(i) is a constant corresponding to the relative degree, and C(i) is a correction constant. In the sixteenth embodiment of the present invention, Ka(i), Cd(i) are changed by the shape or the volume of a vehicle, an air-blowing direction blown from air outlets, or the like.

Next, at step S440, control voltage VA applied to the fan motor 112 of the blower 103 is calculated based on the target temperature TAO(i) calculated in step S430. That is, voltages VA(Dr), VA(Pa) respectively corresponding to the target temperature TAO(Dr), TAO(Pa) are calculated based on the graph shown in FIG. 52, and the control voltage VA is obtained by averaging the voltages VA(Dr), VA(Pa).

Figure 53:
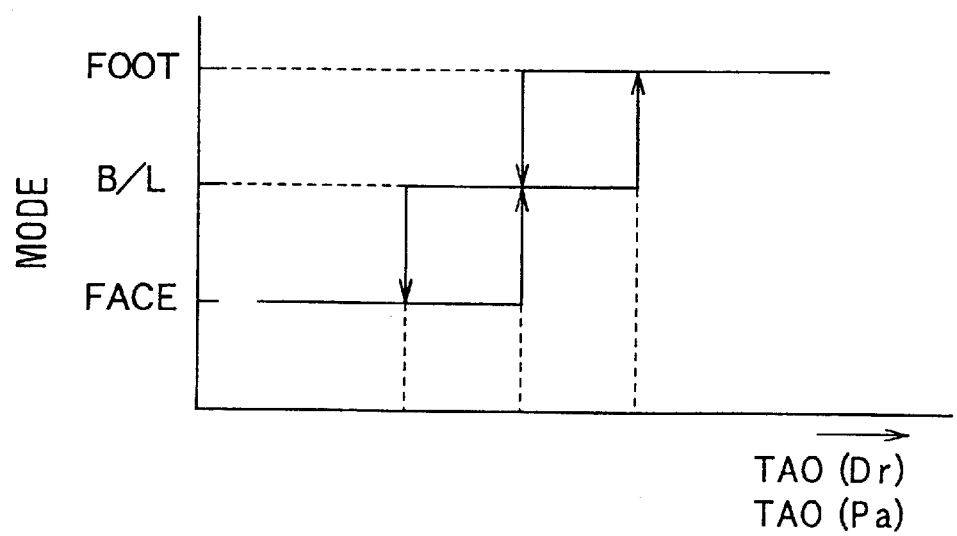
FIG. 53 is a characteristic view showing the relationship between an air outlet mode and the target air temperature TAO(i), according to the sixteenth embodiment.

Next, at step S450, the Dr air outlet mode and the Pa air outlet mode are respectively determined based on the target temperature TAO(Dr) and the target temperature TAO(Pa) in accordance the graph shown in FIG. 53. At step S460, in order to obtain the target temperature TAO(Dr) and the target temperature TAO(Pa), target opening degrees SW(Dr) and SW(Pa) of the first and second air mixing doors 120, 123 are calculated based on the following formula (15).

$$SW(i)\%=[TAO(i)-Te] \times 100/(Tw-Te) \quad (15)$$

Next, at step S470, a control signal is output to the motor driving circuit 113 so that the control voltage VA calculated at step S440 is applied to the blower 103. Next, at step S480, control signals are output to the actuators 121, 124 for driving the air mixing doors 120, 123 so that the target opening degree SW(i) calculated at step S460 is obtained.

Next, at step S490, mode control signals are output to the actuators 138, 139, so that the Dr air outlet mode and the Pa air outlet mode determined at step S450 are obtained. Next, at step S500, on a display 630 attached onto the operation panel 163, the air-blowing amount is indicated by a bar, an air outlet mode is indicated by an arrow, and the set temperatures Tset(Dr), Tset(Pa) are respectively indicated.

Next, step S420 is described in detail with reference to FIG. 50. First, at step S421, n-times detection temperatures T(i) (e.g., 16 times) input at a predetermined period of every 250 ms from step S410 are stored, the mean value of the n-times detection temperatures T(i) is calculated, and the mean value is used as the person surface temperature TI(i). Further, the mean value of 16-times detection temperatures T(i) from the seventeen time detection temperature T(i) to the thirty-two time detection temperature T(i) is calculated as the new person surface temperature TI(i), and the old person surface temperature TI(i) is changed to the new person surface temperature TI(i). The change of the person surface temperature TI(i) is performed at every a predetermined time (e.g., 4 sec). The most new person surface temperature TI(i) is indicated by $TI(i)_{NEW}$, and a person surface temperature TI(i) before one time (e.g., before 4 sec) is indicated by $TI(i)_{OLD}$.

Next, at step S422, it is determined whether or not heating operation is performed. When the heating operation is determined at step S422, a heating shortage or a heating surplus is determined at step S423. That is, when it is determined that $TI(i)_{NEW} > TI(i)_{OLD}$ at step S423, the heating surplus is determined. In this case, at step S424, the TI(i) is corrected so that the heating capacity is reduced. That is, at step S424, an addition value adding a temperature deviation Xa corresponding to 4 sec on the saturated line in FIG. 51 to the old person surface temperature $TI(i)_{OLD}$ is output to step S430 as the corrected new person surface temperature $TI(i)_{NEW}$. That is, the new person surface temperature $TI(i)_{NEW}$ is corrected so that the absolute value $|TI(i)_{NEW} - TI(i)_{OLD}|$ of the person surface temperature is changed by a predetermined time constant τ (e.g., 30 sec).

Figure 51:
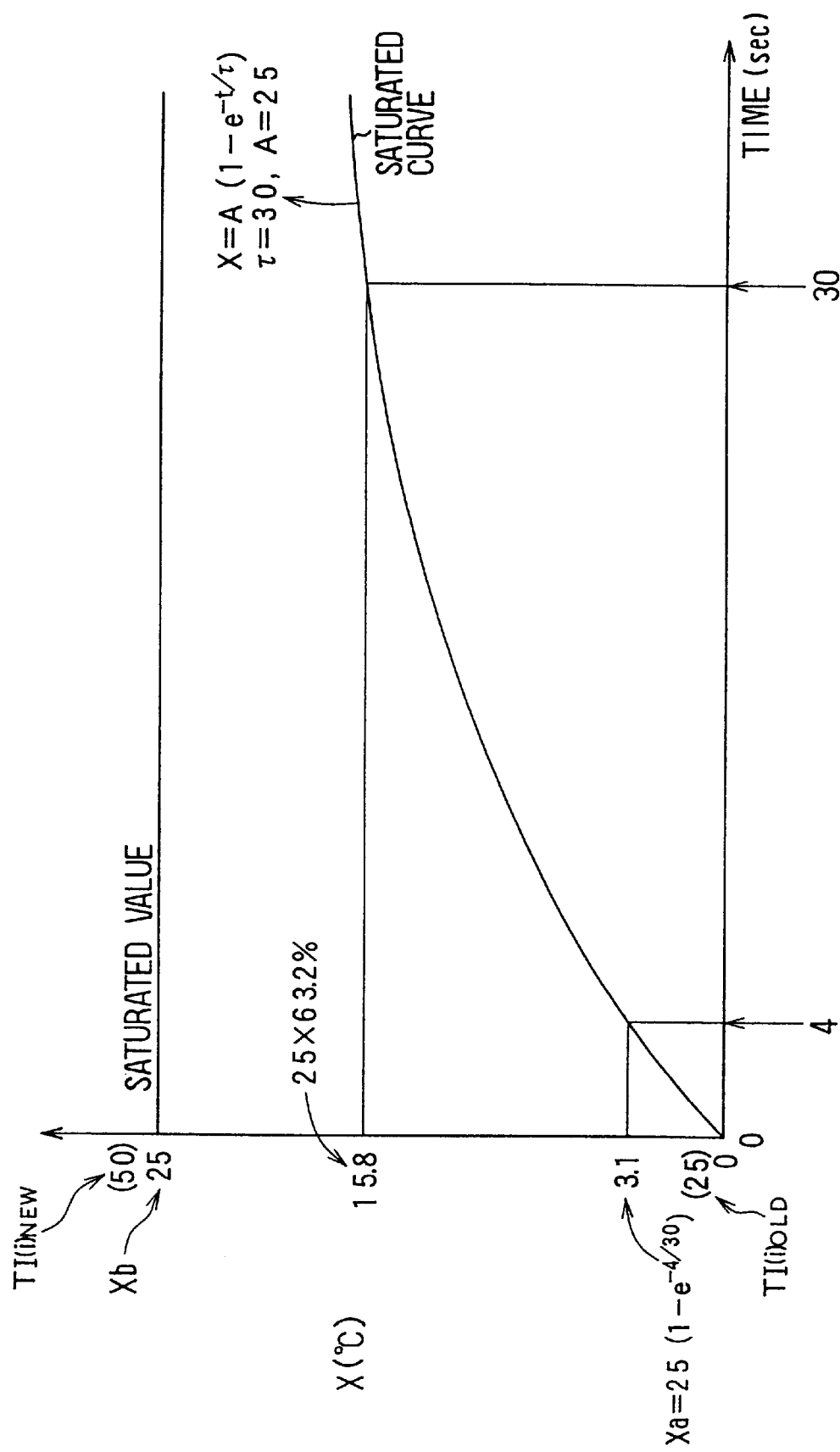
FIG. 51 is a view showing the relationship between a deviation X of detection temperatures and a time, at step S424 in FIG. 50, according to the sixteenth embodiment.
Figure 52:
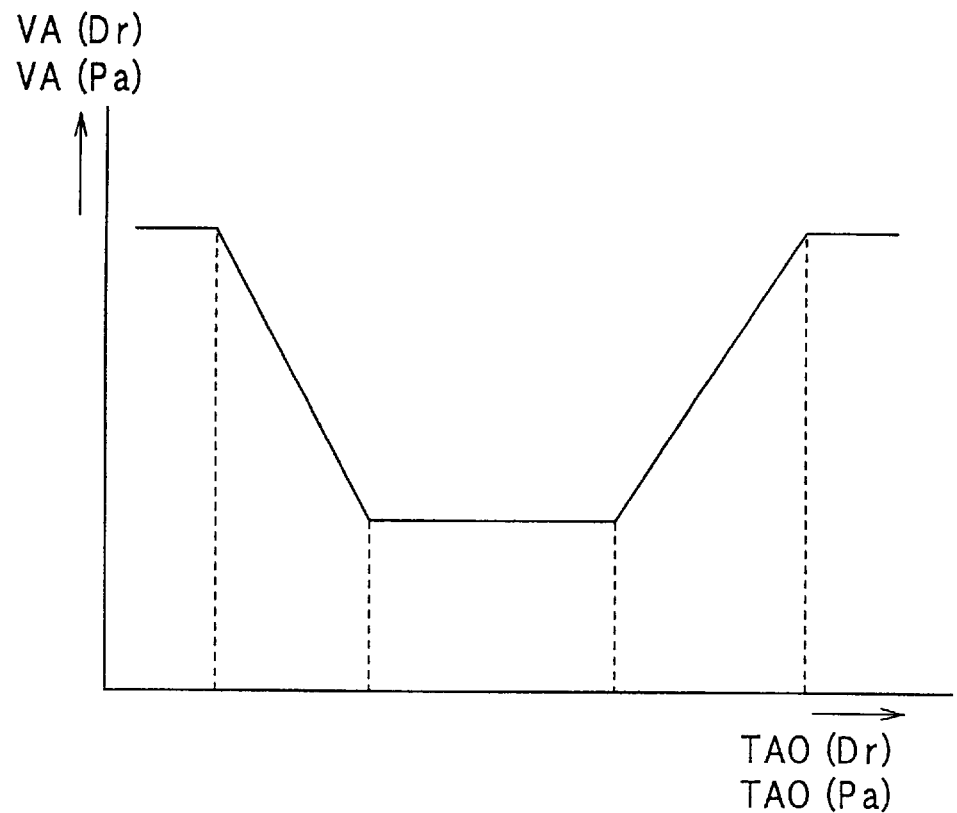
FIG. 52 is a characteristic view showing the relationship between a target air temperature TAO(i) and a blower voltage VA(i), according to the sixteenth embodiment.

Detail correction values at step S424 are shown in FIG. 51. FIG. 51 shows the relationship between the temperature deviation X of the corrected person surface temperature $TI(i)_{NEW}$ and a time (t). That is, deviation x is a saturated curve line indicated by $X=A[1-e^{(-t/\tau)}]$. Here, "A" is the saturated value of the saturated curve line, and is a deviation value Xb of the person temperature. Further, τ is the time constant. In the sixteenth embodiment, the time constant τ is 30 sec.

For example, in the heating operation of 25° C., when the new person surface temperature $TI(i)_{NEW}$ is 50° C. by an error detection of the old person surface temperature $TI(i)_{OLD}$, the "A" is 25° C. (i.e., A=50° C.−25° C.). Further, when the new person surface temperature $TI(i)_{NEW}$ is corrected at a time of 4 sec, for example, the deviation value Xa is approximately equal to 3.1° C.[Xa=25(1−$e^{-4/30}$)]. Therefore, the corrected temperature of the new person surface temperature $TI(i)_{NEW}$ is 28.1° C. which is obtained by adding the deviation value Xa of 3.1° C. to the old person surface temperature $TI(i)_{OLD}$ of 25° C.

When the new person surface temperature $TI(i)_{NEW}$ is continuously detected to 50° C. in error, the next deviation value X of the new person surface temperature $TI(i)_{NEW}$ is calculated to 25.33° C. by a difference of $[TI(i)_{NEW} - TI(i)_{OLD}]$. Specifically, in this case, "A" is 21.9° C. (i.e., A=50° C.−28.1° C.), the time constant τ is 30 sec. Further, the deviation value X at a time of 4 sec is 2.7° C., in the saturated curve line in which the constant τ is 30 sec. Therefore, the corrected temperature of the new person surface temperature $TI(i)_{NEW}$ is 30.8° C. which is obtained by adding the deviation value of 2.7° C. to the old person surface temperature $TI(i)_{OLD}$ of 28.1° C.

Thus, even the error-detected temperature becomes 50° C. from 25° C., the new person surface temperature $TI(i)_{NEW}$ is corrected to 28.1° C., 30.8° C. at every 4 sec.

On the other hand, when the cooling operation is determined at step S422, when it is determined that $TI(i)_{NEW} \leq TI(i)_{OLD}$ at step S426, the cooling surplus is determined. In this case, at step S427, the TI(i) is corrected so that the cooling capacity is reduced.

That is, at step S427, the new person surface temperature $TI(i)_{NEW}$ is corrected so that the absolute value $|TI(i)_{NEW} - TI(i)_{OLD}|$ of the person surface temperature is changed by a predetermined time constant τ (e.g., 30 sec). As described above, in the sixteenth embodiment, the detection temperature T(i) is corrected to the person surface temperature TI(i).

According to the sixteenth embodiment of the present invention, at step S421, 16-times detection temperatures T(i) input at a predetermined period of every 250 ms from step S410 are stored, the mean value of the 16-times detection temperatures T(i) is calculated, and the mean value is used as the person surface temperature TI(i). Further, the old person surface temperature TI(i) is changed at every 4sec. Thus, even when one time detention error is caused among the 16 times, a deterioration of the air-conditioning feeling is prevented.

Figure 50:
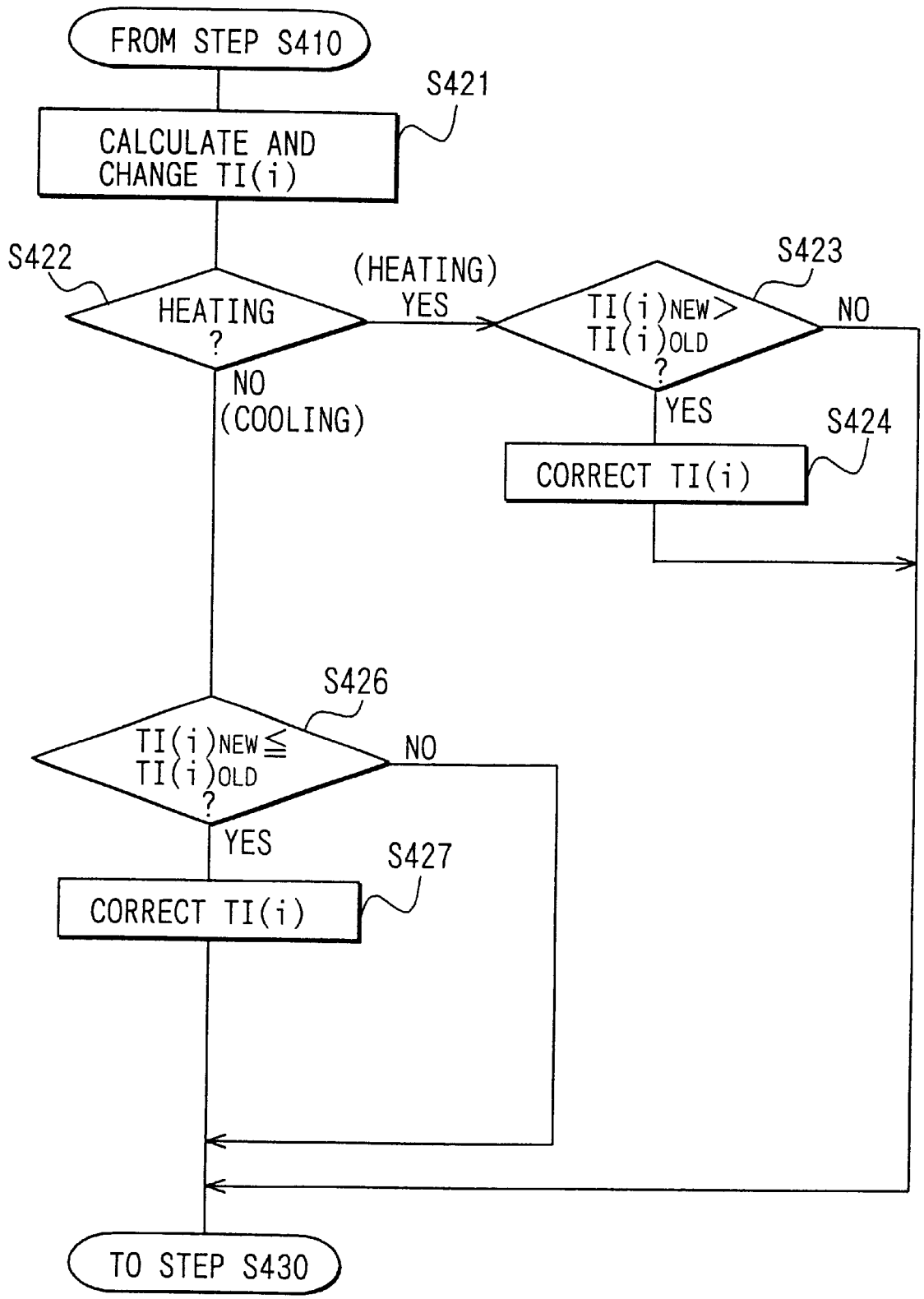
FIG. 50 is a flow diagram showing a detail control of step S420 in FIG. 49, according to the sixteenth embodiment.

At steps S424, S427 in FIG. 50, even when the personal surface temperature $TI(i)_{NEW}$ becomes 50° C. from 25° C., the new person surface temperature $TI(i)_{NEW}$ can be corrected to 28.1° C., 30.8° C. at every 4 sec. That is, a time constant is set for the change of the person surface temperature TI(i), so that the person surface temperature TI(i) is difficult to be changed. Thus, a temperature change, in a case where a person drinks a hot drink or smokes, is hardly affected to the temperature control operation, during a heating mode. Accordingly, it prevents heating from being lowered in the heating mode, and air-conditioning feeling is improved.

Further, at steps S423 and S426, when it is necessary to increase the heating capacity or the cooling capacity, the time constant is not set for the temperature change of the person surface temperature TI(i). Thus, when it is detected that the skin temperature of the passenger is low during the heating mode at a time where the passenger gets in the passenger compartment, the heating capacity is increased so that the air conditioning feeling is improved.

In the above-described sixteenth embodiment of the present invention, the person surface temperature TI(Dr), TI(Pa) at step S420 is directly output to step S430 in FIG. 49. However, the person surface temperature TI(Dr), TI(Pa) at step S420 may be directly output to the other step (e.g., S440) for controlling the air conditioner 100.

Further, in the above-described sixteenth embodiment, the period of the detection temperatures T(Dr), T(Pa) output from step S410, the change period of the person surface temperature TI(i) at step S421, and the time constant τ may be arbitrarily changed.

Figure 54:
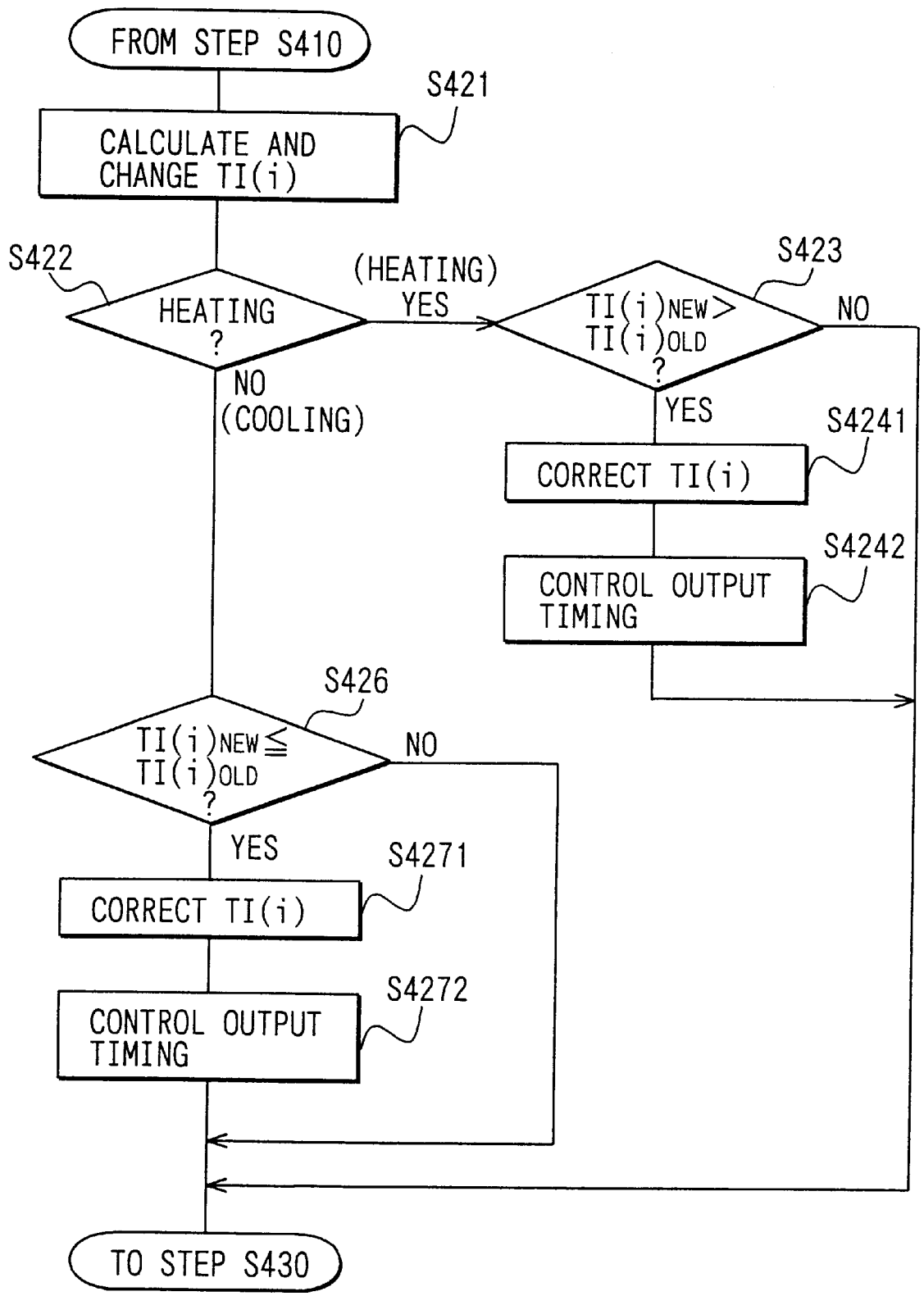
FIG. 54 is a flow diagram showing a main control according to a seventeenth preferred embodiment of the present invention.

A seventeenth preferred embodiment of the present invention will be now described with reference to FIG. 54. In the above-described sixteenth embodiment of the present invention, the new person surface temperature $TI(i)_{NEW}$ is corrected so that the absolute deviation $|TI(i)_{NEW}-TI(i)_{OLD}|$ of the person surface temperature is changed by a predetermined time constant τ (e.g., 30 sec). In the seventeenth embodiment, as shown in FIG. 54, steps S4241 and step S4242 are added instead of step S424, and steps S4271 and step S4272 are added instead of step S427. In FIG. 54, the other steps are similar to those in FIG. 53. At step S4241, S4271, the new person surface temperature $TI(i)_{NEW}$ is corrected so that the absolute deviation $|TI(i)_{NEW}-TI(i)_{OLD}|$ of the person surface temperature becomes smaller a predetermined ratio B% (e.g., 12%). Specifically, the corrected person surface temperature $TI(i)_{NEW}$ is corrected to {TI(i) $_{OLD}$ +[$TI(i)_{NEW}-TI(i)_{OLD}$]×B%}.

Next, at step S4242, S4272, a timing for outputting the person surface temperature $TI(i)_{NEW}$ corrected at step S4241, S4271 is controlled. Specifically, an output timing period L, from the preceding output timing where the preceding person surface temperature $TI(i)_{OLD}$ is output to the new output timing where the new person surface temperature $TI(i)_{NEW}$ is output, is set at a predetermined period (e.g., 30 sec) which is larger than the predetermined output period of the person surface temperature TI(i) at step S421.

According to the seventeenth embodiment of the present invention, even when the new person surface temperature $TI(i)_{NEW}$ is greatly changed due to an error detection, the absolute deviation value $|TI(i)_{NEW}-TI(i)_{OLD}|$ of the person surface temperature is restricted to a predetermined ratio B% at step S4241, S4271, and it prevents air-conditioning feeling from being deteriorated. Further, even when the new person surface temperature $TI(i)_{NEW}$ is greatly changed due to an error detection, after a temperature difference between the temperature of the passenger compartment and the person surface temperature TI(i) becomes smaller after the predetermined time L passes, the person surface temperature TI(i) due to the error-detection is output to step S430. Therefore, it can restrict air-conditioning feeling from being deteriorated due to the error-detection.

Figure 55A:
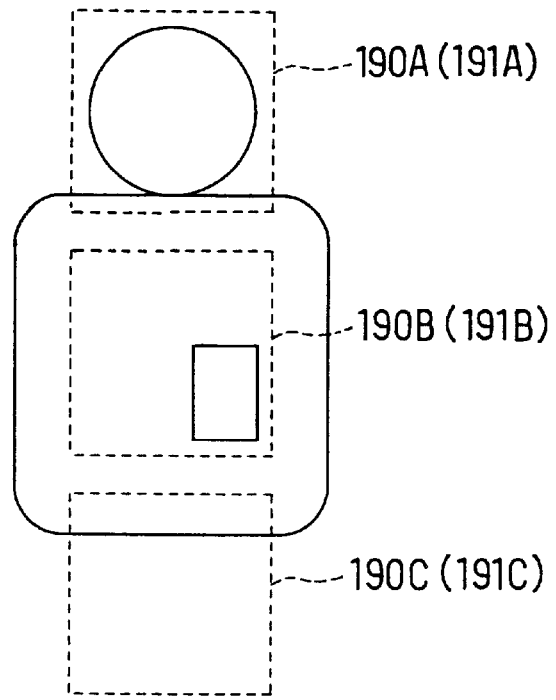
FIG. 55A is a schematic diagram showing a temperature detection state of an infrared sensor.
Figure 55B:
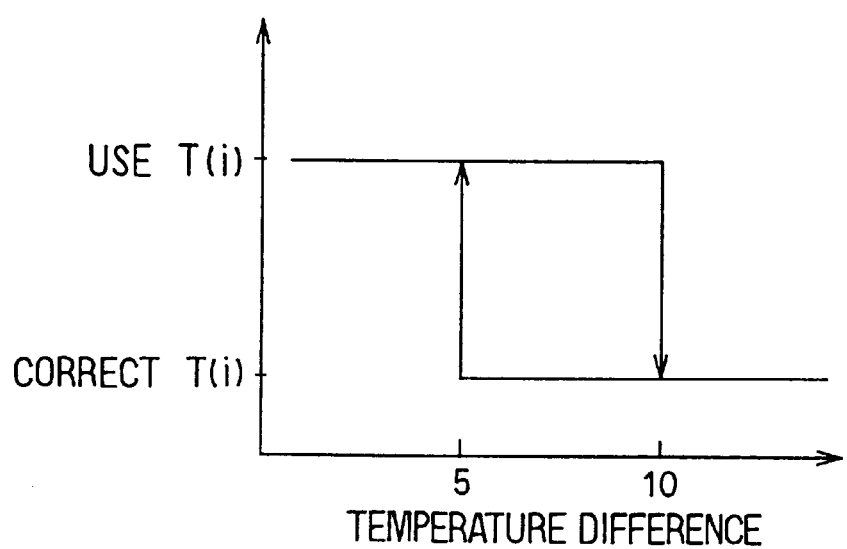
FIG. 55B is a view for explaining a correction state of a person surface temperature TI(i) relative to a temperature difference of detection temperatures, according to an eighteenth preferred embodiment of the present invention.

An eighteenth preferred embodiment of the present invention will be now described with reference to FIGS. 55A, 55B. In the above-described sixteenth embodiment of the present invention, the single infrared sensor 90 (91) is provided for a person (e.g., the driver, the front-passenger), and the mean value of the detection temperature T(i) is used as the person surface temperature TI(i). In the eighteenth embodiment, as shown in FIG. 55A, first, second and third infrared sensors 190A–C (191A–C) are provided for detecting the face portion (first temperature detection area), the body portion (second temperature detection area) and the foot portion (third temperature detection area) of a person of the passenger compartment. Further, at step S421, the mean value of the detection temperatures T(i) from the three infrared sensors 190A–C (191A–C) is calculated, and the temperature difference (deviation value) of each detection temperature T(i) relative to the mean value is calculated. When the temperature difference of the detection temperature T(i) due to an error detection becomes larger than a predetermined temperature difference (e.g., 5–10° C.) shown in FIG. 55B in the second detection area, for example, the detection temperature T(i) of the second temperature detection area is corrected to become smaller. Alternatively, the detection temperature T(i) of the second temperature detection area is corrected to become approximately equal to the detection temperature T(i) of the first temperature detection area.

Further, alternatively, the detection temperature T(i) of the second temperature detection area is not used, and the mean value of the detection temperature T(i) is calculated.

According to the eighteenth embodiment, among the detection temperatures T(i) of the plural sensors, only a detection temperature T(i) having a temperature difference larger than the predetermined difference can be corrected. Accordingly, air-conditioning feeling due to an error detection is restricted.

In the eighteenth embodiment, similarly to the sixteenth embodiment, the temperature control can be independently controlled for the Dr-person and the Pa-person by respectively using the detection temperatures T(Dr) and T(Pa). Further, the detection temperatures T(i) from the first, second and third detection areas can be respectively independently input into the flow diagram shown in FIG. 49, and the air-conditioning operation of the first, second and third detection areas can be respectively independently controlled. In the eighteenth embodiment, the other portions are similar to those in the above-described sixteenth embodiment.

Figure 56:
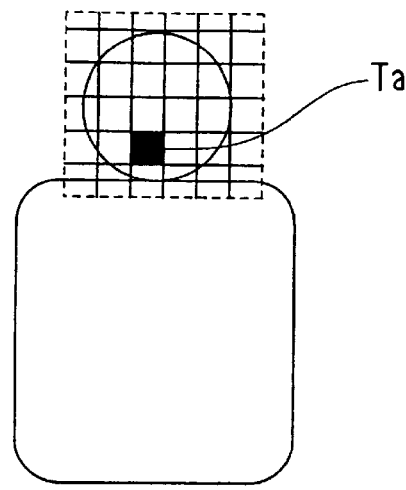
FIG. 56 is a schematic view showing a temperature detection state of an infrared sensor according to a nineteenth preferred embodiment of the present invention.

A nineteenth preferred embodiment of the present invention will be now described with reference to FIG. 56. In the above-described sixteenth embodiment, the infrared sensors 90, 91 each having the single light-intercepting element are used. In the nineteenth embodiment, an infrared picture sensor (e.g., thermo-graph) having plural light-intercepting elements is used. Therefore, as shown in FIG. 56, calculation operation of plural detection temperatures T(i) of the face portion, obtained by the single thermo-graph, may be performed similarly to that of the above-described eighteenth embodiment. Accordingly, even when the error-detection temperature Ta is 100° C. relative to the skin temperature of 27° C. due to the person smoke, for example, the effect similarly to the above-described eighteenth embodiment of the present invention is obtained.

Figure 57:
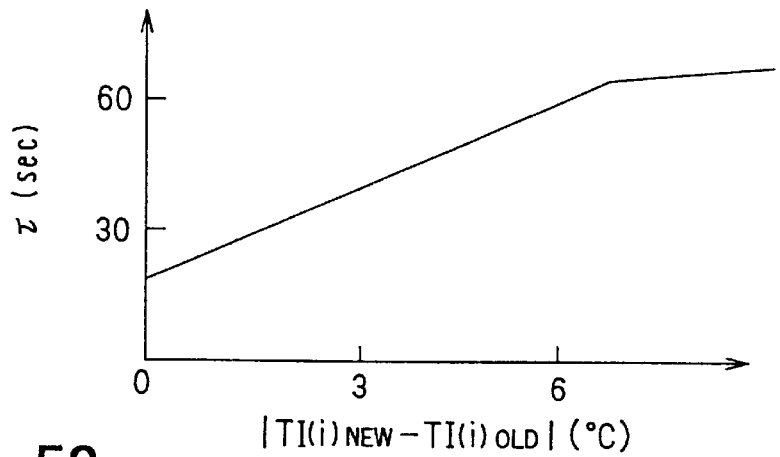
FIG. 57 is a characteristic view showing the relationship between a variation amount of a person surface temperature and a time constant for delaying an output, according to a twentieth preferred embodiment of the present invention.

A twentieth preferred embodiment of the present invention will be now described with reference to FIG. 57. In the above-described sixteenth embodiment, at steps S424, S427, the time constant $\tau$ is beforehand set at the predetermined value (e.g., 30 sec). However, in the twentieth embodiment, the time constant $\tau$ is set to become larger as the temperature variation amount $|TI(i)_{NEW}-TI(i)_{OLD}|$ of the person surface temperature TI(i) becomes larger. Similarly to the time constant $\tau$, the timing period L described in the seventeenth embodiment may be changed to be longer as temperature variation amount $|TI(i)_{NEW}-TI(i)_{OLD}|$ of the person surface temperature TI(i) becomes larger. In this case, the air-conditioning feeling is further improved.

Figure 58:
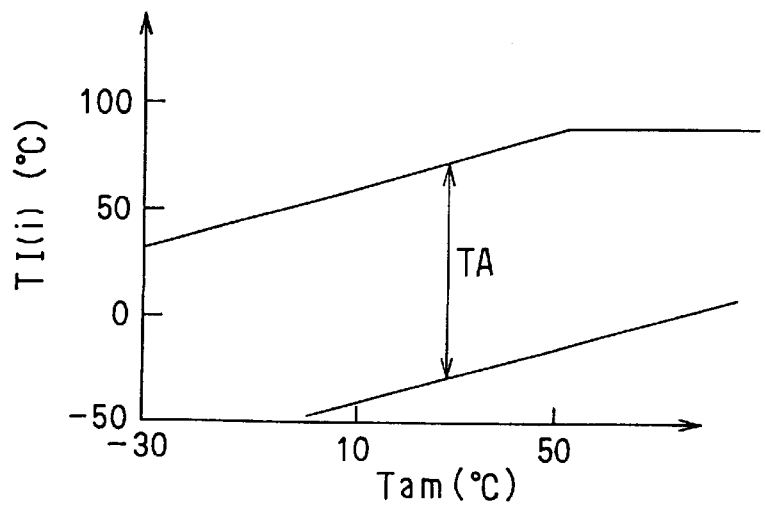
FIG. 58 is a characteristic view showing the relationship between an outside air temperature and a person surface temperature, according to a twenty-first embodiment of the present invention.

A twenty-first preferred embodiment of the present invention will be now described with reference to FIG. 58. In the above-described sixteenth embodiment of the present invention, at step S421, plural detection temperatures T(i) are respectively compared, and a detection temperature T(i) having a large deviation value larger than the predetermined value :is corrected. However, in the twenty-first embodiment, only the detection temperature TI(i) outside a predetermined temperature area TA is corrected close to the predetermined temperature area TA at step S421. Alternatively, the detection temperature TI(i) outside the predetermined temperature area TA is corrected close to the other person surface temperature TI(i) which is not corrected. Further, alternatively, the detection temperature TI(i) outside the predetermined temperature area TA is canceled. Accordingly, only the person surface temperature TI(i) outside the predetermined detection area TA, having the error-detection, is corrected, so that the air-conditioning feeling is further improved.

The predetermined range TA may be changed in accordance with the outside air temperature Tam. For example, the upper and the lower limit values of the predetermined range TA may be changed to be higher as the outside air temperature Tam becomes higher.

Although the present invention has been fully described in connection with preferred embodiments thereof with reference to the accompanying drawings, it is to be noted that various changes and modifications will become apparent to those skilled in the art.

In the above-described first through sixth embodiments, the surface temperature sensor 31 is disposed on the operation panel 41. However, the surface temperature sensor 31 may be disposed at a position indicated by P in FIG. 4 on the ceiling 43, or may be disposed at the front pillar (A-pillar) 48. When the surface temperature sensor 31 is disposed at the front pillar 48 on the side of the driver 42, the surface temperature sensor 31 is disposed to face the front passenger. When the surface temperature sensor 31 is disposed at the front pillar 48 on the side of the front passenger, the surface temperature sensor 31 is disposed to face the driver 42.

In the above-described embodiments, the other non-contact temperature sensor may be used instead of the infrared sensor.

In the above-described sixteenth embodiment of the present invention, the single infrared sensor for the Dr-person and the single infrared sensor for the Pa-person are respectively disposed. However, plural infrared sensors may be provided for the Dr-person and plural infrared sensor may be provided for the Pa-person. Further, both the surface temperatures T(Dr), T(Pa) may be detected by using a single infrared sensor.

In the above-described seventeenth embodiment of the present invention, the output timing L is set respectively for the driver and the front passenger. However, the same output timing L may be set for both the driver and the front passenger. Further, in the above-described eighteenth embodiment, the output timing L may be set for each of the plural infrared sensors. In this case, the air-conditioning operation may be finely controlled.

In the above-described sixteenth embodiment, the control of step S420 is composed of steps S421–S427. However, the control of step S420 may be composed of steps S422–S427, or may be composed of only step S421. Similarly, in the above-described seventeenth embodiment, step S421 may be omitted, or steps S4241, S4271 may be omitted. Alternatively, steps S4242, S4272 may be omitted. In this case where step S421 is omitted, the detection temperature T(i) is directly used as the person surface temperature TI(i). For example, the detection temperature $T(i)_{NEW}$ may be corrected so that the absolute deviation value $|T(i)_{NEW}-T(i)_{OLD}|$ of the detection temperature becomes smaller.

In the above-described seventeenth embodiment of the present invention, the person surface temperature TI(i) is output at step S421 to step S422, and the output timing is controlled at steps S4242 and S4272. However, at step S421, the person surface temperature TI(i) may be calculated as an initial value, and the variation amount of the person surface temperature TI(i) may be calculated and changed. Thereafter, at step S4242, S4272, the output of the variation amount of the person surface temperature may be controlled to be delayed by a predetermined time L.

In the above-described sixteenth embodiment of the present invention, the detention number may be arbitrarily changed. For example, the detection number may be increased. In this case, the person surface temperature TI(i) is further accurately calculated, and the responding performance of the vehicle air conditioner 100 is improved. Further, at step S421, the person surface temperature TI(i) may be calculated only using the detection temperatures T(i) of (n–k) times among, the detection temperatures T(i) of n-times. For example, the mean value is not calculated from the 16-times detection temperatures T(i) output at every 250 ms, but is calculated from the 8-times detection temperature T(i) at every 500 ms. Accordingly is can prevent a detection temperature T(i) due to an error detection from being affected to the person surface temperature TI(i) beforehand.

Similarly, in the above-described seventeenth embodiment, the person surface temperature TI(i) may be calculated only using the detection temperatures T(i) of (n–k) times among the detection temperatures T(i) of n-times, at step S4241, S4271. For example, among the person surface temperature TI(i) input at step S4241, S4271 at every 4 sec, every other person surface temperature TI(i) is canceled, and the person surface temperature TI(i) may be corrected at every 8 sec. Accordingly, is can prevent a detection temperature T(i) due to an error detection from being affected to the person surface temperature TI(i) beforehand.

Further, when the person surface temperature TI(i) changes so that the heat load of the vehicle air conditioner 100 is reduced, the time number (N–K) may be corrected smaller as compared with a case where the person surface temperature TI(i) changes so that the heat load of the vehicle air conditioner 100 is increased.

In the above-described Twenty-first embodiment of the present invention, the person surface temperature outside the predetermined temperature area TA is corrected. However, when the variation amount of the person surface temperature TI(i) is larger than a predetermined variation amount, the person surface temperature TI(i) may be corrected. In this case, the variation amount of the person surface temperature TI(i) may be corrected close to the predetermined variation amount. Alternatively, the variation amount larger than the predetermined amount may be canceled. Further, in the above-described twenty-first embodiment, the predetermined temperature area TA is set to be changed according to the outside air temperature Tam. Similarly, the correction amount for correcting the person surface temperature TI(i) or the predetermined temperature difference described in the above-described embodiments may be changed in accordance with the outside air temperature.

In the above-described sixteenth embodiment of the present invention, the person surface temperature TI(i) is corrected regardless for the increase and the decrease of the heat load of the vehicle air conditioner 100. However, in a case where the person surface temperature TI(i) is changed so that the heat load of the vehicle air conditioner 100 is reduced, the correction amount of the person surface temperature TI(i) may be corrected to become larger as compared with a case where the person surface temperature TI(i) is changed so that the heat load is increased. Accordingly, the responding performance of the vehicle air conditioner 1 is improved.

In the above-described sixteenth embodiment of the present invention, $|TI(i)_{NEW}-TI(I)_{OLD}|$ of the person surface temperature TI(i) is used as the variation amount. However, the variation amount per time $|[TI(i)_{NEW}-TI(i)_{OLD}]/t|$ may be used.

Such changes and modifications are to be understood as being within the scope of the present invention as defined by the appended claims.

What is claimed is:

1. An air conditioner for a vehicle having a passenger compartment, the air conditioner comprising:

an air duct for defining an air passage through which air flows into the passenger compartment;

a heat exchanger disposed in the air duct, for performing a heat exchange with air;

a temperature adjustment unit for adjusting temperature of air blown into the passenger compartment; and a control unit which controls the temperature adjustment unit so that temperature of air blown into the passenger compartment becomes a target air temperature; wherein:

the control unit includes, a temperature setting unit for setting a temperature of the passenger compartment to a set temperature, and a non-contact temperature sensor which detects a surface temperature of a predetermined detection range of the passenger compartment;

the predetermined detection range of the non-contact temperature sensor includes a first detection portion in which a surface temperature is changed to approximately correspond to an inside air temperature inside the passenger compartment, a second detection portion in which a surface temperature is changed in accordance with an outside air temperature outside the passenger compartment, and a third detection portion in which a surface temperature is changed in accordance with a sunlight amount entering into the passenger compartment; and the control unit calculates the target air temperature only using the set temperature from the temperature setting unit and a detection surface temperature detected from the non-contact temperature sensor.

2. The air conditioner according to claim 1, wherein the non-contact temperature sensor is disposed to detect all of the first detection portion, the second detection portion and the third detection portion of the passenger compartment.

3. The air conditioner according to claim 1, wherein:

the control unit include an inside air temperature sensor, for detecting the inside air temperature, and a sunlight amount sensor for detecting the sunlight amount entering the passenger compartment;

the non-contact temperature sensor is disposed to detect the second detection portion of the passenger compartment; and the control unit calculates the target air temperature using the set temperature from the temperature setting unit, the inside air temperature detected from the inside air temperature sensor, the sunlight amount detected from the sunlight amount sensor, and a detection surface temperature detected from the non-contact temperature sensor.

4. The air conditioner according to claim 1, wherein:

the control unit include an outside air temperature sensor for detecting the outside air temperature and a sunlight amount sensor for detecting the sunlight amount entering the passenger compartment;

the non-contact temperature sensor is disposed to detect the first detection portion of the passenger compartment; and the control unit calculates the target air temperature using the set temperature from the temperature setting unit, the outside air temperature detected from the outside air temperature sensor, the sunlight amount detected from the sunlight amount sensor, and a detection surface temperature detected from the non-contact temperature sensor.

5. The air conditioner according to according to claim 1, wherein the first detection portion is at least one of a ceiling portion of the passenger compartment, a clothed portion of a passenger, and a seat of the passenger compartment.

6. The air conditioner according to claim 1, wherein the second detection portion is a windshield of the vehicle.

7. The air conditioner according to claim 1, wherein the third detection portion is at least one of a clothed portion of a passenger, a seat of the passenger compartment and a windshield of the vehicle.

8. The air conditioner according to claim 1, wherein:

the non-contact temperature sensor is disposed to detect a surface temperature of detection subjects of a windshield, a clothed portion of the passenger compartment, a seat and a ceiling of the passenger compartment; and each area ratio of the detection subjects to an entire detection area of the non-contact temperature sensor is set so that the area ratio of the windshield is $(25\pm10)\%$, the area ratio of the clothed portion and the seat is $(35\pm10)\%$, the area ratio of the ceiling is $(20\pm10)\%$ and the area ratio of the other portion is $(20\pm10)\%$.

9. The air conditioner according to claim 8, wherein each area ratio of the detection subjects to the entire detection area is set so that the area ratio of the windshield is (25±5)%, the area ratio of the clothed portion and the seat is (35±5)%, the area ratio of the ceiling is (20±5)% and the area ratio of the other portion is (20±5)%.

10. The air conditioner according to claim 1, wherein the non-contact temperature sensor is disposed at a position which is hardly affected by an outer disturbance.

11. The air conditioner according to claim 10, wherein the non-contact temperature sensor is disposed in a front pillar of the vehicle on a front-passenger's seat side to face a driver's seat of the passenger compartment.

12. The air conditioner according to claim 1, wherein:
the non-contact temperature sensor is an infrared sensor which outputs an electrical signal corresponding to an incidence infrared amount; and
the infrared sensor has an incidence ratio adjustment unit for adjusting an incidence ratio of infrared line.

13. The air conditioner according to claim 1, wherein:
the non-contact temperature sensor is disposed to detect the first detection portion, the second detection portion and the third detection portion of the passenger compartment;
the control unit includes temperature variation determining means for determining whether or not a variation amount of the surface temperature is larger than a set value; and
the control unit controls an air-conditioning operation based on a determination of the temperature variation determining means.

14. The air conditioner according to claim 13, further comprising
an air amount adjustment unit for adjusting an air amount blown into the passenger compartment from the air duct;
the control unit controls the air amount adjustment unit so that the air amount blown into the passenger compartment from the air duct becomes a target air amount; and
the control unit corrects the target air amount based on the determination of the temperature variation determining means.

15. The air conditioner according to claim 1, wherein:
the non-contact temperature sensor is disposed to detect the first detection portion, the second detection portion and the third detection portion of the passenger compartment;
the control unit includes an outer disturbance determining means for determining whether or not the surface temperature is affected by an outer disturbance; and
the control unit corrects the surface temperature based on a determination of the outer disturbance determining means.

16. The air conditioner according to claim 15, wherein:
when the outer disturbance determining means determines that an outer disturbance is affected to the surface temperature, the control unit controls an air-conditioning operation based on a previous surface temperature before being affected by the outer disturbance.

17. The air conditioner according to claim 15, wherein the outer disturbance determining means determines that an outer disturbance is affected to the surface temperature when a variation amount of the surface temperature is larger than a set value.

18. The air conditioner according to claim 15, wherein the outer disturbance determining means determines that an outer disturbance is affected to the surface temperature when a door positioned in the detection range of the non-contact temperature sensor is opened.

19. The air conditioner according to claim 15, wherein the outer disturbance determining means determines that an outer disturbance is affected to the surface temperature when a windshield positioned in the detection range of the non-contact temperature sensor is opened.

20. The air conditioner according to claim 1, wherein:
the non-contact temperature sensor is disposed to detect the first detection portion, the second detection portion and the third detection portion of the passenger compartment; and
the control unit controls an air-conditioning operation based on the set temperature at an air-conditioning start time and the surface temperature at the air-conditioning start time, during an initial period until a predetermined time passes after the air conditioning start time.

21. The air conditioner according to claim 1, wherein:
the non-contact temperature sensor is disposed to detect the first detection portion, the second detection portion and the third detection portion of the passenger compartment;
the control unit includes seated-state determining means for determining whether or not a driver is seated on a driver's seat of the passenger compartment; and
the control unit corrects the surface temperature based on a determination of the seated-state determining means.

22. The air conditioner according to claim 21, wherein:
when the seated-state determining means determines that the driver is in an absence state, the control unit corrects the surface temperature by a predetermined correction amount.

23. The air-conditioner according to claim 22, wherein the predetermined correction amount is a difference between a surface temperature just before the absence state of the driver is determined and a,surface temperature just after the absence state of the driver is determined.

24. The air conditioner according to claim 22, wherein the predetermined correction amount is calculated based on an area ratio of the driver contained in the detection range of the non-contact temperature sensor.

25. The air conditioner according to claim 22, wherein the predetermined correction amount is changed by the seasons.

26. The air conditioner according to claim 21, wherein:
when the determination of the seated-state determining means is changed, the control unit gradually changes the target air temperature of air blown into the passenger compartment.

27. The air conditioner according to claim 1, wherein the non-contact temperature sensor is disposed to be tilted toward a driver in the passenger compartment so that the predetermined detection range includes at least a ceiling portion of the passenger compartment, the upper body side of the driver and a windshield of the vehicle.

28. The air conditioner according to claim 1, wherein the non-contact temperature sensor is disposed to mainly detect the temperature of the second detection portion.

29. The air conditioner according to claim 1, wherein the non-contact temperature sensor is an infrared sensor, and detects the surface temperature of the predetermined detection range in a non-contact state.

30. The air conditioner according to claim 1, wherein the non-contact temperature sensor is disposed to be toward the upper side part of a driver from a lower side.

31. The air conditioner according to claim 1, wherein the control unit calculates the target air temperature using the following formula:

$$TAO = K_{set} \times T_{set} - K_{ir} \times T_{ir} + C$$

wherein,

TAO indicates the target air temperature;

Tset indicates the set temperature;

Tir indicates the detection surface temperature;

Kset and Kr are coefficients; and

C is a correction constant.

32. The air conditioner according to claim 1, wherein:

the heat exchanger includes an evaporator for cooling air by performing a heat exchange with refrigerant, and a heater core disposed at a downstream air side of the evaporator for heating air using hot water flowing therethrough;

the temperature adjustment unit includes an air mixing damper for adjusting a ratio between an air amount passing through the heater core and an air amount bypassing the heater core;

the control unit further includes a water temperature sensor for detecting a water temperature flowing through the heater core, and an evaporator air temperature sensor for detecting an air temperature immediately after passing through the evaporator; and the control unit calculates a target opening degree of the air mixing damper, based on the target air temperature, the water temperature from the water temperature sensor, and the air temperature from the evaporator air temperature sensor.

33. The air conditioner according to claim 32, wherein the control unit calculates the target opening degree of the air mixing damper using the following formula:

$$\theta o = [(TAO - Te)/(Tw - Te)] \times 100(\%)$$

wherein, $\theta o$ indicates the target opening degree;

TAO indicates the target air temperature;

Tw indicates the water temperature detected by the water temperature sensor; and Te indicates the air temperature detected by the evaporator air temperature sensor.

* * * * *